(12) United States Patent
Moon et al.

(10) Patent No.: US 7,399,643 B2
(45) Date of Patent: Jul. 15, 2008

(54) METHOD AND APPARATUS FOR ALIGNING MICROBEADS IN ORDER TO INTERROGATE THE SAME

(75) Inventors: John Moon, Wallingford, CT (US); Martin A. Putnam, Cheshire, CT (US); Tuo Li, East Lyme, CT (US); Joseph Traynor, Woburn, MA (US)

(73) Assignee: Cyvera Corporation, Wallingford, CT (US)

( * ) Notice: Subject to any disclaimer, the term of this patent is extended or adjusted under 35 U.S.C. 154(b) by 679 days.

(21) Appl. No.: 10/661,836

(22) Filed: Sep. 12, 2003

(65) Prior Publication Data

US 2004/0132205 A1    Jul. 8, 2004

Related U.S. Application Data

(63) Continuation-in-part of application No. 10/645,689, filed on Aug. 20, 2003.

(60) Provisional application No. 60/410,541, filed on Sep. 12, 2002.

(51) Int. Cl.
*G01N 33/552* (2006.01)
(52) U.S. Cl. .................... 436/521; 436/501
(58) Field of Classification Search .......... 436/501, 436/527
See application file for complete search history.

(56) References Cited

U.S. PATENT DOCUMENTS 3,891,302 A    6/1975    Dabby et al.

(Continued)

FOREIGN PATENT DOCUMENTS

CH    598661 A    5/1978

(Continued)

OTHER PUBLICATIONS

Ivan Oranksy, "Sequencing on Compact Disc?", The Scientist Magazine, vol. 17, Iss. 13, Jun. 30, 2003, www.the-scientist.com/yr2003/jun/labcon_030630.html, printed Jan. 5, 2004.

(Continued)

*Primary Examiner*—Jill Warden
*Assistant Examiner*—Paul S Hyun
(74) *Attorney, Agent, or Firm*—Dean D. Small; The Small Patent Law Group LLP

(57) ABSTRACT

A method and apparatus are provided for aligning optical elements or microbeads, wherein each microbead has an elongated body with a code embedded therein along a longitudinal axis thereof to be read by a code reading device. The microbeads are aligned with a positioning device so the longitudinal axis of the microbeads is positioned in a fixed orientation relative to the code reading device. The microbeads are typically cylindrically shaped glass beads between 25 and 250 microns (μm) in diameter and between 100 and 500 μm long, and have a holographic code embedded in the central region of the bead, which is used to identify it from the rest of the beads in a batch of beads with many different chemical probes. A cross reference is used to determine which probe is attached to which bead, thus allowing the researcher to correlate the chemical content on each bead with the measured fluorescence signal. Because the code consists of a diffraction grating typically disposed along an axis, there is a particular alignment required between the incident readout laser beam and the readout detector in two of the three rotational axes. The third axis, rotation about the center axis of the cylinder, is azimuthally symmetric and therefore does not require alignment.

60 Claims, 26 Drawing Sheets

U.S. PATENT DOCUMENTS

| | | |
|---|---|---|
| 3,916,182 A | 10/1975 | Dabby et al. |
| 3,968,476 A | 7/1976 | McMahon |
| 4,011,435 A | 3/1977 | Phelps |
| 4,023,010 A | 5/1977 | Horst et al. |
| 4,053,228 A | 10/1977 | Schiller |
| 4,053,433 A * | 10/1977 | Lee .................... 252/408.1 |
| 4,131,337 A | 12/1978 | Moraw et al. |
| 4,168,146 A | 9/1979 | Grubb et al. |
| 4,301,139 A | 11/1981 | Feingers et al. |
| 4,386,274 A | 5/1983 | Altshuler |
| 4,400,616 A | 8/1983 | Chevillat et al. |
| 4,445,229 A | 4/1984 | Tasto et al. |
| 4,447,546 A | 5/1984 | Hirschfeld |
| 4,537,504 A | 8/1985 | Baltes et al. |
| 4,560,881 A | 12/1985 | Briggs |
| 4,562,157 A | 12/1985 | Lowe et al. |
| 4,647,544 A | 3/1987 | Nicoli et al. |
| 4,678,752 A | 7/1987 | Thorne et al. |
| 4,685,480 A | 8/1987 | Eck |
| 4,690,907 A | 9/1987 | Hibino et al. |
| 4,701,754 A * | 10/1987 | Provonchee ............ 340/815.45 |
| 4,716,121 A | 12/1987 | Block et al. |
| 4,725,110 A | 2/1988 | Glenn et al. |
| 4,740,468 A | 4/1988 | Weng et al. |
| 4,740,688 A | 4/1988 | Edwards |
| 4,748,110 A | 5/1988 | Paul |
| 4,762,420 A * | 8/1988 | Bowley .................... 356/436 |
| 4,767,719 A | 8/1988 | Finlan |
| 4,807,950 A | 2/1989 | Glenn et al. |
| 4,816,659 A | 3/1989 | Bianco et al. |
| 4,822,746 A | 4/1989 | Walt |
| 4,841,140 A | 6/1989 | Sullivan et al. |
| 4,877,747 A | 10/1989 | Stewart |
| 4,880,752 A | 11/1989 | Keck et al. |
| 4,882,288 A | 11/1989 | North et al. |
| 4,921,805 A | 5/1990 | Gebeyehu et al. |
| 4,931,384 A | 6/1990 | Layton et al. |
| 4,937,048 A | 6/1990 | Sakai et al. |
| 4,958,376 A | 9/1990 | Leib |
| 4,992,385 A | 2/1991 | Godfrey |
| 5,002,867 A | 3/1991 | Macevicz |
| 5,003,600 A | 3/1991 | Deason |
| RE33,581 E | 4/1991 | Nicoli et al. |
| 5,028,545 A | 7/1991 | Soini |
| 5,030,558 A | 7/1991 | Litman et al. |
| 5,033,826 A | 7/1991 | Kolner |
| 5,065,008 A | 11/1991 | Hakamata et al. |
| 5,067,155 A | 11/1991 | Bianco et al. |
| 5,081,012 A | 1/1992 | Flanagan et al. |
| 5,089,387 A | 2/1992 | Tsay et al. |
| 5,090,807 A | 2/1992 | Tai |
| 5,091,636 A | 2/1992 | Takada et al. |
| 5,095,194 A | 3/1992 | Barbanell |
| 5,100,238 A | 3/1992 | Nailor et al. |
| 5,104,209 A | 4/1992 | Hill et al. |
| 5,105,305 A | 4/1992 | Betzig et al. |
| 5,114,864 A | 5/1992 | Walt |
| 5,115,121 A | 5/1992 | Bianco et al. |
| 5,118,608 A | 6/1992 | Layton et al. |
| 5,129,974 A | 7/1992 | Aurenius |
| 5,138,468 A | 8/1992 | Barbanell |
| 5,141,848 A | 8/1992 | Donovan et al. |
| 5,143,853 A | 9/1992 | Walt |
| 5,144,461 A | 9/1992 | Horan |
| 5,160,701 A | 11/1992 | Brown, III et al. |
| 5,166,813 A | 11/1992 | Metz |
| 5,192,980 A | 3/1993 | Dixon et al. |
| 5,196,350 A | 3/1993 | Backman et al. |
| 5,200,794 A | 4/1993 | Nishiguma et al. |
| 5,218,594 A | 6/1993 | Tanno |
| 5,239,178 A | 8/1993 | Dernidinger et al. |
| 5,244,636 A | 9/1993 | Walt et al. |
| 5,283,777 A | 2/1994 | Tanno et al. |
| 5,291,006 A | 3/1994 | Nishiguma et al. |
| 5,291,027 A | 3/1994 | Kita et al. |
| 5,300,764 A | 4/1994 | Hoshino et al. |
| 5,307,332 A | 4/1994 | Tinet |
| 5,310,686 A | 5/1994 | Sawyers et al. |
| 5,329,352 A | 7/1994 | Jacobsen |
| 5,342,790 A | 8/1994 | Levine et al. |
| 5,349,442 A | 9/1994 | Deason et al. |
| 5,352,582 A | 10/1994 | Lichtenwalter et al. |
| 5,364,797 A | 11/1994 | Olson et al. |
| 5,367,588 A | 11/1994 | Hill et al. |
| 5,372,783 A | 12/1994 | Lackie |
| 5,374,816 A | 12/1994 | Bianco |
| 5,374,818 A | 12/1994 | Bianco et al. |
| 5,388,173 A | 2/1995 | Glenn |
| 5,394,234 A | 2/1995 | Bianco et al. |
| 5,426,297 A | 6/1995 | Dunphy et al. |
| 5,432,329 A | 7/1995 | Colgate et al. |
| 5,442,433 A | 8/1995 | Hoshino et al. |
| 5,448,659 A | 9/1995 | Tsutsui et al. |
| 5,451,528 A | 9/1995 | Raymoure et al. |
| 5,455,178 A | 10/1995 | Fattinger |
| 5,461,475 A | 10/1995 | Lerner et al. |
| 5,465,176 A | 11/1995 | Bianco et al. |
| 5,468,649 A | 11/1995 | Shah et al. |
| 5,506,674 A | 4/1996 | Inoue et al. |
| 5,514,785 A | 5/1996 | Van Ness et al. |
| 5,528,045 A | 6/1996 | Hoffman et al. |
| 5,547,849 A | 8/1996 | Baer et al. |
| 5,559,613 A | 9/1996 | Deveaud-Pledran et al. |
| 5,585,639 A | 12/1996 | Dorsal et al. |
| 5,587,832 A | 12/1996 | Krause |
| 5,607,188 A | 3/1997 | Bahns et al. |
| 5,610,287 A | 3/1997 | Nikiforov et al. |
| 5,621,515 A | 4/1997 | Hoshino |
| 5,624,850 A | 4/1997 | Kumar et al. |
| 5,625,472 A | 4/1997 | Mizrahi et al. |
| 5,627,040 A | 5/1997 | Bierre et al. |
| 5,627,663 A | 5/1997 | Horan et al. |
| 5,633,724 A | 5/1997 | King et al. |
| 5,633,975 A | 5/1997 | Gary et al. |
| 5,663,790 A | 9/1997 | Ekstrom et al. |
| 5,667,976 A | 9/1997 | Van Ness et al. |
| 5,671,308 A | 9/1997 | Inoue et al. |
| 5,682,244 A * | 10/1997 | Barlow et al. ................ 356/417 |
| 5,712,912 A | 1/1998 | Tomko et al. |
| 5,721,435 A | 2/1998 | Troll |
| 5,729,365 A | 3/1998 | Sweatt |
| 5,736,330 A | 4/1998 | Fulton |
| 5,742,432 A | 4/1998 | Bianco |
| 5,745,615 A | 4/1998 | Atkins et al. |
| 5,745,617 A | 4/1998 | Starodubov et al. |
| 5,759,778 A | 6/1998 | Li et al. |
| 5,760,961 A | 6/1998 | Tompkin et al. |
| 5,766,956 A | 6/1998 | Groger et al. |
| 5,771,251 A | 6/1998 | Kringlebotn et al. |
| 5,776,694 A | 7/1998 | Sheiness et al. |
| 5,793,502 A | 8/1998 | Bianco et al. |
| 5,798,273 A | 8/1998 | Shuler et al. |
| 5,799,231 A | 8/1998 | Gates et al. |
| 5,801,857 A | 9/1998 | Heckenkamp et al. |
| 5,804,384 A | 9/1998 | Muller et al. |
| 5,812,272 A | 9/1998 | King et al. |
| 5,822,472 A | 10/1998 | Danielzik et al. |
| 5,824,478 A | 10/1998 | Muller |
| 5,824,557 A | 10/1998 | Burke et al. |
| 5,830,622 A | 11/1998 | Canning et al. |
| 5,831,698 A | 11/1998 | Depp et al. |
| 5,837,475 A | 11/1998 | Dorsal et al. |
| 5,837,552 A | 11/1998 | Cotton et al. |
| 5,841,555 A | 11/1998 | Bianco et al. |

| Patent | Date | Inventor |
|---|---|---|
| 5,846,737 A | 12/1998 | Kang |
| 5,874,187 A | 2/1999 | Colvin et al. |
| 5,881,197 A | 3/1999 | Dong et al. |
| 5,895,750 A | 4/1999 | Mushahwar et al. |
| 5,922,550 A | 7/1999 | Everhart et al. |
| 5,922,617 A | 7/1999 | Wang et al. |
| 5,925,562 A | 7/1999 | Nova et al. |
| 5,925,878 A | 7/1999 | Challener |
| 5,945,679 A | 8/1999 | Dorsal et al. |
| 5,972,542 A | 10/1999 | Starodubov |
| 5,976,896 A | 11/1999 | Kumar et al. |
| 5,981,166 A | 11/1999 | Mandecki |
| 5,986,838 A | 11/1999 | Thomas, III |
| 5,989,923 A | 11/1999 | Lowe et al. |
| 5,998,796 A | 12/1999 | Liu et al. |
| 6,001,510 A | 12/1999 | Meng et al. |
| 6,005,691 A | 12/1999 | Grot et al. |
| 6,017,754 A | 1/2000 | Chesnut et al. |
| 6,025,129 A | 2/2000 | Nova et al. |
| 6,025,283 A | 2/2000 | Roberts |
| 6,027,694 A * | 2/2000 | Boulton et al. ............... 422/102 |
| 6,030,581 A | 2/2000 | Virtanen |
| 6,035,082 A | 3/2000 | Murphy et al. |
| 6,036,807 A | 3/2000 | Brongers |
| 6,043,880 A | 3/2000 | Andrews et al. |
| 6,046,925 A | 4/2000 | Tsien et al. |
| 6,049,727 A | 4/2000 | Crothall |
| 6,057,107 A | 5/2000 | Fulton |
| 6,060,256 A | 5/2000 | Everhart et al. |
| 6,067,167 A | 5/2000 | Atkinson et al. |
| 6,067,392 A | 5/2000 | Wakami et al. |
| 6,078,048 A | 6/2000 | Stevens et al. |
| 6,084,995 A | 7/2000 | Clements et al. |
| 6,087,186 A | 7/2000 | Cargill et al. |
| 6,096,496 A | 8/2000 | Frankel |
| 6,096,596 A | 8/2000 | Gonzalez |
| 6,097,485 A | 8/2000 | Lievan |
| 6,103,535 A | 8/2000 | Pilevar et al. |
| 6,118,127 A | 9/2000 | Liu et al. |
| 6,128,077 A | 10/2000 | Jovin et al. |
| 6,137,931 A | 10/2000 | Ishikawa et al. |
| 6,143,247 A | 11/2000 | Sheppard |
| 6,156,501 A | 12/2000 | McGall et al. |
| 6,159,748 A | 12/2000 | Hechinger |
| 6,160,240 A | 12/2000 | Momma et al. |
| 6,160,656 A | 12/2000 | Mossberg et al. |
| 6,164,548 A | 12/2000 | Curiel |
| 6,165,592 A | 12/2000 | Berger et al. |
| 6,165,648 A | 12/2000 | Colvin et al. |
| 6,174,648 B1 | 1/2001 | Terao et al. |
| 6,194,563 B1 | 2/2001 | Cruickshank |
| 6,204,969 B1 | 3/2001 | Jang |
| 6,214,560 B1 | 4/2001 | Yguerabide et al. |
| 6,218,194 B1 | 4/2001 | Lyndin et al. |
| 6,221,579 B1 | 4/2001 | Everhart et al. |
| 6,229,635 B1 | 5/2001 | Wulf |
| 6,229,827 B1 | 5/2001 | Fernald et al. |
| 6,229,941 B1 | 5/2001 | Yoon et al. |
| 6,982,996 B1 | 5/2001 | Bailey et al. |
| 6,242,056 B1 * | 6/2001 | Spencer et al. ............... 427/512 |
| 6,259,450 B1 | 7/2001 | Chiabrera et al. |
| 6,268,128 B1 | 7/2001 | Collins et al. |
| 6,277,628 B1 | 8/2001 | Johann et al. |
| 6,284,459 B1 | 9/2001 | Nova et al. |
| 6,285,806 B1 | 9/2001 | Kersey et al. |
| 6,288,220 B1 | 9/2001 | Kambara et al. |
| 6,292,282 B1 | 9/2001 | Mossberg et al. |
| 6,292,319 B1 | 9/2001 | Thomas, III |
| 6,301,047 B1 | 10/2001 | Hoshino et al. |
| 6,304,263 B1 | 10/2001 | Chiabrera et al. |
| 6,306,587 B1 | 10/2001 | Royer et al. |
| 6,309,601 B1 | 10/2001 | Juncosa et al. |
| 6,312,961 B1 | 11/2001 | Voirin |
| 6,313,771 B1 | 11/2001 | Munroe et al. |
| 6,314,220 B1 | 11/2001 | Mossberg et al. |
| 6,319,668 B1 | 11/2001 | Nova et al. |
| 6,321,007 B1 | 11/2001 | Sanders |
| 6,322,932 B1 | 11/2001 | Colvin et al. |
| RE37,473 E | 12/2001 | Challener |
| 6,329,963 B1 | 12/2001 | Chiabrera et al. |
| 6,331,273 B1 | 12/2001 | Nova et al. |
| 6,340,588 B1 | 1/2002 | Nova et al. |
| 6,352,854 B1 | 3/2002 | Nova et al. |
| 6,355,198 B1 | 3/2002 | Kim et al. |
| 6,355,432 B1 | 3/2002 | Fodor et al. |
| 6,356,681 B1 | 3/2002 | Chen et al. |
| 6,359,734 B1 | 3/2002 | Staub et al. |
| 6,361,958 B1 | 3/2002 | Shieh et al. |
| 6,363,097 B1 | 3/2002 | Linke et al. |
| 6,371,370 B2 | 4/2002 | Sadler |
| 6,372,428 B1 | 4/2002 | Nova et al. |
| 6,383,754 B1 * | 5/2002 | Kaufman et al. ............... 435/6 |
| 6,391,562 B2 | 5/2002 | Kambara et al. |
| 6,395,558 B1 | 5/2002 | Duveneck et al. |
| 6,399,295 B1 | 6/2002 | Kaylor et al. |
| 6,399,935 B1 | 6/2002 | Jovin et al. |
| 6,403,320 B1 | 6/2002 | Read et al. |
| 6,406,841 B1 | 6/2002 | Lee et al. |
| 6,406,848 B1 | 6/2002 | Bridgham et al. |
| 6,416,714 B1 | 7/2002 | Nova et al. |
| 6,416,952 B1 | 7/2002 | Pirrung et al. |
| 6,417,010 B1 | 7/2002 | Cargill et al. |
| 6,428,707 B1 | 8/2002 | Berg et al. |
| 6,428,957 B1 | 8/2002 | Delenstarr |
| 6,429,022 B1 | 8/2002 | Kunz et al. |
| 6,433,849 B1 | 8/2002 | Lowe |
| 6,436,651 B1 | 8/2002 | Everhart et al. |
| 6,440,667 B1 | 8/2002 | Fodor et al. |
| 6,456,762 B1 | 9/2002 | Nishiki et al. |
| RE37,891 E | 10/2002 | Collins et al. |
| 6,462,770 B1 | 10/2002 | Cline |
| 6,489,606 B1 | 12/2002 | Kersey et al. |
| 6,496,287 B1 | 12/2002 | Seiberle et al. |
| 6,506,342 B1 | 1/2003 | Frankel |
| 6,515,753 B2 | 2/2003 | Maher et al. |
| 6,522,406 B1 | 2/2003 | Rovira et al. |
| 6,524,793 B1 | 2/2003 | Chandler et al. |
| 6,533,183 B2 | 3/2003 | Aasmul |
| 6,542,673 B1 | 4/2003 | Holter et al. |
| 6,544,739 B1 | 4/2003 | Fodor et al. |
| 6,545,758 B1 | 4/2003 | Sandstrom |
| 6,560,017 B1 | 5/2003 | Bianco |
| 6,565,770 B1 | 5/2003 | Mayer et al. |
| 6,576,424 B2 | 6/2003 | Fodor et al. |
| 6,578,712 B2 | 6/2003 | Lawandy |
| 6,592,036 B2 | 7/2003 | Sadler . |
| 6,594,421 B1 | 7/2003 | Johnson et al. |
| 6,609,728 B1 | 8/2003 | Voerman et al. |
| 6,613,581 B1 | 9/2003 | Wada et al. |
| 6,618,342 B1 | 9/2003 | Johnson et al. |
| 6,622,916 B1 | 9/2003 | Bianco |
| 6,628,439 B2 | 9/2003 | Shiozawa et al. |
| 6,632,655 B1 | 10/2003 | Mehta et al. |
| 6,635,470 B1 | 10/2003 | Vann |
| 6,635,863 B1 | 10/2003 | Nihommori et al. |
| 6,646,243 B2 | 11/2003 | Pirrung et al. |
| 6,657,758 B1 | 12/2003 | Garner |
| 6,660,147 B1 * | 12/2003 | Woudenberg et al. ....... 204/455 |
| 6,678,429 B2 | 1/2004 | Mossberg et al. |
| RE38,430 E | 2/2004 | Rosenstein |
| 6,689,316 B1 | 2/2004 | Blyth et al. |
| 6,692,031 B2 | 2/2004 | McGrew |
| 6,692,912 B1 | 2/2004 | Boles et al. |
| 6,874,639 B2 | 4/2005 | Lawandy |
| 6,881,789 B2 * | 4/2005 | Bosse ....................... 525/54.1 |
| 6,892,001 B2 | 5/2005 | Ohta et al. |

| | | |
|---|---|---|
| 6,905,885 B2 | 6/2005 | Colston et al. |
| 6,908,737 B2 * | 6/2005 | Ravkin et al. ........... 435/6 |
| 7,092,160 B2 | 8/2006 | Putnam et al. |
| 7,106,513 B2 | 9/2006 | Moon et al. |
| 7,126,755 B2 | 10/2006 | Moon et al. |
| 2001/0007775 A1 | 7/2001 | Seul et al. |
| 2002/0000471 A1 | 1/2002 | Aasmul et al. |
| 2002/0006664 A1 | 1/2002 | Sabatini |
| 2002/0021003 A1 | 2/2002 | McGrew |
| 2002/0022273 A1 | 2/2002 | Empedocles et al. |
| 2002/0025534 A1 | 2/2002 | Goh et al. |
| 2002/0031783 A1 * | 3/2002 | Empedocles et al. ......... 435/7.1 |
| 2002/0034747 A1 | 3/2002 | Bruchez |
| 2002/0039732 A1 | 4/2002 | Bruchez |
| 2002/0074513 A1 | 6/2002 | Abel et al. |
| 2002/0084329 A1 | 7/2002 | Kaye et al. |
| 2002/0090650 A1 | 7/2002 | Empedocles et al. |
| 2002/0094528 A1 | 7/2002 | Salafsky |
| 2002/0097658 A1 | 7/2002 | Worthington et al. |
| 2002/0155490 A1 | 10/2002 | Skinner et al. |
| 2002/0197456 A1 * | 12/2002 | Pope ........... 428/209 |
| 2003/0008323 A1 | 1/2003 | Ravkin |
| 2003/0021003 A1 | 1/2003 | Ono |
| 2003/0032203 A1 | 2/2003 | Sabatini et al. |
| 2003/0077038 A1 | 4/2003 | Murashima |
| 2003/0082568 A1 * | 5/2003 | Phan et al. ........ 435/6 |
| 2003/0082587 A1 * | 5/2003 | Seul et al. ........ 435/6 |
| 2003/0129654 A1 | 7/2003 | Ilya Ravkin et al. |
| 2003/0138208 A1 | 7/2003 | Pawlak et al. |
| 2003/0142704 A1 | 7/2003 | Lawandy |
| 2003/0142713 A1 | 7/2003 | Lawandy |
| 2003/0153006 A1 | 8/2003 | Washizu et al. |
| 2003/0162296 A1 | 8/2003 | Lawandy |
| 2003/0203390 A1 | 10/2003 | Kaye et al. |
| 2003/0228610 A1 | 12/2003 | Seul |
| 2004/0047030 A1 | 3/2004 | MacAuley |
| 2004/0075907 A1 | 4/2004 | Moon |
| 2004/0100636 A1 | 5/2004 | Somekh et al. |
| 2004/0125370 A1 | 7/2004 | Montagu |
| 2004/0125424 A1 | 7/2004 | Moon et al. |
| 2004/0126875 A1 | 7/2004 | Putnam et al. |
| 2004/0132205 A1 | 7/2004 | Moon |
| 2004/0170356 A1 | 9/2004 | Iazikov |
| 2004/0175842 A1 | 9/2004 | Roitman et al. |
| 2004/0209376 A1 | 10/2004 | Natan et al. |
| 2004/0233485 A1 | 11/2004 | Moon et al. |
| 2004/0263923 A1 | 12/2004 | Moon |
| 2005/0042764 A1 | 2/2005 | Sailor et al. |
| 2005/0220408 A1 | 10/2005 | Putnam et al. |
| 2005/0227252 A1 | 10/2005 | Moon et al. |
| 2005/0270603 A1 | 12/2005 | Putnam |
| 2006/0023310 A1 | 2/2006 | Putnam et al. |
| 2006/0028727 A1 | 2/2006 | Moon et al. |
| 2006/0057729 A1 | 3/2006 | Moon et al. |
| 2006/0063271 A1 | 3/2006 | Putnam et al. |
| 2006/0071075 A1 | 4/2006 | Moon et al. |
| 2006/0072177 A1 | 4/2006 | Putnam et al. |
| 2006/0118630 A1 | 6/2006 | Kersey et al. |
| 2006/0119913 A1 | 6/2006 | Moon |
| 2006/0132877 A1 | 6/2006 | Kersey |
| 2006/0134324 A1 | 6/2006 | Putnam et al. |
| 2006/0139635 A1 | 6/2006 | Kersey et al. |
| 2006/0160208 A1 | 7/2006 | Putnam et al. |
| 2007/0121181 A1 | 5/2007 | Moon |

FOREIGN PATENT DOCUMENTS

| | | |
|---|---|---|
| DE | 2416652 | 10/1975 |
| EP | 0 395 300 | 10/1990 |
| EP | 0 485 803 | 5/1992 |
| EP | 0 508 257 | 10/1992 |
| EP | 0 723 149 | 7/1996 |
| EP | 0 798 573 A1 | 10/1997 |
| EP | 0 911 667 A1 | 4/1999 |
| EP | 0 916 981 | 5/1999 |
| EP | 0 972 817 A1 | 1/2000 |
| EP | 1 182 054 A2 | 2/2002 |
| EP | 1 219 979 A1 | 7/2002 |
| GB | 2 118 189 | 10/1983 |
| GB | 2 129 551 | 5/1984 |
| GB | 2 138 821 | 10/1984 |
| GB | 2 299 235 | 9/1996 |
| GB | 2 306 484 | 5/1997 |
| GB | 2 319 838 | 6/1998 |
| GB | 2 372 100 | 8/2002 |
| JP | 01047950 | 2/1989 |
| JP | 08102544 | 4/1996 |
| JP | 10166075 | 6/1998 |
| JP | 11-119029 | 4/1999 |
| JP | 2000-035521 | 2/2000 |
| JP | 00249706 | 9/2000 |
| WO | WO 91/06496 | 5/1991 |
| WO | WO 93/09668 | 5/1993 |
| WO | WO 94/28119 | 12/1994 |
| WO | WO 96/24061 | 8/1996 |
| WO | WO 96/36436 A1 | 11/1996 |
| WO | WO 97/12680 | 4/1997 |
| WO | WO 97/15690 | 5/1997 |
| WO | WO 97/17258 | 5/1997 |
| WO | WO 97/31282 | 8/1997 |
| WO | WO 97/34171 | 9/1997 |
| WO | WO 98/24549 | 1/1998 |
| WO | WO 98/04740 | 2/1998 |
| WO | WO 99/02266 | 1/1999 |
| WO | WO 99/09042 | 2/1999 |
| WO | WO 99/32654 | 7/1999 |
| WO | WO 99/42209 | 8/1999 |
| WO | WO 00/08443 | 2/2000 |
| WO | WO 00/37914 | 6/2000 |
| WO | WO-00/37914 | 6/2000 |
| WO | WO-00/37969 | 6/2000 |
| WO | WO 00/37969 | 6/2000 |
| WO | WO 00/39617 | 7/2000 |
| WO | WO 00/61198 | 10/2000 |
| WO | WO 01/58583 A1 | 8/2001 |
| WO | WO 01/71322 A2 | 9/2001 |
| WO | WO-01/78889 A2 | 10/2001 |
| WO | WP 01/90225 | 11/2001 |
| WO | WO 02/059306 A2 | 8/2002 |
| WO | WO-02/059306 A2 | 8/2002 |
| WO | WO 03/061983 | 7/2003 |
| WO | WO 2004/019276 A1 | 3/2004 |
| WO | WO 2004/024328 | 3/2004 |
| WO | WO 2004/025561 | 3/2004 |
| WO | WO 2004/025562 | 3/2004 |
| WO | WO 2004/025563 A1 | 3/2004 |
| WO | WO 2004/066210 | 8/2004 |
| WO | WO 2005/026729 A3 | 3/2005 |
| WO | WO 2005/027031 A2 | 3/2005 |
| WO | WO 2005/029047 A2 | 3/2005 |
| WO | WO 2005/033681 A1 | 4/2005 |
| WO | WO 2005/050207 A3 | 6/2005 |
| WO | WO 2005/079544 A2 | 9/2005 |
| WO | WO 2006/020363 A2 | 2/2006 |
| WO | WO 2006/055735 A2 | 5/2006 |
| WO | WO 2006/055736 A1 | 5/2006 |
| WO | WO 2006/076053 A1 | 7/2006 |

OTHER PUBLICATIONS

Curriculum Vitae of Mark O. Worthington, www.lightbyte.com/MarkWorthington. html, printed: Jan. 5, 2004.

Replication and Duplication—News & Technology, "Ben Beune Patent Licensing Director of Philips IP&S", Jan.-Feb. 2002, Optical Disc Systems . . . (continued).

Angel Strategies, "Burnstein Technologies, Inc.", Angel Strategies Tombstone, www.angelstrategies.com, Rev(1.0/021010).

V&P Scientific, "Compact Disc Arrayer" www.vp-scientific.com/cd_arrayer.htm, printed: Nov. 17, 2003.

Jain KK, Nanodiagnostics: application of nanotechnology in molecular diagnostics, Expert Review of Molecular Diagnostics 3(2):153-161 (2003), XP008038849.

Othonos, X. Lee; Superimposed Multiple Bragg Gratings, Nov. 10, 1994, vol. 30, No. 23.

Po Ki Yuen, Microbarcode Sorting Device; Science & Technology, Corning Incorporated, Corning, New York 14831-0007, USA.

International Search Report and Preliminary Examination Report for International Application No. PCT/US2003/26315.

International Search Report and Written Opinion for International Application No. PCT/US2003/26316.

International Search Report for International Application No. PCT/US2003/28862.

International Search Report for International Application No. PCT/US2003/28874.

International Search Report for International Application No. PCT/US2003/28875.

International Search Report for International Application No. PCT/US2003/28887.

International Search Report for International Application No. PCT/US2003/28890.

International Search Report and Preliminary Examinatoin for International Application No. PCT/US2003/29164.

International Search Report for International Application No. PCT/US2003/29244.

International Search Report and Written Opinion for International Application No. PCT/US2004/01685.

International Search Report and Written Opinion for International Application No. PCT/US2004/30037.

International Search Report and Written Opinion for International Application No. PCT/US2004/30038.

International Search Report and Written Opinion for International Application No. PCT/US2004/30300.

International Search Report and Written Opinion for International Application No. PCT/US2004/32084.

International Search Report and Written Opinion for International Application No. PCT/US2004/38416.

International Search Report and Written Opinion for International Application No. PCT/US2005/05743.

International Search Report and Written Opinion for International Application No. PCT/US2005/05745.

International Search Report and Written Opinion for International Application No. PCT/US2005/26289.

International Search Report and Written Opinion for International Application No. PCT/US2005/33694.

International Search Report and Written Opinion for International Application No. PCT/US2005/41730.

International Search Report and Written Opinion for International Application No. PCT/US2005/41731.

"Electronically Scanned Confocal Imaging System"; IBM Technical Disclosure Bulletin; vol. 36; No. 06B; Jun. 1993; pp. 261-262.

Hideki Kambara; Recent Progress In fluorescent DNA Analyzers and Methods; Current Topics in Analytical checmistry; vol. 1, (1993) pp. 21-36.

G. Kakarantzas et al.;"Transmission Filters Based on periodically Micro-tapered Fibre"; CLE0/2000/Friday Morning; 8:45 a.m.; pp. 574-575.

Michael C. Needels et al.; "Generation and Screening of an Oligonucleotide-Encoded Synthetic Peptide Library"; Proc Natl. Acad. Sci. USA, vol. 90;pp. 10700-10704, Nov. 1993.

W.R. Rigby; "An Anodizing Process for the Production of Inorganic Microfiltration Membranes"; 2436Transactions of the Institute of Metal Finishing;68(Aug. 1990),Part 3 p. 95-98.

Nicewarner-pena S R, et all, "Submicrometer metallic barcodes", Science, American Association for the Advancement of Science, US, vol. 294. No. 5540, Oct. 5, 2001, pp. 137-141.

Vander Lugt, Design Relationships For Holographic Memories; Applied Optics, vol. 12, No. 7, Jul. 1973.

Andrew Marshall; DNA Chips: Array of Possibilities; Nature Biotechnolgoy vol. 16 Jan. 1998.

Thomas Laurell; Enhanced Enzyme Activity in Silicon Integrated Enzyme Reactors Utilizing Porous Silicon as the Coupling Matrix; Sensor & Actuators B 31 (1996) 16-166.

Michael J. Kozal; Extensive Polymorphisms Observed in HIV-1 Clade B Protease Gene Using High-Density Oligonucleotide Arrays; Nature Medicine, vol. 2, No. 7, Jul. 1996.

Masato Mitsuhashi; Gene Manipulation on Plastic Plates; Nature, vol. 357, Jun. 11, 1992.

Replication & Duplication -News & Technology; Ben Benue Patent Licensing Director of Philips IP&S; Jan.-Feb. 2002.

V&P Scientific; Compact Disc Arrayer, Nov. 17, 2003.

de Beer et al., Forward-scattering degenerate four-wave mixing for sensitive absorption detection in microseparation systems coupling to micro-column liquid chromatography, Journal of Chromatography A. 811 (1998) 35-45.

Fonjallaz et al., Interferometric side diffraction technique for the characterisation of fiber gratings, 1999 OSA Conference, Sep. 23-25.

Kashyap R., Fiber Bragg Gratings, Academic Press, Ch. 9, pp. 430-433, 1999.

Kogelnik H, Coupled Wave Theory for Thick Hologram Gratings, The Bell System Technical Journal, 48(9):2909-2947 (1969).

Krug P., Measurement of index modulation along an optical fiber Bragg grating, Optics Letters, 20(17):1767-1769.

Leigh et al., Holographic Data Storage in Three-Dimensional Media, 1303-1311, Aug. 19669.

Shelia R. Nicerwarner-Pena, Submicrometer Metallic Barcodes, Oct. 5, 2001.

Ivan Oransky, Sequencing on Compact Disc? vol. 17/Issue 13/35/ Jun. 30, 2003.

Mark O. Worthington; Curriculum Vitae, Mar. 31, 2006.

Yoshinobu Kohara, DNA Probes on Beads Arrayed in a Capillary, 'Bead-Array',Exhibited High Hybridization Performance, Nucleic Acids Research, 2002, vol. 30. No. 15 e87.

Po Ki Yuen, Microbarcode Sorting Device; Science & Technology, Corning Incorporated, Corning, New York 14831-0007, USA, Jul. 10, 2003.

* cited by examiner 0.5D<T<1.5D 0.8D<T<1.2D

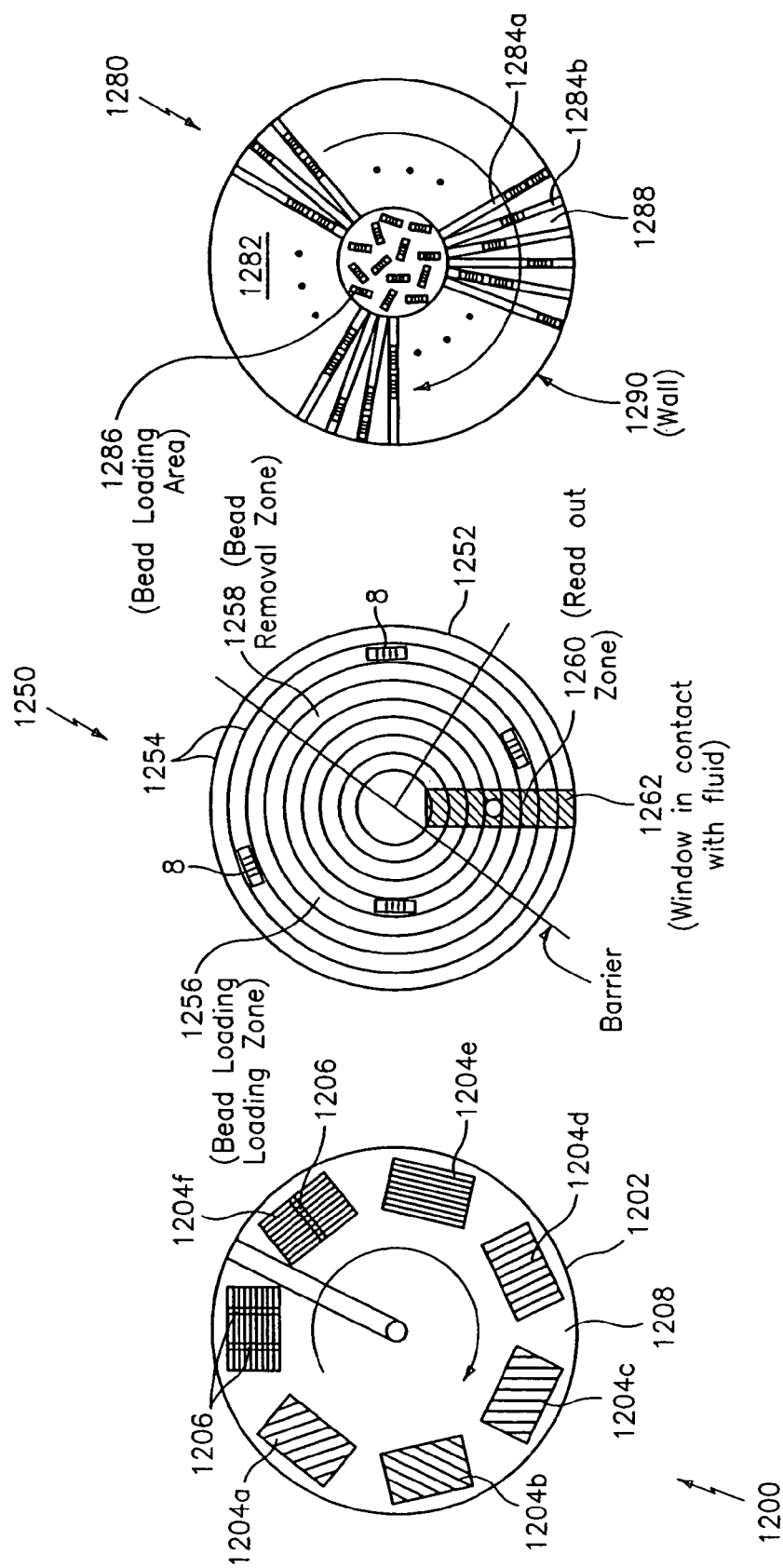

Illustration (a)      Illustration (b)

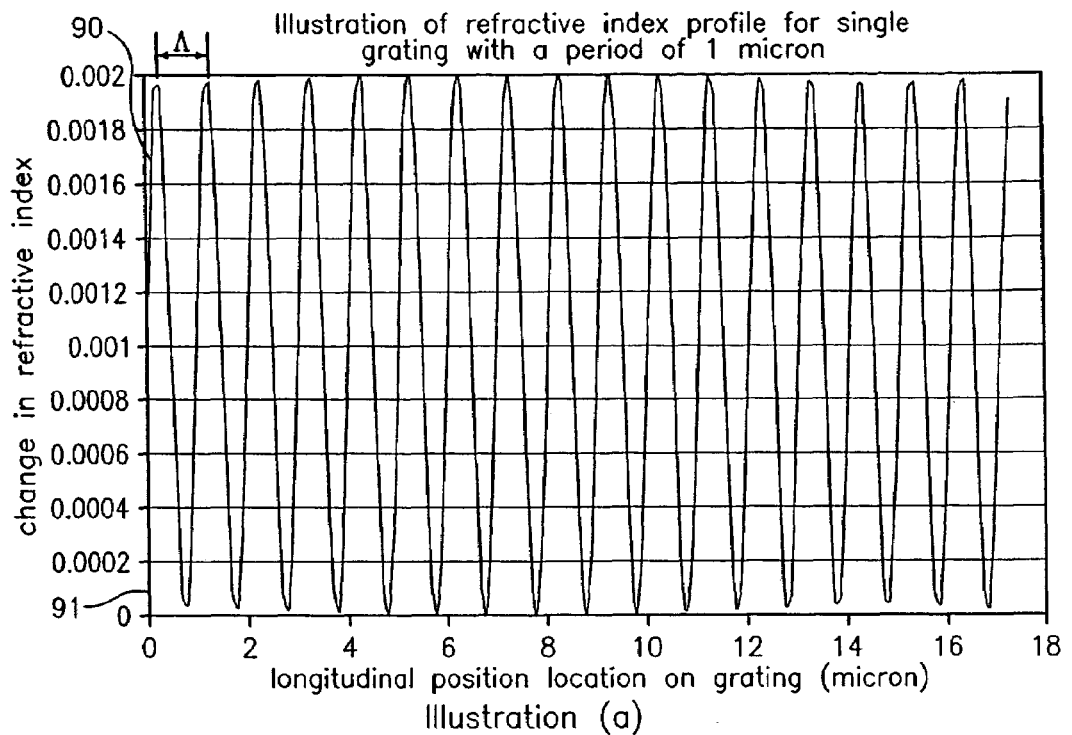
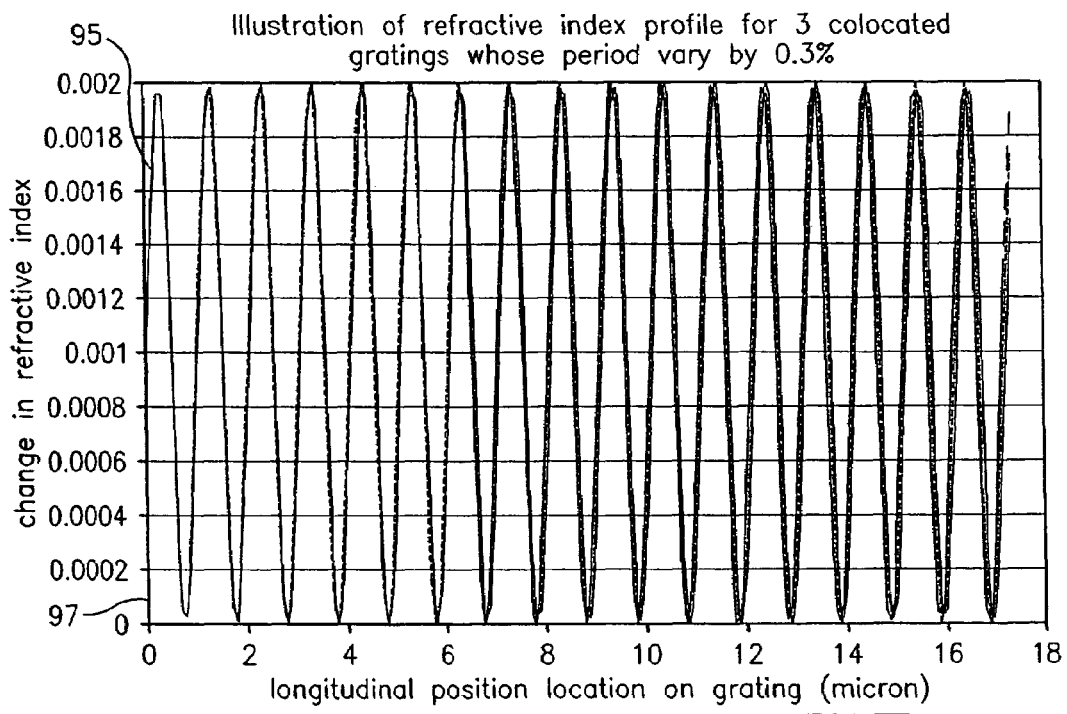
FIG. 27

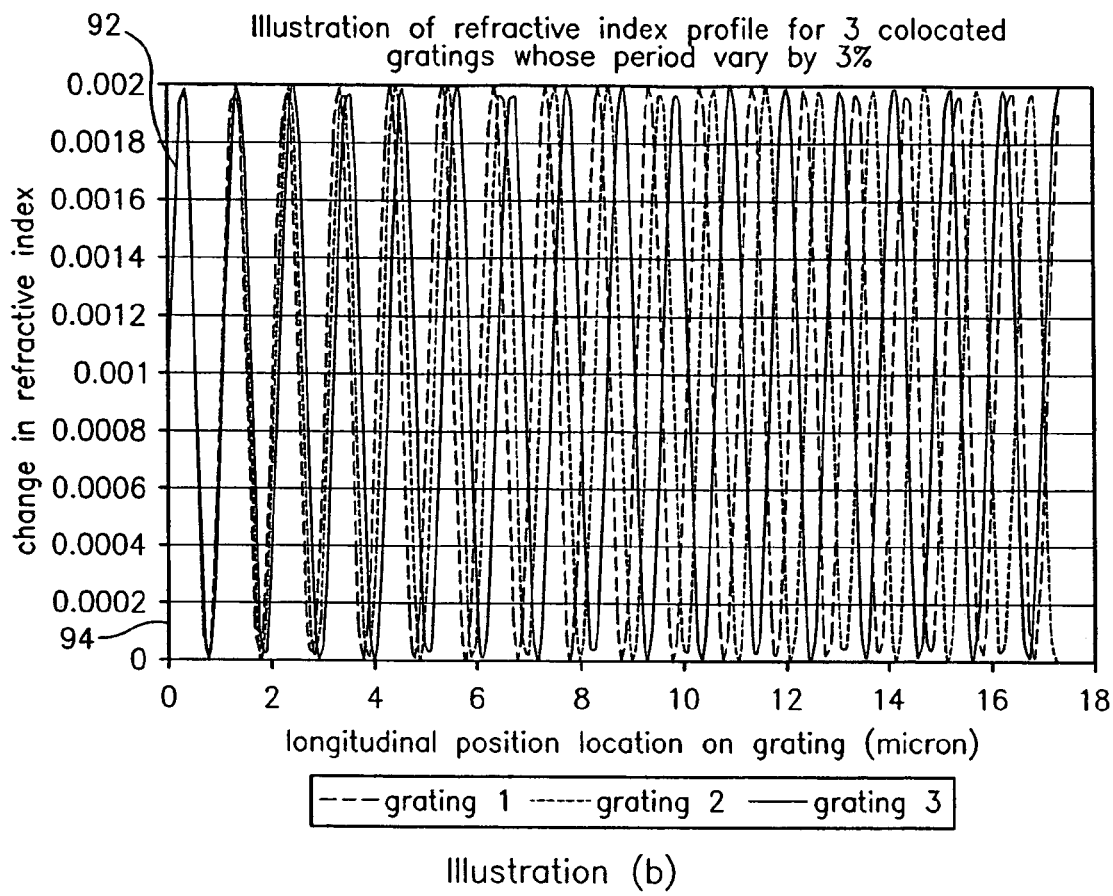
Illustration (b)
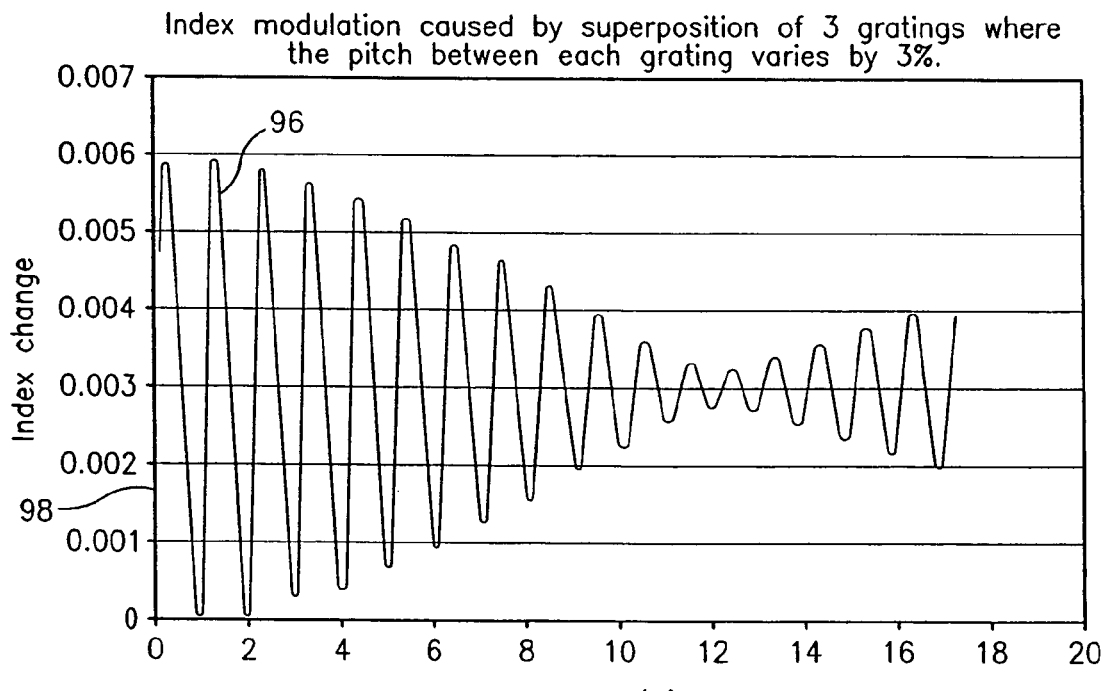
FIG. 27  Illustration (d)

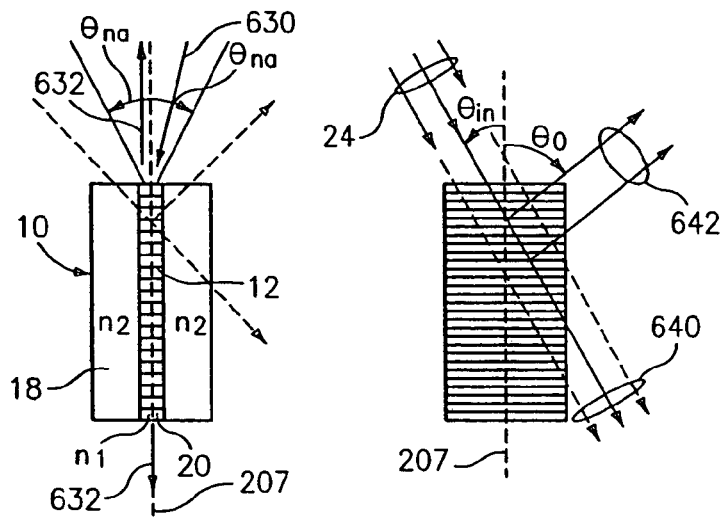
*FIG. 36*  *FIG. 37*
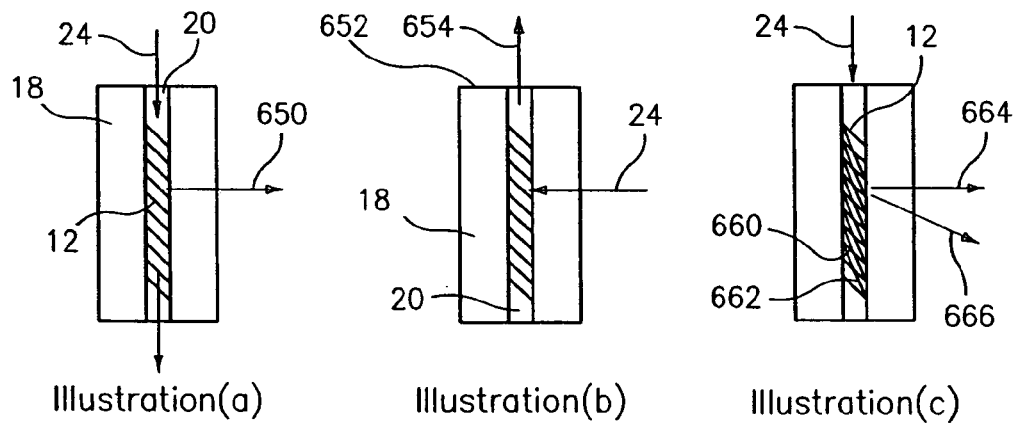
Illustration(a)  Illustration(b)  Illustration(c)
*FIG. 38*
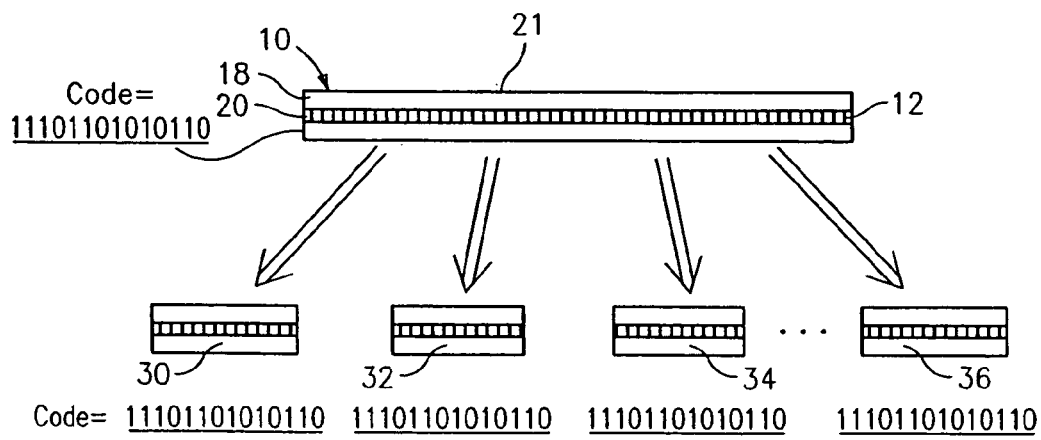
*FIG. 40*

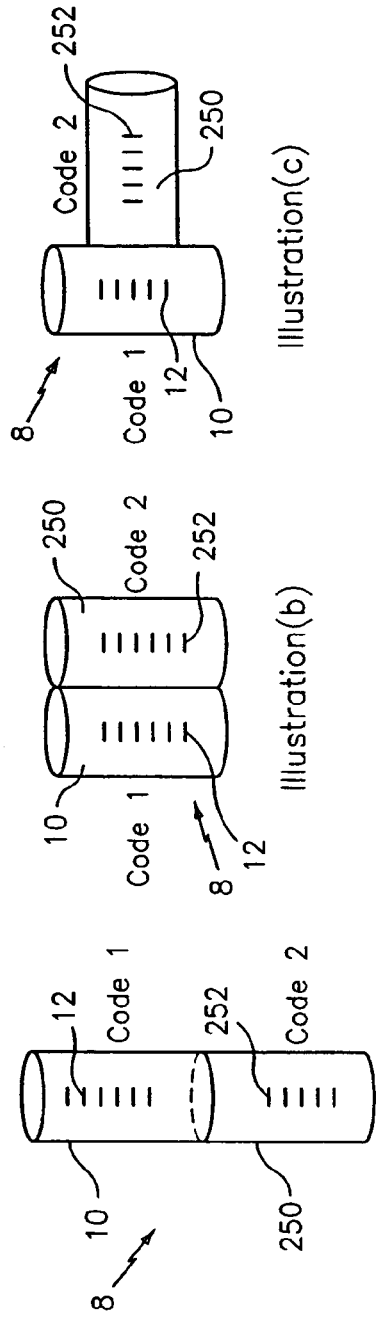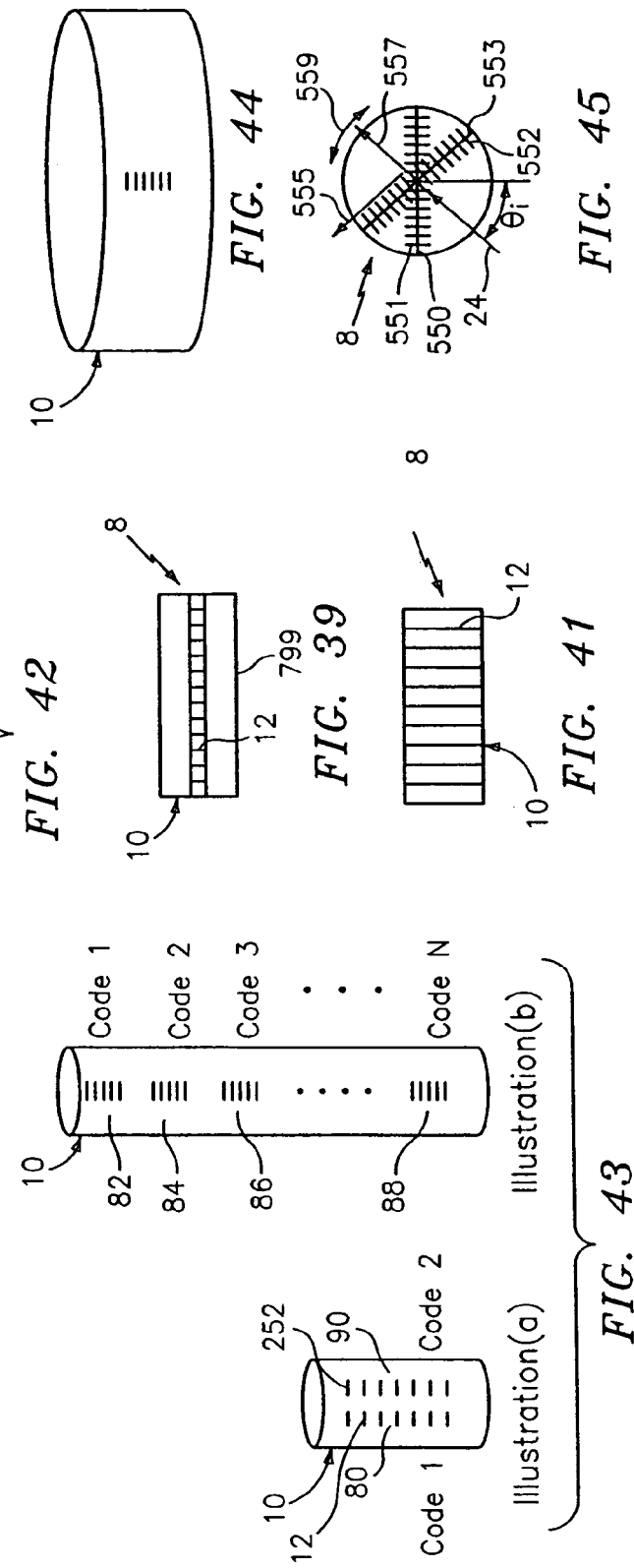

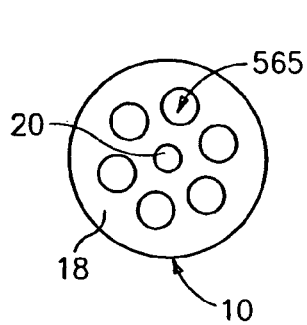
Illustration(a)
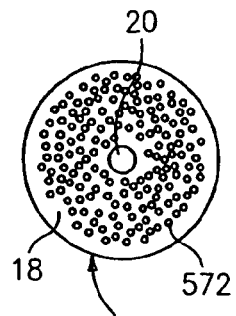
Illustration(b)
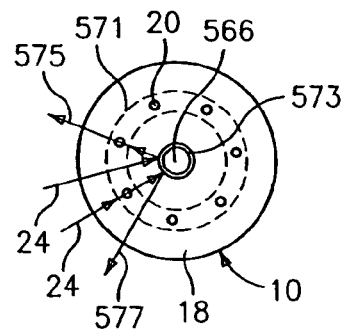
Illustration(c)
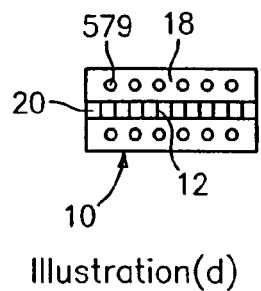
Illustration(d)
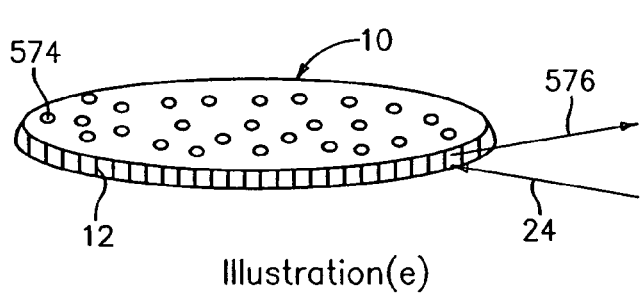
Illustration(e)
FIG. 46
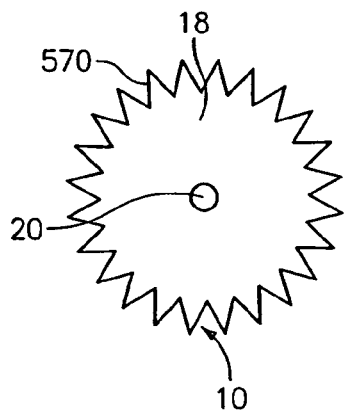
Illustration(a)
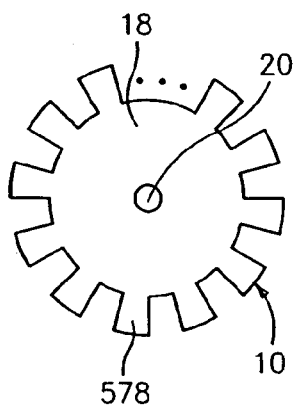
Illustration(b)
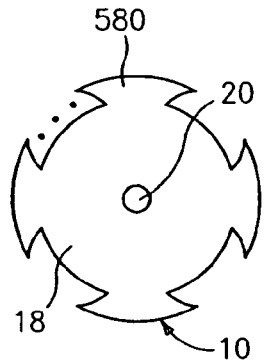
Illustration(c)
FIG. 47
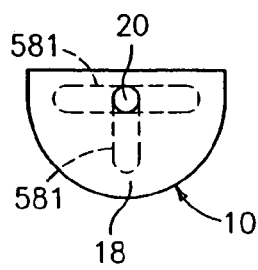
Illustration(a)
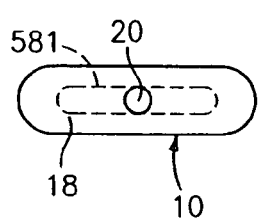
Illustration(b)
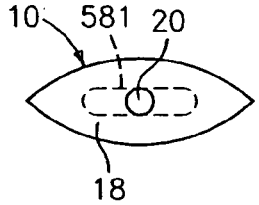
Illustration(c)
FIG. 48

METHOD AND APPARATUS FOR ALIGNING MICROBEADS IN ORDER TO INTERROGATE THE SAME

CROSS-REFERENCE TO RELATED APPLICATIONS

This application claims the benefit of U.S. Provisional Patent Applications, Ser. No. 60/410,541, filed Sep. 12, 2002, and is a continuation-in-part of U.S. patent application Ser. No. 10/645,689, filed Aug. 20, 2003, each of which are incorporated herein by reference in their entirety.

U.S. patent application Ser. No. 10/661,234 and application Ser. No. 10/661,082, filed contemporaneously herewith, contain subject matter related to that disclosed herein, which is incorporated by reference in its entirety.

BACKGROUND OF THE INVENTION

1. Technical Field

The present invention generally relates to a method and apparatus for processing information contained on microbeads, each microbead having an elongated body with a code embedded therein along a longitudinal axis thereof to be read by a code reading device; and more particularly to a method and apparatus for aligning the microbeads so the longitudinal axis thereof is in a fixed orientation relative to the code reading or other device.

2. Description of Related Art

Many industries have a need for uniquely identifiable objects or for the ability to uniquely identify objects, for sorting, tracking, and/or identification/tagging. Existing technologies, such as bar codes, electronic microchips/transponders, radio-frequency identification (RFID), and fluorescence and other optical techniques, are often inadequate. For example, existing technologies may be too large for certain applications, may not provide enough different codes, or cannot withstand harsh temperature, chemical, nuclear and/or electromagnetic environments.

Therefore, it would be desirable to obtain a coding element or platform that provides the capability of providing many codes (e.g., greater than 1 million codes), that can be made very small and/or that can withstand harsh environments.

Moreover, it would be desirable to provide a method and apparatus to position and align such coding elements so as to better sense the chemical content and correlate it in relation to the code to determine information about the process.

SUMMARY OF THE INVENTION

In its broadest sense, the present invention provides a new and unique method and apparatus for aligning new and unique coding elements or microbeads, wherein each microbead has an elongated body with a code embedded therein along a longitudinal axis thereof to be read by a code reading or other detection device. The method features the step of aligning the microbeads with a positioning device so the longitudinal axis of the microbeads is positioned in a fixed orientation relative to the code reading or other detection device.

The new and unique microbeads are not spherical, but instead have an elongated shape and may be cylindrical, cubic, rectangular, or any other elongated shape. The microbeads are typically composed of silica glass with some germanium and/or boron doped region or regions that are photosensitive to ultraviolet light. Coded microbeads are individually identifiable via a single or series of spatially overlapping pitches written into them. The microbeads may be used in many different processes. After such processing, the microbeads have a resulting chemical content on the surface of each bead that is sensed and correlated in relation to the code contained with the microbead to determine information about the process.

When used in an assay process, the microbeads are typically cylindrically (i.e. tubular) shaped glass beads and between 25 and 250 µm in diameter and between 100 and 500 µm long. They have a holographic code embedded in the central region of the bead, which is used to identify it from the rest of the beads in a batch of beads with many different DNA or other chemical probes. A cross reference is used to determine which probe is attached to which bead, thus allowing the researcher to correlate the chemical content on each bead with the measured fluorescence signal. Because the code consists of a diffraction grating 12 typically disposed along an axis of the microbead, there is a particular alignment required between the incident readout laser beam and the readout detector in two of the three rotational axes. In aeronautical terms, the two of the three rotational axes include the pitch of the microbead in the front-to-back direction and the yaw of the microbead in a side-to-side direction. The third axis, rotation about the center axis of the cylinder, is azimuthally symmetric and therefore does not require alignment. The third axis is analogous to the roll axis.

The invention provides a method for aligning the microbeads in the two rotational axes to a fixed orientation relative to an incident laser beam and a readout camera, otherwise known as the code camera. The invention further provides a method for rapidly aligning a large number of microbeads, between 1,000 and 1,000,000 microbeads or more, economically, and with the necessary tolerances. The method is flexible as it relates to the size of the microbeads and can be integrated into a fully automated system, which prepares the microbeads for rapid readout by an automated code-reading machine.

In one embodiment of the present invention, the positioning device includes a plate with a series of parallel grooves, which could have one of several different shapes, including square, rectangular, v-shaped, semi-circular, etc., as well as a flat bottom groove with tapered walls. The grooves are formed into an optically transparent medium such as borosilicate glass, fused silica, or plastic. The depth of the grooves will depend on the diameter of the microbead but generally they will be between 10 and 125 µm, but may larger as discussed hereinafter, depending on the application. The spacing of the grooves is most optimal when it is between 1 and 2 times the diameter of the microbead, providing for both maximum packing density as well as maximum probability that a microbead will fall into a groove. The width of grooves is most optimal when the gap between the microbead and the walls of the grooves is sufficiently small to prevent the microbeads from rotating within the grooves by more than a few degrees. The bottom of the groove must also be maintained flat enough to prevent the microbeads from rotating, by more than a few tenths of a degree, relative to the incident laser beam. Another critical aspect of the grooved plate is the optical quality of the grooves. To prevent excess scatter of the readout laser beam, which could lead to low contrast between the code signal and the background scatter, it is important that the grooves exhibit high optical quality. The beads can be read in the groove plate from below, on top of, or the side of the plate, depending on the application and type of microbead used.

Some advantages of the groove plate approach include:
Rapid simultaneous alignment of microbeads. Alignment rates ~1000's per second.
Once the microbeads are aligned, they can be read as many times as necessary to get a good reading or improve statistics.
Microbeads naturally fall into groove (presumably by capillary forces) at very high packing densities.
Microbeads can be mixed after reading then re-read to enhance the statistics of readout process.

In an alternative embodiment of the present invention, the positioning device may includes a tube having a bore for receiving, aligning and reading the microbeads.

Moreover, the present invention also provides an apparatus for aligning an optical identification element. The optical identification element having an optical substrate having at least a portion thereof with at least one diffraction grating disposed therein, the grating having at least one refractive index pitch superimposed at a common location, the grating providing an output optical signal when illuminated by an incident light signal, the optical output signal being indicative of a code, and the optical identification element being an elongated object with a longitudinal axis. The apparatus also having an alignment device which aligns the optical identification element such that said output optical signal is indicative of the code.

The present invention also provides an optical element capable of having many optically readable codes. The element has a substrate containing an optically readable composite diffraction grating having one or more collocated index spacing or pitches Λ. The invention allows for a high number of uniquely identifiable codes (e.g., millions, billions, or more). The codes may be digital binary codes and thus are digitally readable or may be other numerical bases if desired.

Also, the elements may be very small "microbeads" (or microelements or microparticles or encoded particles) for small applications (about 1-1000 microns), or larger "macroelements" for larger applications (e.g., 1-1000 mm or much larger). The elements may also be referred to as encoded particles or encoded threads. Also, the element may be embedded within or part of a larger substrate or object.

The code in the element is interrogated using free-space optics and can be made alignment insensitive.

The gratings (or codes) are embedded inside (including on or near the surface) of the substrate and may be permanent non-removable codes that can operate in harsh environments (chemical, temperature, nuclear, electromagnetic, etc.).

The code is not affected by spot imperfections, scratches, cracks or breaks in the substrate. In addition, the codes are spatially invariant. Thus, splitting or slicing an element axially produces more elements with the same code. Accordingly, when a bead is axially split-up, the code is not lost, but instead replicated in each piece.

The foregoing and other objects, features and advantages of the present invention will become more apparent in light of the following detailed description of exemplary embodiments thereof.

BRIEF DESCRIPTION OF THE DRAWING

The drawing is not drawn to scale and includes the following Figures:

FIGS. 19(a), (b) and (c) show embodiments of a disk cytometer in accordance with the invention.

FIG. 21 show an embodiment of a SU8 cylindrical grooved plate having 450×65 microns beads in accordance with the invention.

FIG. 27 illustrations (a)-(d) show graphs of different refractive index pitches and a summation graph, in accordance with the present invention.

FIGS. 36-37 are side views of an optical identification element where light is incident on an end face, in accordance with the present invention.

FIG. 38, illustrations (a)-(c), are side views of an optical identification element having a blazed grating, in accordance with the present invention.

FIG. 39 is a side view of an optical identification element having a coating, in accordance with the present invention.

FIG. 40 is a side view of whole and partitioned optical identification element, in accordance with the present invention.

FIG. 41 is a side view of an optical identification element having a grating across an entire dimension, in accordance with the present invention.

FIG. 42, illustrations (a)-(c), are perspective views of alternative embodiments for an optical identification element, in accordance with the present invention.

FIG. 43, illustrations (a)-(b), are perspective views of an optical identification element having multiple grating locations, in accordance with the present invention.

FIG. 44, is a perspective view of an alternative embodiment for an optical identification element, in accordance with the present invention.

FIG. 45 is a view an optical identification element having a plurality of gratings located rotationally around the optical identification element, in accordance with the present invention.

FIG. 46, illustrations (a)-(e), show various geometries of an optical identification element that may have holes therein, in accordance with the present invention.

FIG. 47, illustrations (a)-(c), show various geometries of an optical identification element that may have teeth thereon, in accordance with the present invention.

FIG. 48, illustrations (a)-(c), show various geometries of an optical identification element, in accordance with the present invention.

BEST MODE FOR CARRYING OUT THE INVENTION

Figure 1:
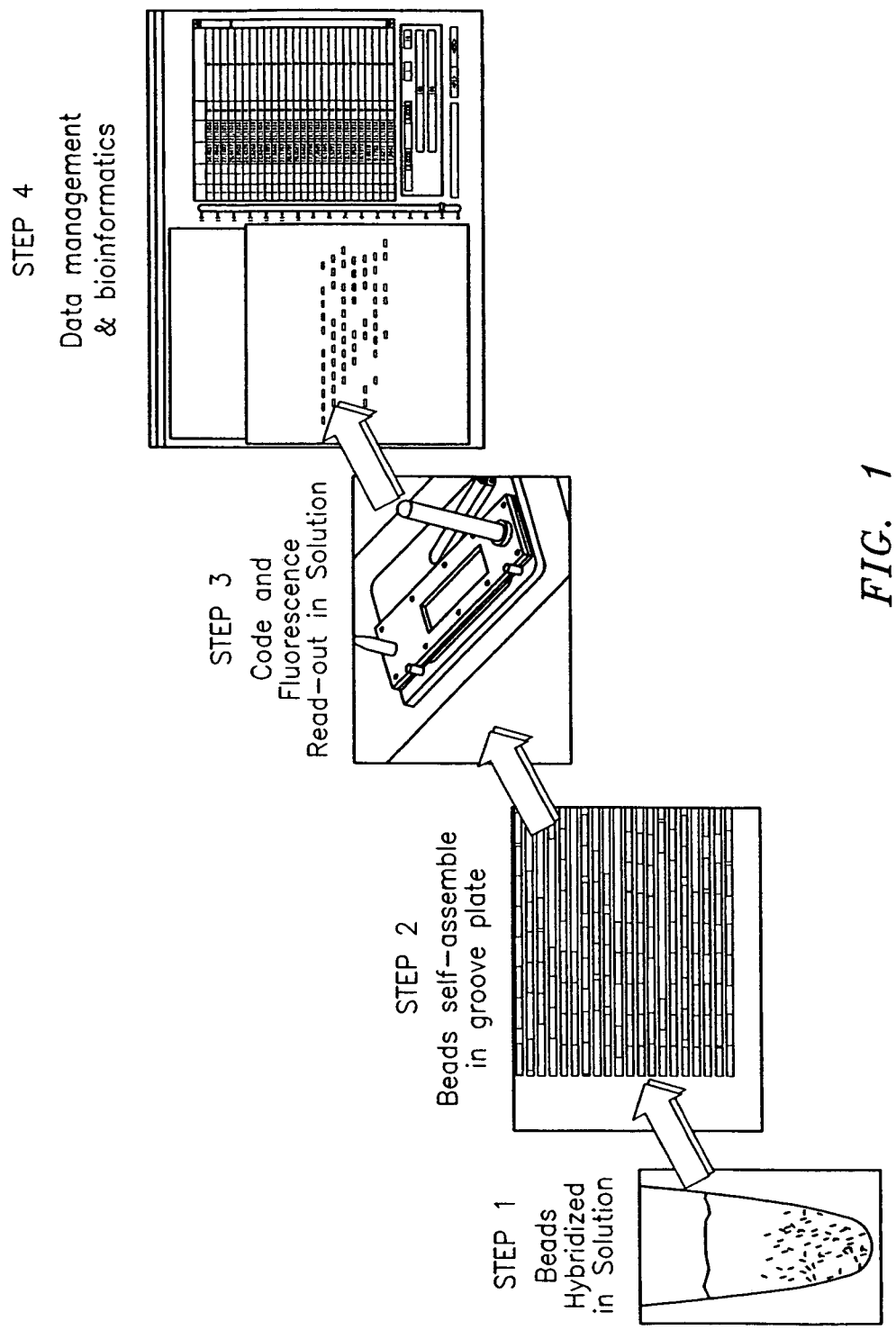
FIG. 1 shows the steps of a microbead platform assay process.

FIG. 1 shows, by way of example, steps of a microbead assay process which uses the microbead technology of the present invention. The steps of the assay process shown in FIG. 1 include a first step in which the microbeads are used in a solution; a second step in which the microbeads are aligned in a desired manner; a third step in which the code and florescence in and/or on the microbeads are read-out; and a fourth step in which the information related to the code and florescence is processed in relation to data management and bioinformatics. The present invention primarily relates to step 2 wherein the microbeads are uniquely aligned so the longitudinal axis of the microbeads is positioned in a fixed orientation relative to the code and florescence reading device, as well as relating to a lesser extent to step 3. It is important to note that the scope of the present invention is not intended to be limited to any particular type or kind of assay process or other process in which the microbead technology is used. The scope of the invention is intended to include embodiments in which the microbead technology of the present invention is used in many different processes.

Figure 2:
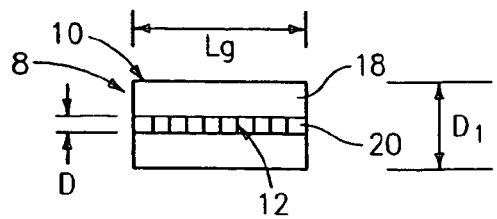
FIG. 2 is a side view of an optical identification element, in accordance with the present invention.

FIG. 2: The Microbead Element 8

FIG. 2 shows a diffraction grating-based optical identification element 8 (or encoded element or coded element) that comprises a known optical substrate 10, having an optical diffraction grating 12 disposed (or written, impressed, embedded, imprinted, etched, grown, deposited or otherwise formed) in the volume of or on a surface of the substrate 10 along the length or longitudinal axis L of the element 8, which is otherwise known hereinafter as the microbead. The grating 12 is a periodic or aperiodic variation in the effective refractive index and/or effective optical absorption of at least a portion of the substrate 10.

The optical identification element 8 described herein is the same as that described in Copending patent application Ser. No. 10/661,234, filed contemporaneously herewith, which is incorporated herein by reference in its entirety.

In particular, the substrate 10 has an inner region 20 where the grating 12 is located. The inner region 20 may be photo-sensitive to allow the writing or impressing of the grating 12. The substrate 10 has an outer region 18, which does not have the grating 12 therein.

The grating 12 is a combination of one or more individual spatial periodic sinusoidal variations (or components) in the refractive index that are collocated at substantially the same location on the substrate 10 along the length of the grating region 20, each having a spatial period (or pitch) Λ. The resultant combination of these individual pitches is the grating 12, comprising spatial periods (Λ1-Λn) each representing a bit in the code. Thus, the grating 12 represents a unique optically readable code, made up of bits, where a bit corresponds to a unique pitch Λ within the grating 12. Accordingly, for a digital binary (0-1) code, the code is determined by which spatial periods (Λ1-Λn) exist (or do not exist) in a given composite grating 12. The code or bits may also be determined by additional parameters (or additional degrees of multiplexing), and other numerical bases for the code may be used, as discussed herein and/or in the aforementioned patent application.

The grating 12 may also be referred to herein as a composite or collocated grating. Also, the grating 12 may be referred to as a "hologram", as the grating 12 transforms, translates, or filters an input optical signal to a predetermined desired optical output pattern or signal.

The substrate 10 has an outer diameter D1 and comprises silica glass ($SiO_2$) having the appropriate chemical composition to allow the grating 12 to be disposed therein or thereon. Other materials for the optical substrate 10 may be used if desired. For example, the substrate 10 may be made of any glass, e.g., silica, phosphate glass, borosilicate glass, or other glasses, or made of glass and plastic, or solely plastic. For high temperature or harsh chemical applications, the optical substrate 10 made of a glass material is desirable. If a flexible substrate is needed, plastic, rubber or polymer-based substrate may be used. The optical substrate 10 may be any material capable of having the grating 12 disposed in the grating region 20 and that allows light to pass through it to allow the code to be optically read.

The optical substrate 10 with the grating 12 has a length L and an outer diameter D1, and the inner region 20 diameter D. The length L can range from very small "microbeads" (or microelements, micro-particles, or encoded particles), about 1-1000 microns or smaller, to larger "macro beads" or "macroelements" for larger applications (about 1.0-1000 mm or greater). In addition, the outer dimension D1 can range from small (less than 1000 microns) to large (1.0-1000 mm and greater). Other dimensions and lengths for the substrate 10 and the grating 12 may be used.

The grating 12 may have a length Lg of about the length L of the substrate 10. Alternatively, the length Lg of the grating 12 may be shorter than the total length L of the substrate 10.

The outer region 18 is made of pure silica ($SiO_2$) and has a refractive index n2 of about 1.458 (at a wavelength of about 1553 nm), and the inner grating region 20 of the substrate 10 has dopants, such as germanium and/or boron, to provide a refractive index n1 of about 1.453, which is less than that of outer region 18 by about 0.005. Other indices of refraction n1,n2 for the grating region 20 and the outer region 18, respectively, may be used, if desired, provided the grating 12 can be impressed in the desired grating region 20. For example, the grating region 20 may have an index of refraction that is larger than that of the outer region 18 or grating region 20 may have the same index of refraction as the outer region 18 if desired.

Figure 3:
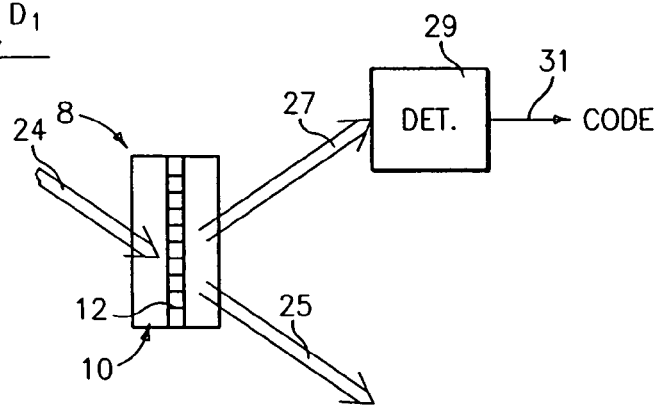
FIG. 3 is a top level optical schematic for reading a code in an optical identification element, in accordance with the present invention.

FIG. 3: The Code Reader or Detector 29

FIG. 3 shows a configuration for reading or detecting the code in the microbead 8 using a code reader or other detector device 29, which is used in step 3 of the process shown in FIG. 1. In operation, an incident light 24 of a wavelength λ, e.g., 532 nm from a known frequency doubled Nd:YAG laser or 632 nm from a known Helium-Neon laser, is incident on the grating 12 in the substrate 10. Any other input wavelength λ can be used if desired provided λ is within the optical transmission range of the substrate (discussed more herein and/or in the aforementioned patent application). A portion of the input light 24 passes straight through the grating 12, as indicated by a line 25. The remainder of the input light 24 is reflected by the grating 12, as indicated by a line 27 and provided to a detector 29. The output light 27 may be a plurality of beams, each having the same wavelength λ as the input wavelength λ and each having a different output angle indicative of the pitches (Λ1-Λn) existing in the grating 12. Alternatively, the input light 24 may be a plurality of wavelengths and the output light 27 may have a plurality of wavelengths indicative of the pitches (Λ1-Λn) existing in the grating 12. Alternatively, the output light may be a combination of wavelengths and output angles. The above techniques are discussed in more detail herein and/or in the aforementioned patent application.

The code reader or detector 29 has the necessary optics, electronics, software and/or firmware to perform the functions described herein. In particular, the detector reads the optical signal 27 diffracted or reflected from the grating 12 and determines the code based on the pitches present or the optical pattern, as discussed more herein or in the aforementioned patent application. An output signal indicative of the code is provided on a line 31.

Figure 4:
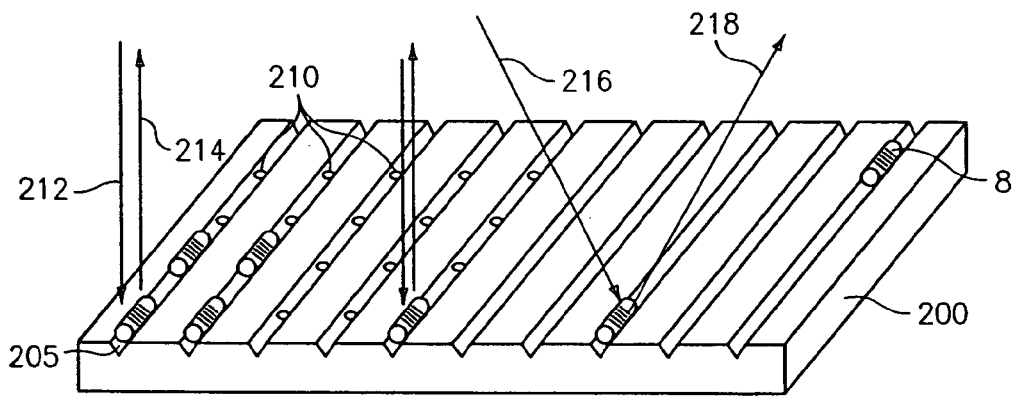
FIG. 4 is a perspective view of a grooved plate for use with an optical identification element, in accordance with the present invention.

FIG. 4: The Grooved Tray or Plate

FIG. 4 shows one embodiment of a positioning device 200 for aligning the microbeads 8 so the longitudinal axis of the microbeads is in a fixed orientation relative to the code reading or other detection device. The positioning device 200 is shown in the form of a tray or plate 200 having v-grooves 205 for align the microbeads 8 and is used in step 2 of the process shown in FIG. 1.

As shown, the microbead elements 8 are placed in the tray 200 with v-grooves 205 to allow the elements 8 to be aligned in a predetermined direction for illumination and reading/detection as discussed herein. Alternatively, the grooves 205 may have holes 210 that provide suction to keep the elements 8 in position.

Forming the Grooves in the Groove Plate

The grooves in the groove plate may be made in many different ways, including being formed by SU8 photoresistant material, mechanically machining; deep reactive ion etching; or injection molding. One advantage of the injection molding approach is that the plate can be manufactured in volume at relatively low cost, and disposed of after the information about the beads is gathered in the assay process. The groove plate may be made of glass, including fused silica, low fluorescence glass, boro silicate glass. Silicon is used because it is reflective so a reflective coating is typically not needed. Alternative, a mirror coating can be applied to the plate material to achieve the desired reflectivity.

Figure 5:
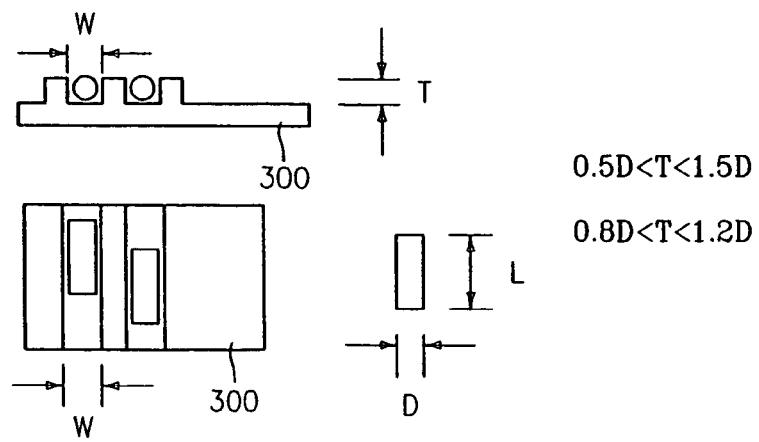
FIG. 5 is a diagram of the flat grooves and an example of the dimensionality thereof in accordance with the present invention.

FIG. 5: Flat Grooves

The scope of the invention is not intended to be limited to any particular groove shape. For example, FIG. 5 shows a diagram a plate 300 having flat grooves 302 instead of V-grooves as shown in FIG. 3. Some characteristics of the groove according to the present invention are as follows:

The groove width (w) should be at least as wide as the diameter of the bead (D) but not larger than D+15 μm.

The thickness of the depth of the groove (T) should be at least 0.5 times the diameter of the bead so that it sufficiently traps a bead once it falls into the groove even when it is subjected to mechanical agitation. The depth should not exceed 1.5 times the diameter of the bead so as to prevent more than one bead from falling into the same groove location.

Groove plates have been made using a thick photoresist called SU8 and is available from Microchem. The resist is both chemically inert and mechanically robust once fully cured. The groove walls are formed by the resist material, which is deposited onto a glass or substrate. Advantages of this process include the ability to tailor the depth of groove by controlling the thickness of the resist material, and virtually every other geometric attribute through the design of the photo mask. Because it is photolithographic process, essentially any shape profile can be made. For example grooves can be made in simple rows, concentric circles, or spirals. Other features such as discrete wells, spots and cross hatches can be made as fiducial marks for tracking and positional registration purposes.

The scope of the invention is also intended to include the grooves having a flat bottom as shown in FIG. 5 with outwardly tapered walls.

Figure 6:
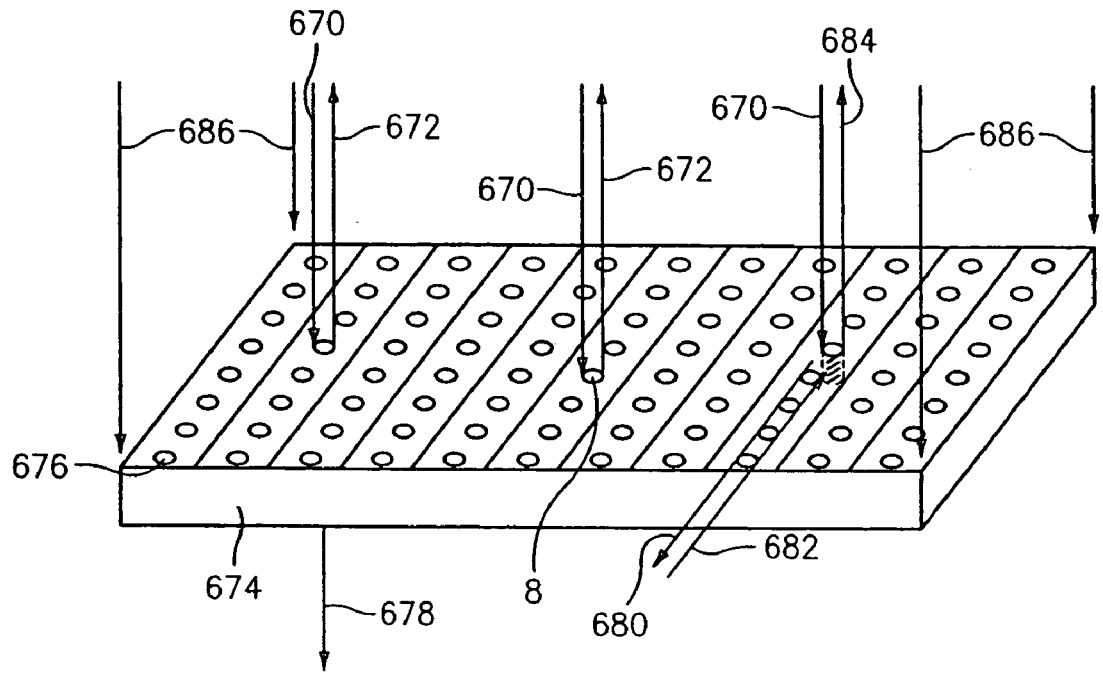
FIG. 6 is a perspective view of a plate with holes for use with an optical identification element, in accordance with the present invention.

FIG. 6: The Holey Plate 674

FIG. 6 shows an alternative embodiment, wherein alignment may be achieved by using a plate 674 having holes 676 slightly larger than the elements 8 if the light 24 (FIGS. 2 and 4) is incident along the grating axis 207. The incident light indicated as 670 is reflected off the grating and exits through the end as a light 672 and the remaining light passes through the grating and the plate 674 as a line 678. Alternatively, if a blazed grating is used, incident light 670 may be reflected out the side of the plate (or any other desired angle), as indicated by a line 680. Alternatively, input light may be incident from the side of the plate 674 and reflected out the top of the plate 474 as indicated by a line 684. The light 672 may be a plurality of separate light beams or a single light beam that illuminates the entire tray 674 if desired.

Figure 7:
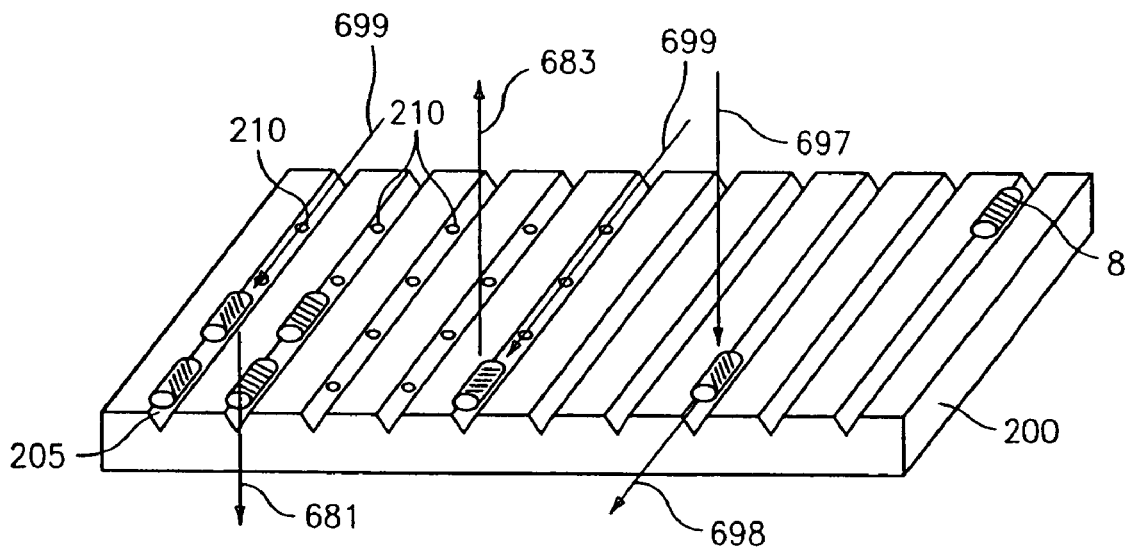
FIG. 7 is a perspective view of a grooved plate for use with an optical identification element, in accordance with the present invention.

FIG. 7: V-groove Plate 200 with End Illumination

FIG. 7 shows an alternative embodiment, wherein the v-groove plate discussed hereinbefore with FIG. 4 may be used for the end illumination/readout condition. In this case, the grating 12 may have a blaze angle such that light incident along the axial grating axis will be reflected upward, downward, or at a predetermined angle for code detection. Similarly, the input light may be incident on the grating in a downward, upward, or at a predetermined angle and the grating 12 may reflect light along the axial grating axis for code detection.

Figure 8:
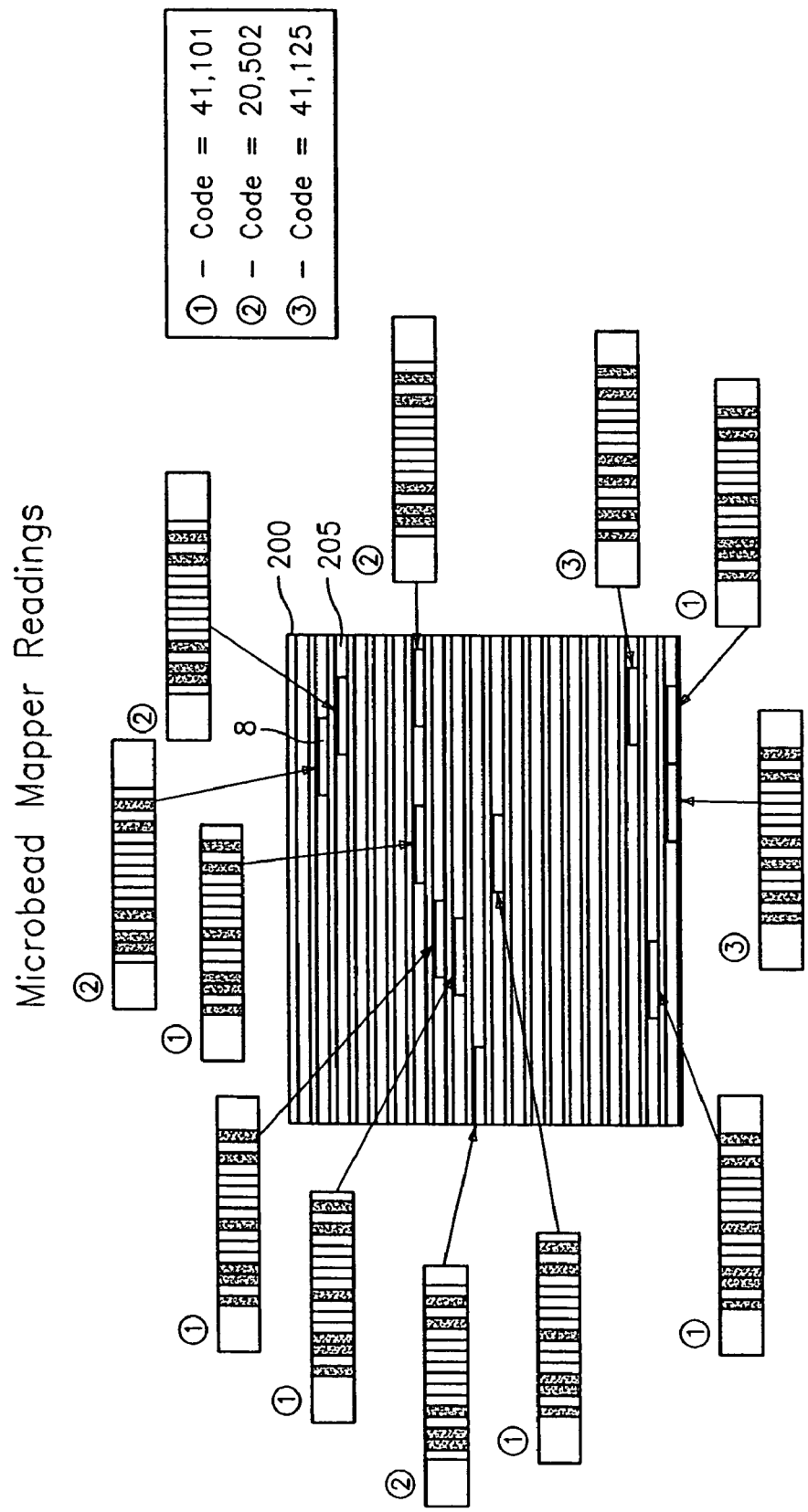
FIG. 8 is a diagram of a microbead mapper reading, in accordance with the present invention.

FIG. 8: Microbead Mapper Readings

FIG. 8 shows microbeads 8 arranged on a plate 200 having grooves 205. As shown, the microbeads 8 have different codes (e.g. "41101", "20502", "41125") using 16-bit, binary symbology), which may be read or detected using the reader or detector configuration described in relation to FIG. 3. The codes in the beads are used to provide a cross reference to determine which probe is attached to which bead, thus allowing the researcher to correlate the chemical content on each bead with the measured fluorescence signal in Step 3 of the process shown in FIG. 1.

Figure 8A:
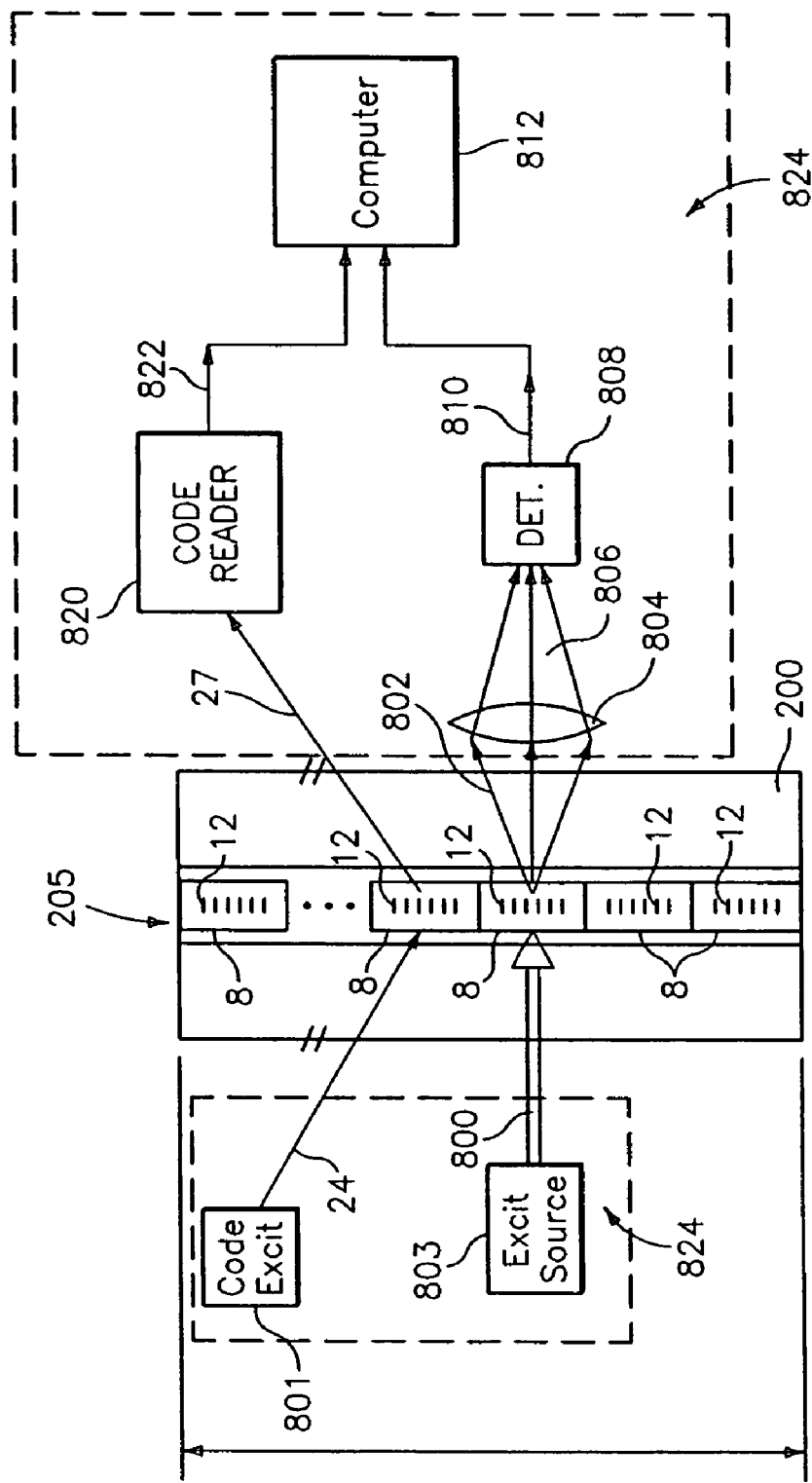
FIG. 8a is a diagram of a system for both detecting a material on and reading a code in a microbead, in accordance with the present invention.

FIG. 8a shows a code reader and detector for obtaining information from the microbead 8 in FIG. 8. The codes in the microbeads 8 are detected when illuminated by incident light 24 which produces a diffracted or output light signal 27 to a reader 820, which includes the optics and electronics necessary to read the codes in each bead 8, as described herein and/or in the aforementioned copending patent application. The reader 820 provides a signal on a line 822 indicative of the code in each of the bead 8. The incident light 24 may be directed transversely from the side of the grooved plate 200 (or from an end or any other angle) with a narrow band (single wavelength) and/or multiple wavelength source, in which case the code is represented by a spatial distribution of light and/or a wavelength spectrum, respectively, as described hereinafter and in the aforementioned copending patent application. Other illumination, readout techniques, types of gratings, geometries, materials, etc. may be used for the microbeads 8, as discussed hereinafter and in the aforementioned patent application.

For assays that use fluorescent molecule markers to label or tag chemicals, an optical excitation signal 800 is incident on the microbeads 8 on the grooved plate 200 and a fluorescent optical output signal 802 emanates from the beads 8 that have the fluorescent molecule attached. The fluorescent optical output signal 802 passes through a lens 804, which provides focused light 802 to a known optical fluorescence detector 808. Instead of or in addition to the lens 802, other imaging optics may be used to provide the desired characteristics of the optical image/signal onto the fluorescence detector 808. The detector 808 provides an output signal on a line 810 indicative of the amount of fluorescence on a given bead 8, which can then be interpreted to determine what type of chemical is attached to the bead 10.

Consistent with that discussed herein, the grooved plate 200 may be made of glass or plastic or any material that is transparent to the code reading incident beam 24 and code reading output light beams 27 as well as the fluorescent excitation beam 800 and the output fluorescent optical signal 802, and is properly suited for the desired application or experiment, e.g., temperature range, harsh chemicals, or other application specific requirements.

The code signal 822 from the bead code reader 820 and the fluorescent signal 810 from the fluorescence detector are provided to a known computer 812. The computer 812 reads the code associated with each bead and determines the chemical probe that was attached thereto from a predetermined table that correlates a predetermined relationship between the bead code and the attached probed. In addition, the computer 812 and reads the fluorescence associated with each bead and determines the sample or analyte that is attached to the bead from a predetermined table that correlates a predetermined relationship between the fluorescence tag and the analyte attached thereto. The computer 812 then determines information about the analyte and/or the probe as well as about the bonding of the analyte to the probe, and provides such information on a display, printout, storage medium or other interface to an operator, scientist or database for review and/or analysis, consistent with shown in step 4 of FIG. 1. The sources 801, 803 the code reader 820, the fluorescence optics 804 and detector 808 and the computer 812 may all be part of an assay stick reader 824.

Alternatively, instead of having the code excitation source 801 and the fluorescence excitation source 803, the reader 24 may have only one source beam which provides both the reflected optical signal 27 for determining the code and the fluorescence signal 802 for reading the tagged analyte attached to the beads 8. In that case the input optical signal is a common wavelength that performs both functions simultaneously, or sequentially, if desired.

The microbeads 8 may be coated with the desired probe compound, chemical, or molecule prior to being placed in the grooved plate 200. Alternatively, the beads 8 may be coated with the probe after being placed in the grooved plate 200. As discussed hereinbefore, the probe material may be an Oligo, cDNA, polymer, or any other desired probe compound, chemical, cell, or molecule for performing an assay.

The scope of the invention is not intended to be limited to using or detecting fluorescent molecule markers during the assay process. For example, embodiments of the invention are envisioned using and detection other types of molecular markers in other types of processes.

Modes of Microbead Alignment

There are at least two possible modes or approaches of use for the groove plate.

Figure 9:
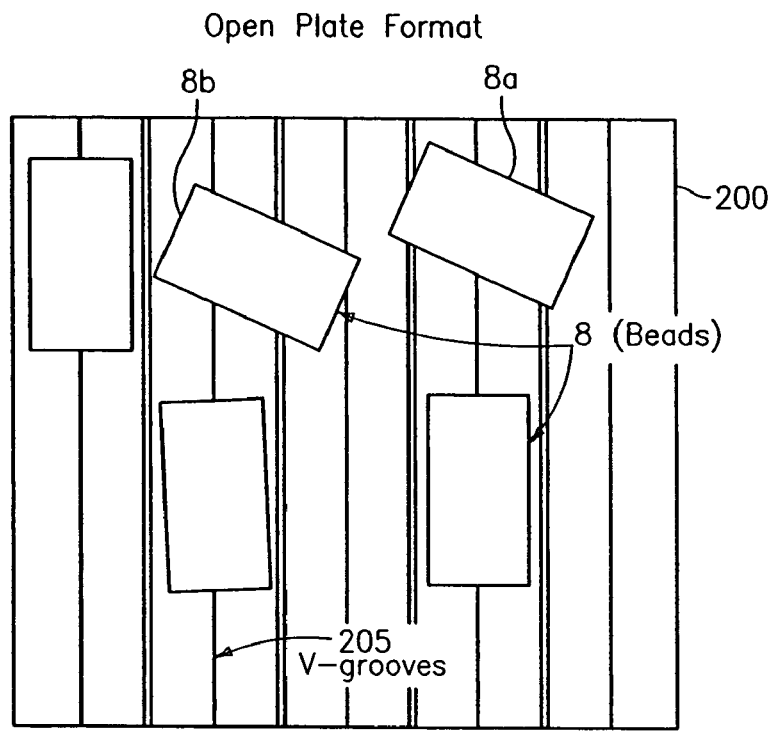
FIG. 9 is a diagram of a plate having microbeads thereon in relation to an open plate format for detection and reading of the microbead in accordance with the invention.

FIG. 9: Open Format Approach

FIG. 9 shows the first, or open plate format, meaning there is no top to cover the microbeads 8 and the v-grooves 205. In this mode, the microbeads 8 are dispensed onto the plate 200 using, for example, a pipette tip or syringe tip, although the scope of the invention is not intended to be limited to the manner of depositing the microbeads on the plate. The microbeads 8 may be then agitated by a sonic transducer (not shown), or manipulated with a mechanical wiper (not shown) or some form of spray nozzle (not shown) to encourage all the microbeads 8 to line up in the grooves 205. It has been observed that substantially all the microbeads naturally line up in the grooves 205 without the need for encouragement. However, there are always some microbeads, such as microbead 8a, 8b, that do not fall naturally into the grooves, and these must either be removed from the plate 200 or forced to fall into a groove 205. The open format approach has the advantages that grooves plate consists just of the plate and no other complicated features such as walls and a top, and possibly other chambers or channels to allow fluid flow and bubble removal. It also has the advantage that it can easily be made with a standard microscope slide, which is designed to fit all conventional micro array readers. However, the open format approach would most likely require the microbeads to be dried out prior to reading, to prevent non-uniform and unpredictable optical aberrations caused by the uneven evaporation of the buffer solution.

FIGS. 10-17: The Closed Format Approach

Figure 10:
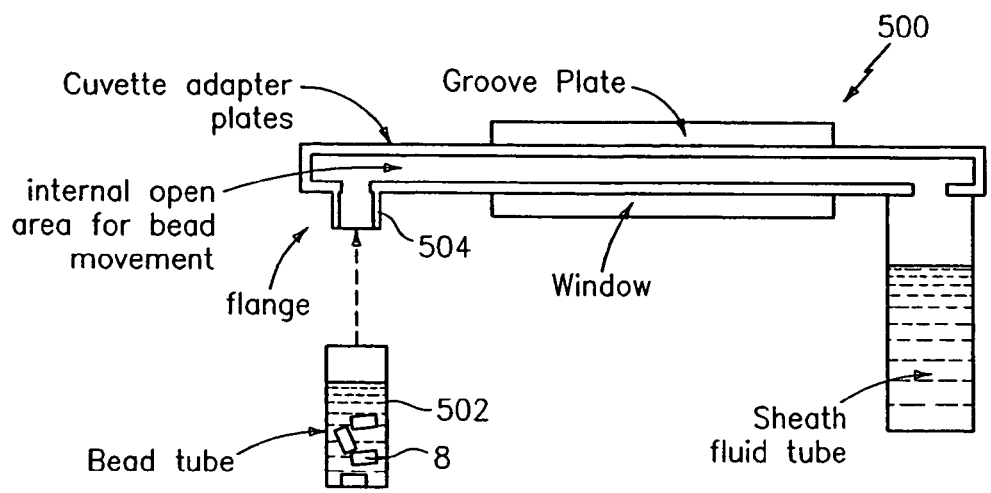
FIG. 10 is a diagram of a starting point for handling microbeads for readout in a cuvette process in accordance with the invention.

FIGS. 10-17 show the second mode which is called a closed format, that consists of not only of a groove plate but also a top and at least three walls to hold the solution and the microbeads in a cuvette-like device generally indicated as 500 shown, for example, in FIG. 10.

In summary, the closed format approach provides a method for effectively distributing and aligning microbeads during the readout process, as described below: The basic process for handling microbeads with a curvette for readout consists of the following steps:

(1) FIG. 10 shows a starting point for handling microbeads for a readout. The microbeads start in a test tube. Typical test-tube volumes are 1.5 ml. The microbeads will generally be in a liquid (usually water with a small amount of other buffer chemicals to adjust pH and possibly a small amount [~0.01%] of detergent.) As shown, a bead tube 502 contains the microbeads in a solution, which forms part of step 1 of the process shown in FIG. 1.

Figure 11:
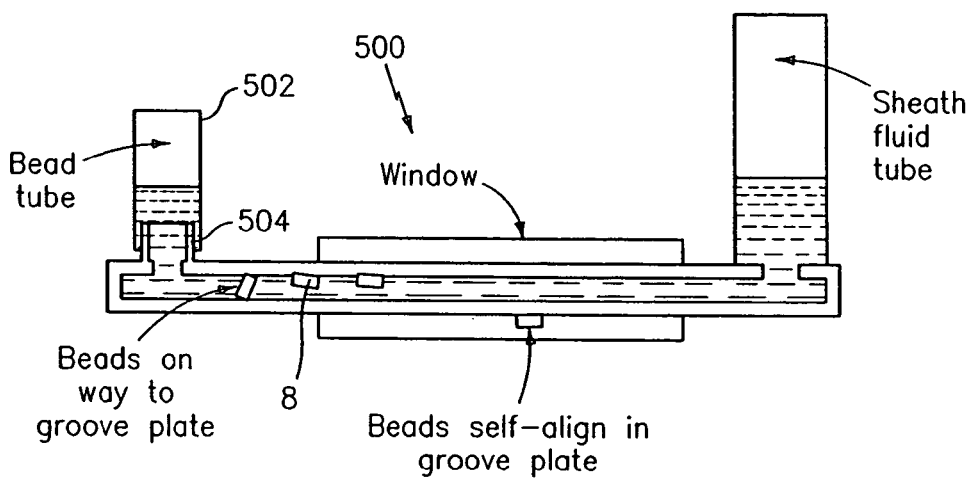
FIG. 11 is a diagram of a second step in the readout process in accordance with the invention.
Figure 14:
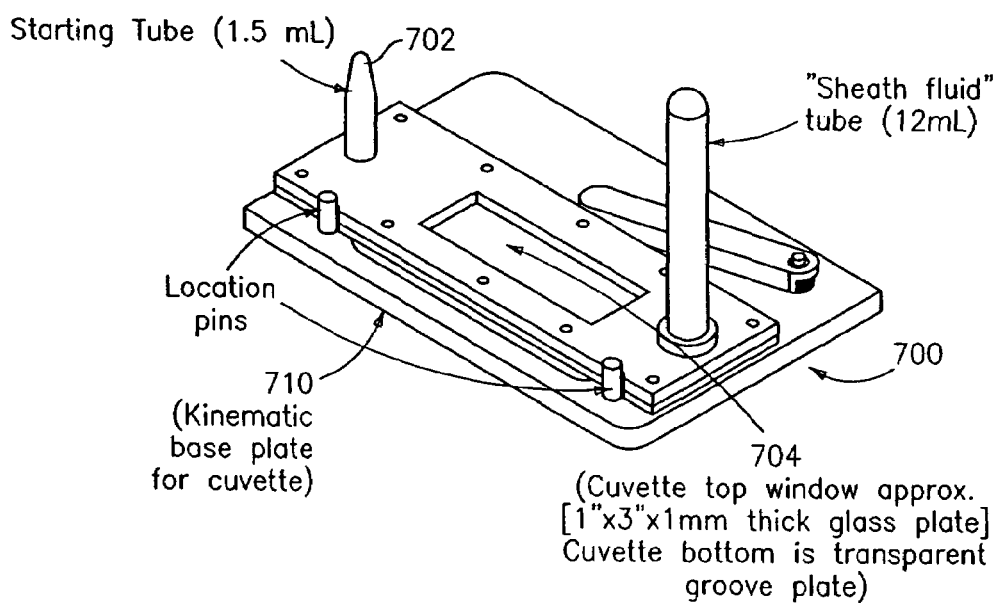
FIG. 14 is a diagram of an example of the cuvette showing its mount on a kinematic plate in accordance with the invention.

(2) FIG. 11 shows the bead tube 502 is coupled to a flange 504 of the cuvette 500 is inverted and the beads flow onto the groove plate. The cuvette consists of two round flanges that accept test-tubes, a transparent window, and an opposing groove plate. FIG. 14 shows a drawing of a prototype cuvette. The groove plate outer dimensions can be any size, but typical microscope slide dimensions are convenient (1"×3"). The grooves are mechanically or laser cut lengthwise, and have dimensions that are chosen for the exact size of cylindrical microbead. For instance, for a 125 µm diameter bead, grooves of approximately 150 µm wide by 150 µm deep are used. One tube carries the microbeads and a small amount of carrier fluid. The second tube may be larger and hold more fluid. The purpose of the second tube is to guarantee a certain fluid level in the next step.

(3) After the cuvette is inverted and the microbeads flow out onto the groove plate side of the cuvette, the microbeads naturally align in the grooves via a small amount of rocking or agitation, which forms part of step 2 of the process shown in FIG. 1.

Figure 12:
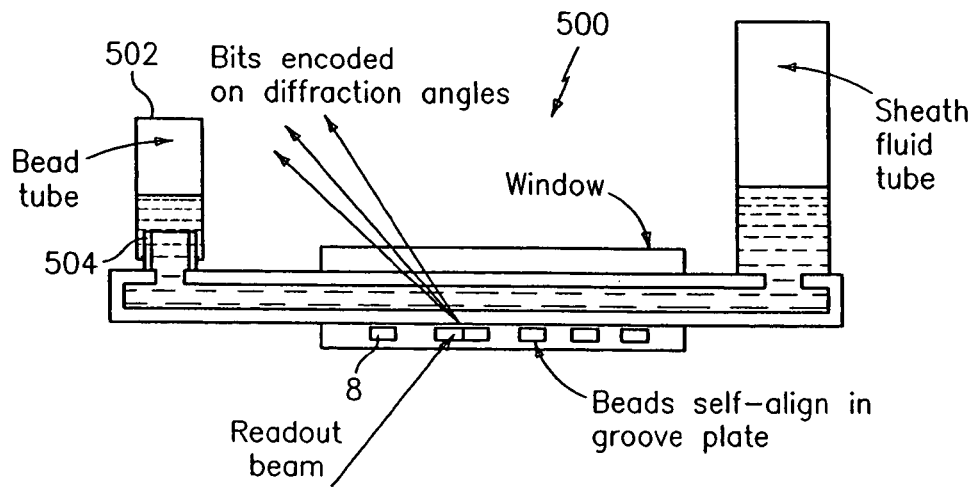
FIG. 12 is a diagram of the readout step in accordance with the invention.

(4) FIG. 12 shows the readout step, in which, after the beads are all (or nearly all) aligned in the groove plate, the entire plate is moved (or the readout laser beam is scanned) in order to read the codes of each beam, which forms part of step 3 of the process shown in FIG. 1. In effect, once the microbeads are in the grooves, the entire cuvette is moved back and forth across a readout beam. The readout beam is transmitted through the cuvette and contains the code bits encoded on the scattering angles.

Figure 13:
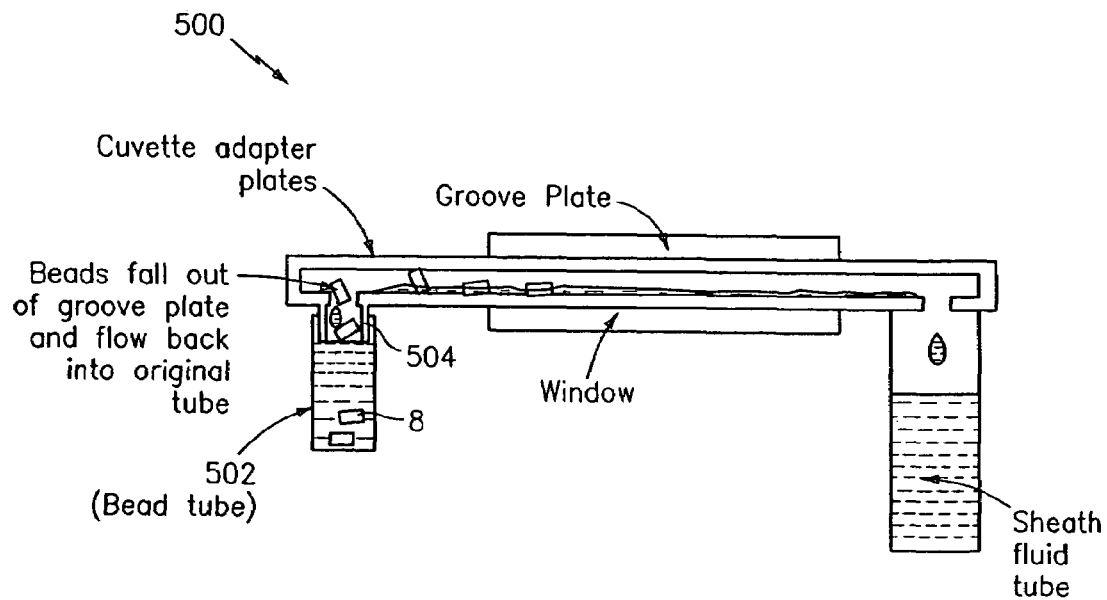
FIG. 13 is a diagram of final steps in the cuvette process in accordance with the invention.

(5) FIG. 13 shows a final step, in which the cuvette is inverted to its original position and the beads flow back into the original tube 502, which forms part of step 3 of the process shown in FIG. 1. In other words, after the readout process, the cuvette is re-inverted and the microbeads flow back into the original test tube.

FIG. 14 shows an example of a cuvette generally indicated as 700 that is mounted on a kinematic base plate 710. As shown, the cuvette 700 has a tube 702 for holding the solution with the beads and a top window 704 that is a 1 mm thick glass plate having dimensions of about 1" by 3". The cuvette also has a bottom plate that is a transparent groove plate. The location pins 712 and lever arm 714 hold the cuvette 700 in place on the kinematic plate 710.

One of the key advantages of using the cuvette device is that the potential to nearly index match the glass microbeads with a buffer solution thereby reducing the divergence of the laser beam caused by the lensing effect of the microbeads, and minimizing scatter form the groove plate itself.

Another advantage involves the potential to prevent microbeads from ever stacking up on top of each other, by limiting the space between the bottom and the top plate to be less than twice the diameter of the microbeads.

Another advantage is that the cover keeps the fluid from evaporating.

FIGS. 15-16

Figure 15:
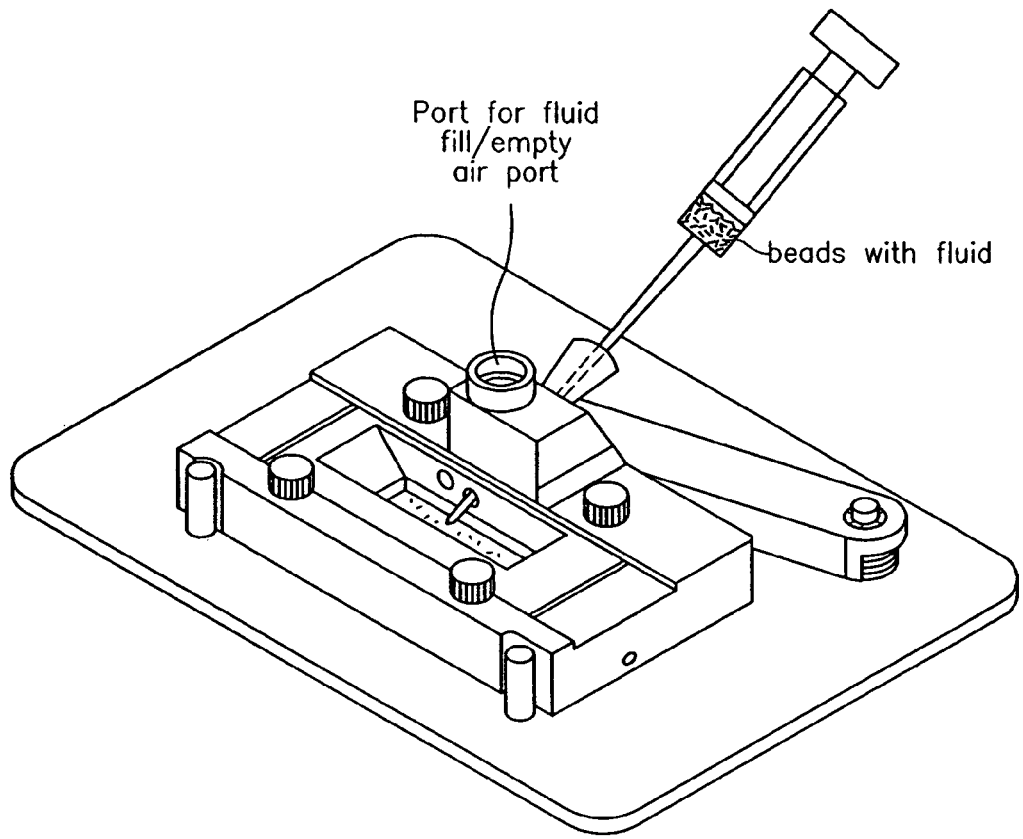
FIG. 15 is a diagram of an alternative embodiment of a cuvette showing a port for fluid filling/emptying using a pipette in accordance with the invention.
Figure 16:
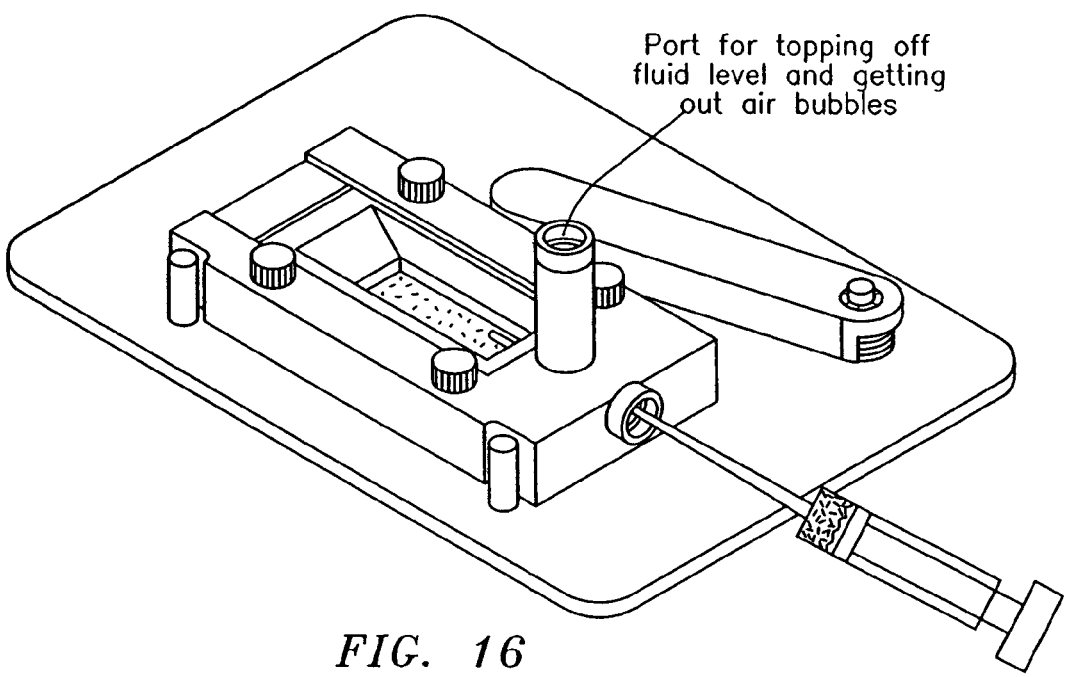
FIG. 16 is a diagram of an alternative embodiment of a cuvette showing an alternative port for fluid filling/emptying using a pipette in accordance with the invention.

FIGS. 15-16 show alternative embodiments of the cuvette shown in FIGS. 10-14. As shown, the microbeads are injected into the cuvette by placing them near the edge of the opening and allowing the surface tension, or an induced fluid flow, to pull the microbeads into the cuvette, where, because of the limited height between the floor and the ceiling of the cuvette, they are confined to move around in a plane, albeit with all the rotational degrees of freedom unconstrained. Once in the cuvette the microbeads are quickly and sufficiently constrained by the grooves as the microbeads fall into them. As in the case of the open format there is still the finite probability that some number of microbeads will not fall into the grooves and must be coaxed in by some form of agitation (ultrasonic, shaking, rocking, etc.).

Figure 17:
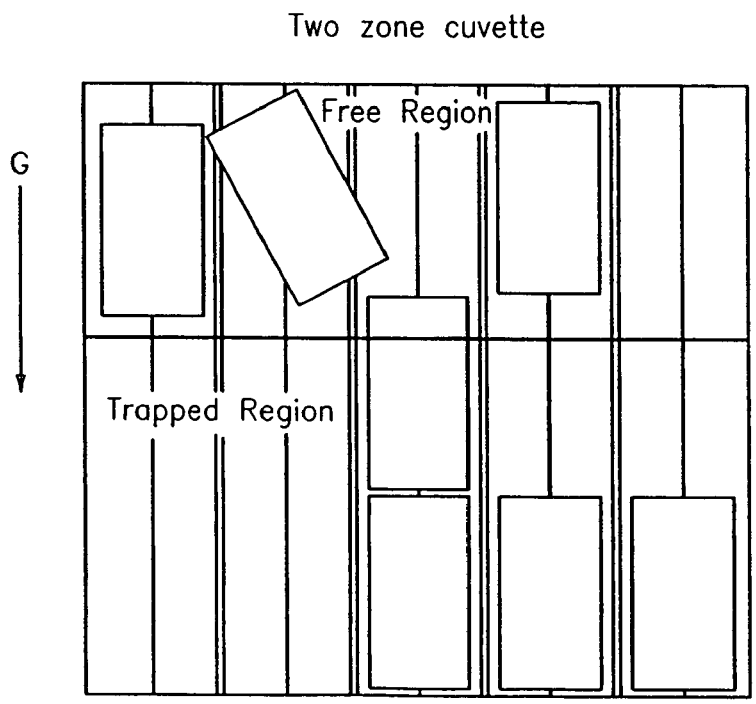
FIG. 17 is a diagram of a two zone cuvette showing a free region and a trapped region in accordance with the invention.

FIG. 17: Two Region Approach

FIG. 17 shows an alternative embodiment of the closed approach, which involves sectioning the closed region into two regions, one where the microbeads are free to move about in a plane, either in a groove or not, and a second region where the microbeads are trapped in a groove and can only move along the axes of a groove. Trapping the microbeads in a groove is accomplished by further reducing the height of the chamber to the extent that the microbeads can no longer hop out of a groove. In this embodiment, the free region is used to pre-align the microbeads into a groove, facilitating the introduction of microbeads into the trapped section. By tilting this type of cuvette up gravity can be used to pull the microbeads along a groove from the free region to the trapped region. Once in the trapped region the microbeads move to the end of the groove where they stop. Subsequent microbeads will begin to stack up until the groove is completely full of microbeads, which are stacked head to tail. This has the advantage of packing a large number of microbeads into a small area and prevents the microbeads from ever jumping out of the grooves. This approach could also be used to align the microbeads prior to injection into some form of flow cytometer, or a dispensing apparatus.

FIGS. 18-23: The Cytometer

FIGS. 18-23 show method and apparatus related to using a cytometer.

Figures 18A, 18B:
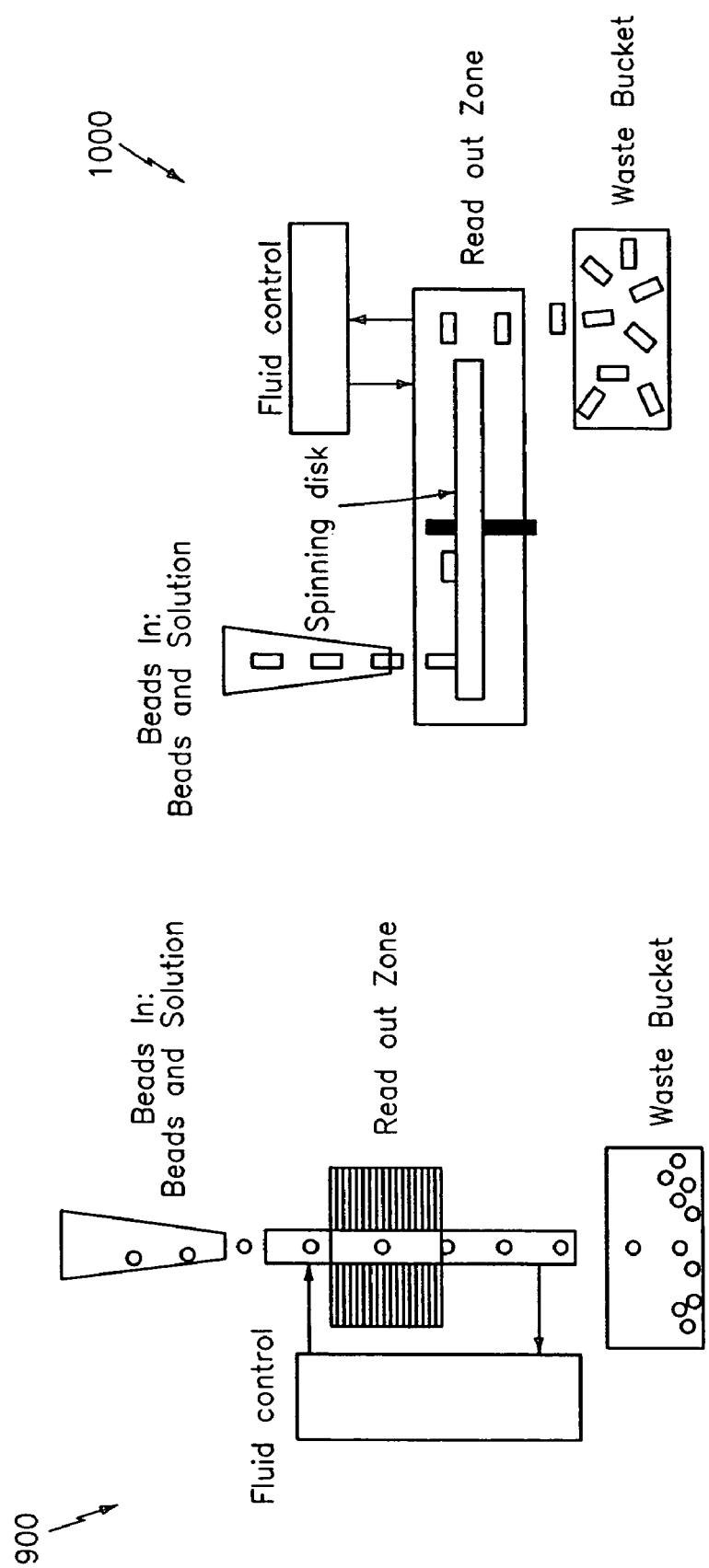
FIG. 18(a) is a diagram of steps for a conventional flow cytometer reader in a single pass cytometer process in accordance with the invention.
FIG. 18(b) is a diagram of steps for a disk cytometer reader in a multipass cytometer process in accordance with the invention.

FIG. 18(a) shows steps for a method related to a conventional (single pass) flow cytometer reader and FIG. 18(b) shows a method related to a disk cytometer reader (multi-pass).

In FIG. 18(a), the method generally indicated as 900 has a step for providing beads and a solution similar to step 1 in FIG. 1; and a step for reading information from the beads similar to steps 2 and 3 in FIG. 1.

In FIG. 18(b), the method generally indicated as 1000 has a step for providing beads and solution similar to step 1 in FIG. 1; and a step for spinning and reading information from the beads similar to steps 2 and 3 in FIG. 1.

In the methods shown in FIGS. 18(a) and (b), a rotating disk (see FIGS. 19(a), (b) and (c) and 20) is used for aligning the microbeads consistent with step 2 of the process shown in FIG. 1.

FIG. 19(a) shows an embodiment of a cytometer bead reader having a rotating disk generally indicated as 1250, having a disk platform 1252 with circumferential, concentric, grooves 1254 for aligning microbeads 8. As shown, the rotating disk 1250 has various sectors for processing the microbeads, including a bead loading zone 1256, a bead removal zone 1258 and a readout zone 1260.

FIG. 19(b) shows an alternative embodiment of a rotating disk generally indicated as 1200, having a disk platform 1202 with planar groove plates 1204a, b, c, d, e, f that are shown with grooves oriented in any one or more different ways. One or more of the planar groove plates 1204a, b, c, d, e, f may have an optional channel for fluid run-off, as shown, and a barrier for preventing the microbeads from flying off the plate. As shown, the window 1262 for reading the beads is in contact with the fluid containing the beads.

FIG. 19(c) shows an alternative embodiment of a rotating disk generally indicated as 1280, having a disk platform 1282 with radial grooves 1284a, 1284b. The disk platform 1282 has a bead loading zone 1286 in the center of the disk. One advantage of this embodiment is that the opening of the bead loading zone 1286 will also serve to allow the release of air bubbles that will naturally collect in the center of the disk due the reduced density of the fluid, which results from the centrifugal force pushing the fluid radially outwardly. The rotating disk 1280 has tight bead packing due to the centrifugal forces due to the spinning action of the disk. The rotating disk 1280 has a wedge shape spacer 1288 that keeps the channel at a constant gap width and a wall 1290.

Figures 20A, 20B:
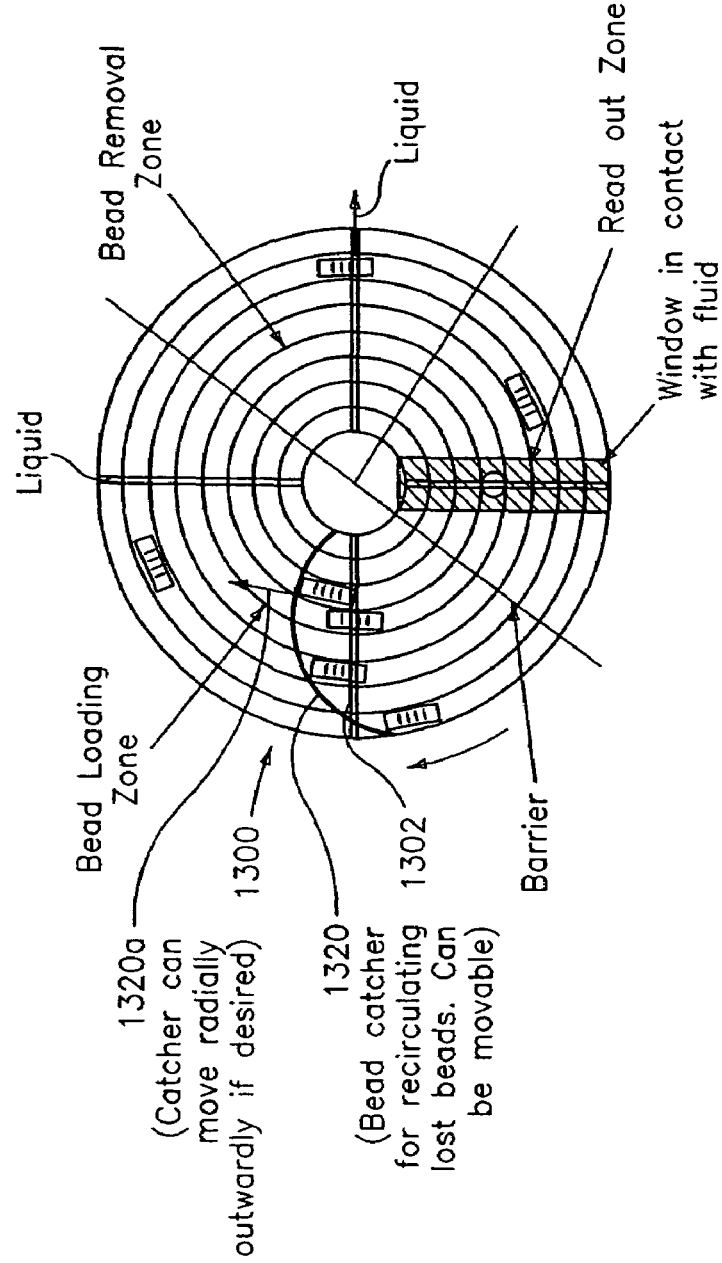
FIG. 20(a) show an embodiment of a disk cytometer having radial channels for spin drying in accordance with the invention.
FIG. 20(b) show an alternative embodiment of a disk cytometer having a mechanical iris for providing a variable aperture for bead access to grooves in accordance with the invention.

FIG. 20(a) shows an alternative embodiment of a rotating disk generally indicated as 1300 having narrow radial channels 1302 for spin drying so liquid is forced out of the circumferential grooves through the radial channels. The plate 1300 may have a mechanical catcher 1320 coupled thereto for moving radially outwardly in direction 1320a if desired, for recirculating loose beads.

FIG. 20(b) show an alternative embodiment of a disk cytometer 1400 having a mechanical iris 1402 for providing a variable aperture for bead access to grooves in accordance with the invention.

Figure 21:
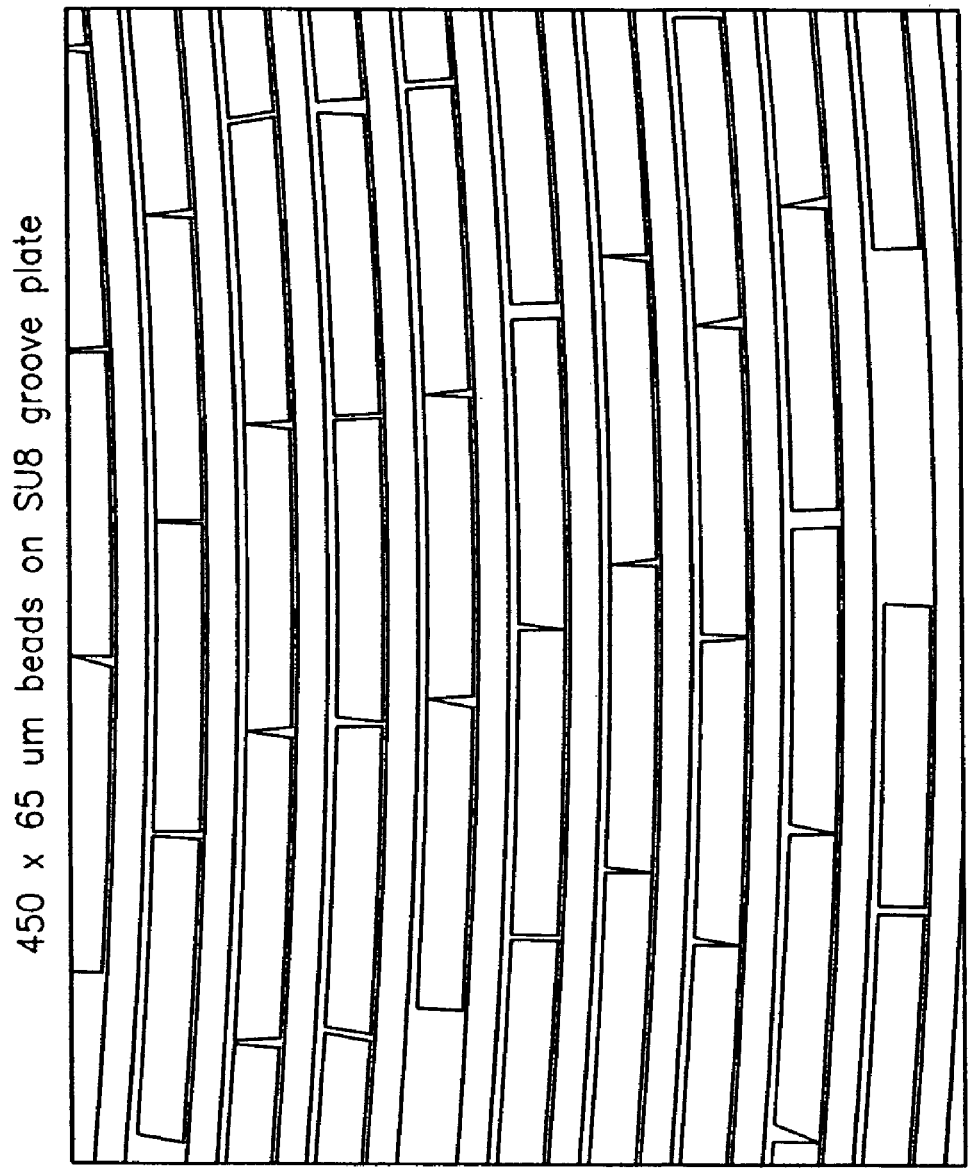
FIG. 21 show an embodiment of a SU8 groove plate having 450 in accordance with the invention.

FIG. 21 shows a rotating groove plate having 450 by 65 microns beads arranged in the rotating SU8 circumferential channels.

Continuous Mode—Process steps

The following are the processing steps for a continuous mode of operation:

1. Dispense batch of microbeads onto plate.
2. Spin slowly while agitating the plate theta x and y to get microbeads into grooves. The agitation can be performed using rocking, ultrasound, airflow, etc.
3. Once sufficient number of microbeads are in grooves, spin up plate to remove excess microbeads (microbeads that did not go into a groove).
4. Spin disk to read code and fluorescence.
5. To remove microbeads, purge with high velocity aqueous solution (enough to knock microbeads out of groove) and vacuum up, or spin microbeads off plate while they are not in a groove.
6. Inspect disk (probably with code camera) to verify that all microbeads have been removed.
7. Inject next batch of microbeads.

Figure 22:
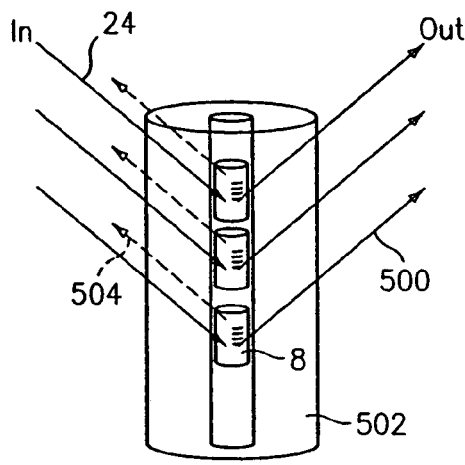
FIG. 22 show an embodiment of an alignment tube in accordance with the invention.
Figure 23:
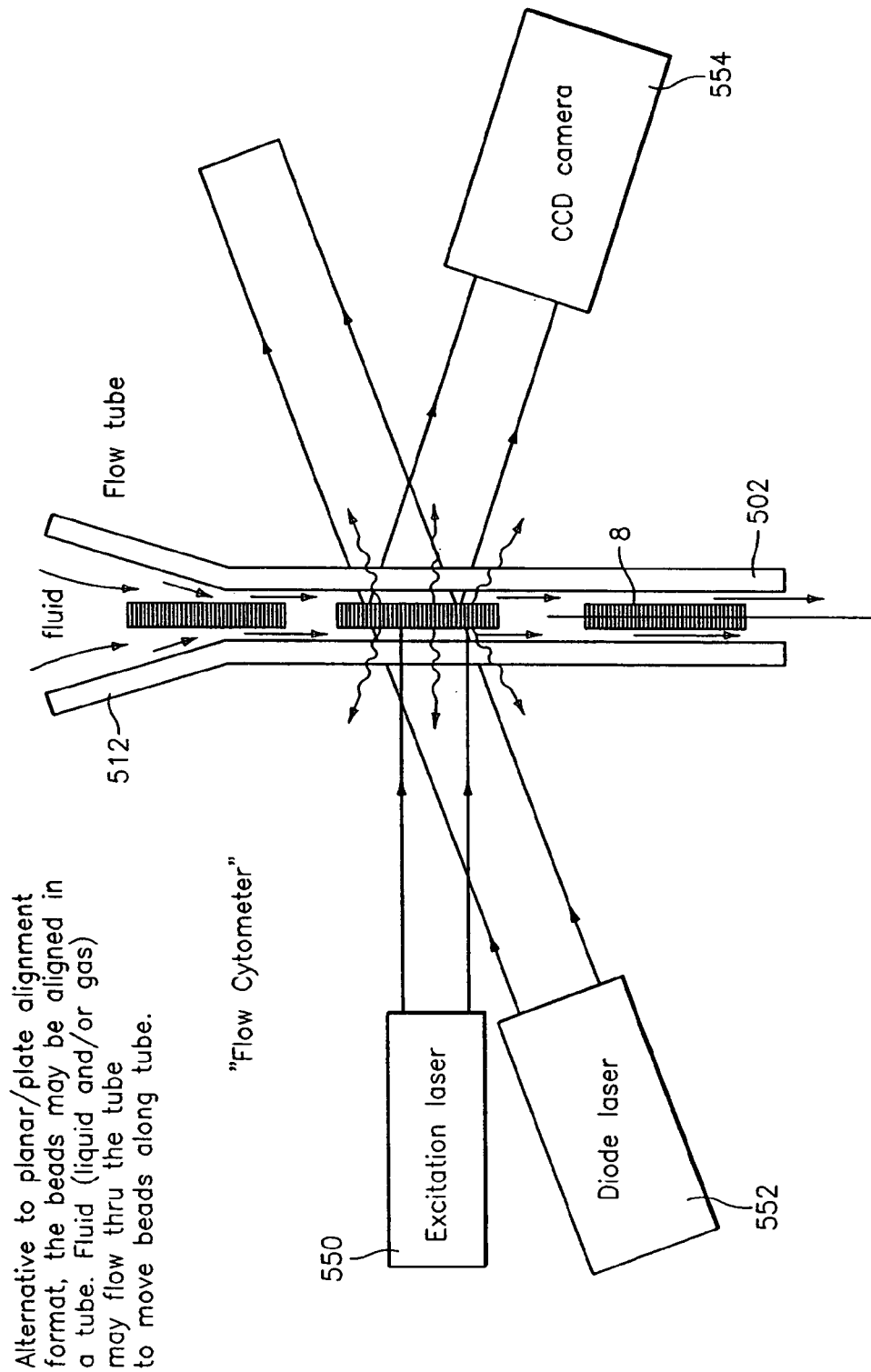
FIG. 23 show an alternative embodiment of an alignment tube having a receiving flange in accordance with the invention.

FIGS. 22-23: The Alignment Tube 502

In FIG. 22, instead of a flat grooved plate 200 (FIG. 3), the microbeads may be aligned in a tube 502 that has a diameter that is only slightly larger than the substrate 10, e.g., about 1-50 microns, and that is substantially transparent to the incident light 24. In that case, the incident light 24 may pass through the tube 502 as indicated by the light 500 or be reflected back due to a reflective coating on the tube 502 or the substrate as shown by return light 504. Other techniques can be used for alignment if desired.

FIG. 23 shows the tube 502 has an opening flange 512 for receiving the microbeads. FIG. 23 also shows an excitation laser 550, a diode laser 552 and a CCD camera 554 for gathering information from the bead 8 consistent with that discussed above.

FIGS. 24-44: Reading The Microbead Code

FIGS. 24-44 show, by way of example, a method an apparatus for reading the code in the microbead. The scope of the invention is not intended to be limited in any way to manner in which the code is read, or the method of doing the same.

Figure 24:
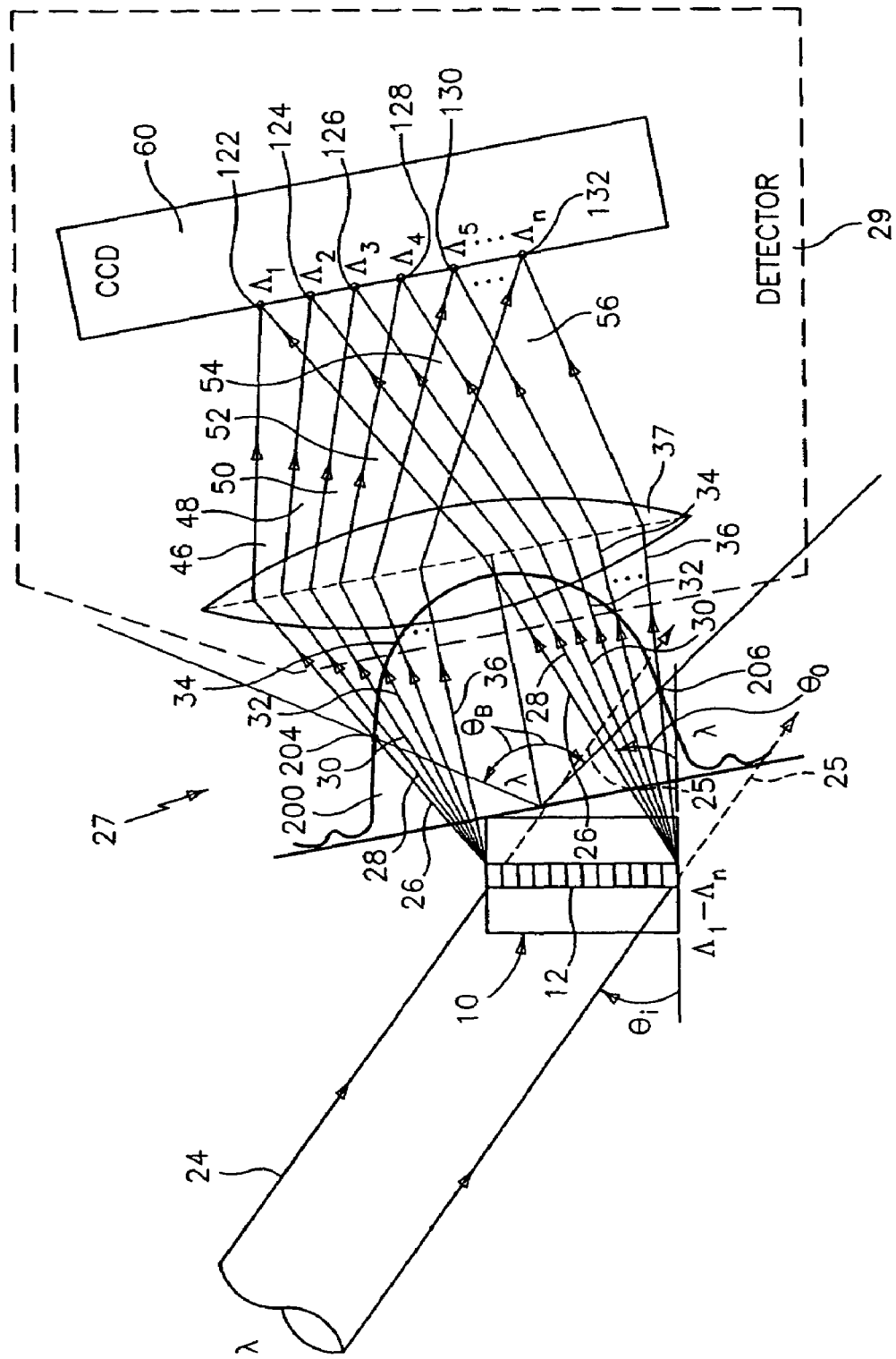
FIG. 24 is an optical schematic for reading a code in an optical identification element, in accordance with the present invention.

Referring to FIG. 24, The reflected light 27, comprises a plurality of beams 26-36 that pass through a lens 37, which provides focused light beams 46-56, respectively, which are imaged onto a CCD camera 60. The lens 37 and the camera 60, and any other necessary electronics or optics for performing the functions described herein, make up the reader 29. Instead of or in addition to the lens 37, other imaging optics may be used to provide the desired characteristics of the optical image/signal onto the camera 60 (e.g., spots, lines, circles, ovals, etc.), depending on the shape of the substrate 10 and input optical signals. Also, instead of a CCD camera other devices may be used to read/capture the output light.

Figure 25A:
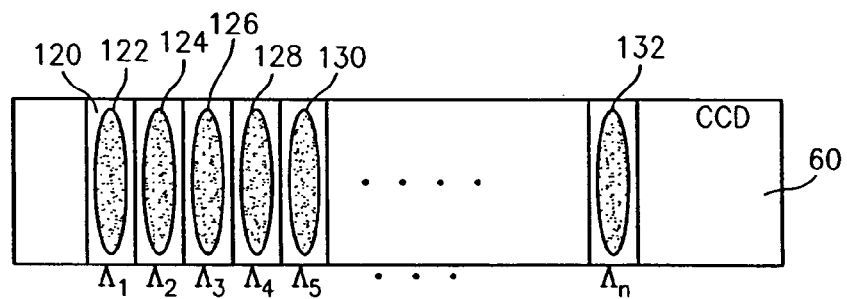
FIG. 25(a) is an image of a code on a CCD camera from an optical identification element, in accordance with the present invention.
Figure 25B:
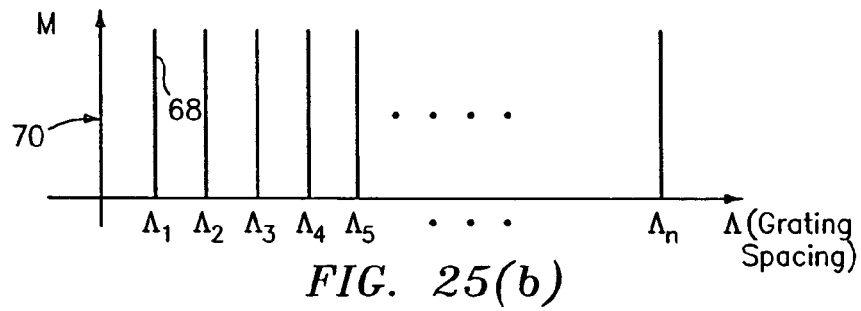
FIG. 25(b) is a graph showing an digital representation of bits in a code in an optical identification element, in accordance with the present invention.
Figure 26:
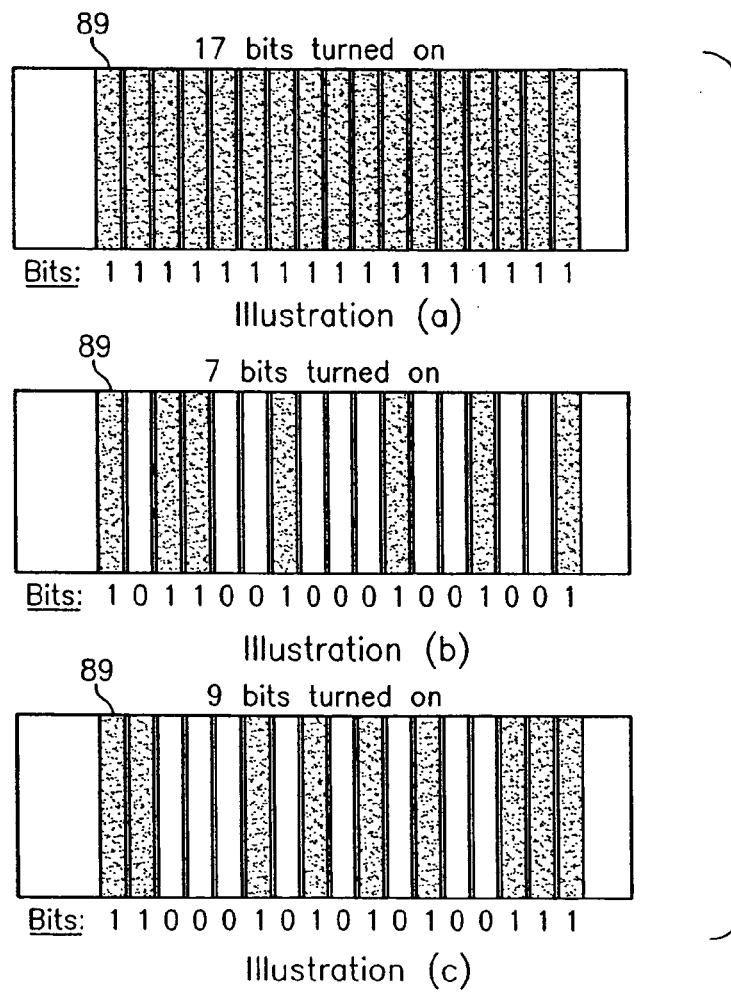
FIG. 26 illustrations (a)-(c) show images of digital codes on a CCD camera, in accordance with the present invention.

Referring to FIG. 25, the image on the CCD camera 60 is a series of illuminated stripes indicating ones and zeros of a digital pattern or code of the grating 12 in the element 8. Referring to FIG. 26, lines 68 on a graph 70 are indicative of a digitized version of the image of FIG. 25 as indicated in spatial periods ($\Lambda 1$-$\Lambda n$).

Each of the individual spatial periods ($\Lambda 1$-$\Lambda n$) in the grating 12 is slightly different, thus producing an array of N unique diffraction conditions (or diffraction angles) discussed more hereinafter. When the element 8 is illuminated from the side, in the region of the grating 12, at an appropriate input angle, e.g., about 30 degrees, with a single input wavelength $\lambda$ (monochromatic) source, the diffracted (or reflected) beams 26-36 are generated. Other input angles $\theta i$ may be used if desired, depending on various design parameters as discussed herein and/or in the aforementioned patent application, and provided that a known diffraction equation (Eq. 1 below) is satisfied:

$$\sin(\theta_i) + \sin(\theta_o) = m\lambda/n\Lambda \qquad \text{Eq. 1}$$

where Eq. 1 is diffraction (or reflection or scatter) relationship between input wavelength $\lambda$, input incident angle $\theta i$, output incident angle $\theta o$, and the spatial period $\Lambda$ of the grating 12. Further, m is the "order" of the reflection being observed, and n is the refractive index of the substrate 10. The value of m=1 or first order reflection is acceptable for illustrative purposes. Eq. 1 applies to light incident on outer surfaces of the substrate 10 which are parallel to the longitudinal axis of the grating (or the $k_B$ vector). Because the angles $\theta i, \theta o$ are defined outside the substrate 10 and because the effective refractive index of the substrate 10 is substantially a common value, the value of n in Eq. 1 cancels out of this equation.

Thus, for a given input wavelength $\lambda$, grating spacing $\Lambda$, and incident angle of the input light $\theta i$, the angle $\theta o$ of the reflected output light may be determined. Solving Eq. 1 for $\theta o$ and plugging in m=1, gives:

$$\theta o = \sin^{-1}(\lambda/\Lambda - \sin(\theta i)) \qquad \text{Eq. 2}$$

For example, for an input wavelength $\lambda$=532 nm, a grating spacing $\Lambda$=0.532 microns (or 532 nm), and an input angle of incidence $\theta i$=30 degrees, the output angle of reflection will be $\theta o$=30 degrees. Alternatively, for an input wavelength $\lambda$=632 nm, a grating spacing $\Lambda$=0.532 microns (or 532 nm), and an input angle $\theta i$ of 30 degrees, the output angle of reflection $\theta o$ will be at 43.47 degrees, or for an input angle $\theta i$=37 degrees, the output angle of reflection will be $\theta o$=37 degrees. Any input angle that satisfies the design requirements discussed herein and/or in the aforementioned patent application may be used.

In addition, to have sufficient optical output power and signal to noise ratio, the output light 27 should fall within an acceptable portion of the Bragg envelope (or normalized reflection efficiency envelope) curve 200, as indicated by points 204,206, also defined as a Bragg envelope angle $\theta B$, as also discussed herein and/or in the aforementioned patent application. The curve 200 may be defined as:

$$I(ki, ko) \approx [KD]^2 \sin c^2\left[\frac{(ki-ko)D}{2}\right] \qquad \text{Eq. 3}$$

where K=$2\pi\delta n/\lambda$, where, $\delta n$ is the local refractive index modulation amplitude of the grating and $\lambda$ is the input wavelength, sinc(x)=sin(x)/x, and the vectors $k_i = 2\pi\cos(\theta_i)/\lambda$ and $k_o = 2\pi\cos(\theta_o)/\lambda$ are the projections of the incident light and the output (or reflected) light, respectively, onto the line 203 normal to the axial direction of the grating 12 (or the grating vector $k_B$), D is the thickness or depth of the grating 12 as measured along the line 203 (normal to the axial direction of the grating 12). Other substrate shapes than a cylinder may be used and will exhibit a similar peaked characteristic of the Bragg envelope. We have found that a value for $\delta n$ of about $10^{-4}$ in the grating region of the substrate is acceptable; however, other values may be used if desired.

Rewriting Eq. 3 gives the reflection efficiency profile of the Bragg envelope as:

$$I(ki, ko) \approx \left[\frac{2\pi \cdot \delta n \cdot D}{\lambda}\right]^2 \left[\frac{\sin(x)}{x}\right]^2 \qquad \text{Eq. 4}$$

where: x=(ki−ko)D/2=($\pi$D/$\lambda$)*(cos$\theta$i−cos $\theta$o)

Thus, when the input angle $\theta i$ is equal to the output (or reflected) angle $\theta_o$ (i.e., $\theta i = \theta_o$), the reflection efficiency I (Eqs. 3 & 4) is maximized, which is at the center or peak of the Bragg envelope. When $\theta i = \theta o$, the input light angle is referred to as the Bragg angle as is known. The efficiency decreases for other input and output angles (i.e., $\theta i \neq \theta o$), as defined by Eqs. 3 & 4. Thus, for maximum reflection efficiency and thus output light power, for a given grating pitch $\Lambda$ and input wavelength, the angle $\theta i$ of the input light 24 should be set so that the angle $\theta o$ of the reflected output light equals the input angle $\theta i$.

Also, as the thickness or diameter D of the grating decreases, the width of the sin(x)/x function (and thus the width of the Bragg envelope) increases and, the coefficient to or amplitude of the sinc$^2$ (or (sin(x)/x)$^2$ function (and thus the efficiency level across the Bragg envelope) also increases, and vice versa. Further, as the wavelength $\lambda$ increases, the half-width of the Bragg envelope as well as the efficiency level across the Bragg envelope both decrease. Thus, there is a trade-off between the brightness of an individual bit and the number of bits available under the Bragg envelope. Ideally, $\delta n$ should be made as large as possible to maximize the brightness, which allows D to be made smaller.

From Eq. 3 and 4, the half-angle of the Bragg envelope $\theta_B$ is defined as:

$$\theta_B = \frac{\eta \lambda}{\pi D \sin(\theta_i)} \quad \text{Eq. 5}$$

where $\eta$ is a reflection efficiency factor which is the value for x in the $\sin c^2(x)$ function where the value of $\sin c^2(x)$ has decreased to a predetermined value from the maximum amplitude as indicated by points 204,206 on the curve 200.

We have found that the reflection efficiency is acceptable when $\eta \leq 1.39$. This value for $\eta$ corresponds to when the amplitude of the reflected beam (i.e., from the $\sin c^2(x)$ function of Eqs. 3 & 4) has decayed to about 50% of its peak value. In particular, when $x=1.39=\eta$, $\sin c^2(x)=0.5$. However, other values for efficiency thresholds or factor in the Bragg envelope may be used if desired.

The beams 26-36 are imaged onto the CCD camera 60 to produce the pattern of light and dark regions 120-132 representing a digital (or binary) code, where light=1 and dark=0 (or vice versa). The digital code may be generated by selectively creating individual index variations (or individual gratings) with the desired spatial periods $\Lambda 1$-$\Lambda n$. Other illumination, readout techniques, types of gratings, geometries, materials, etc. may be used as discussed in the aforementioned patent application.

Referring to FIG. 26, illustrations (a)-(c), for the grating 12 in a cylindrical substrate 10 having a sample spectral 17 bit code (i.e., 17 different pitches $\Lambda 1$-$\Lambda 17$), the corresponding image on the CCD (Charge Coupled Device) camera 60 is shown for a digital pattern of 7 bits turned on (10110010001001001); 9 bits turned on of (110001010101000111); all 17 bits turned on of (11111111111111111).

For the images in FIG. 26, the length of the substrate 10 was 450 microns, the outer diameter D1 was 65 microns, the inner diameter D was 14 microns, $\delta n$ for the grating 12 was about $10^{-4}$, n1 in portion 20 was about 1.458 (at a wavelength of about 1550 nm), n2 in portion 18 was about 1.453, the average pitch spacing $\Lambda$ for the grating 12 was about 0.542 microns, and the spacing between pitches $\Delta\Lambda$ was about 0.36% of the adjacent pitches $\Lambda$.

Referring to FIG. 27, illustration (a), the pitch $\Lambda$ of an individual grating is the axial spatial period of the sinusoidal variation in the refractive index n1 in the region 20 of the substrate 10 along the axial length of the grating 12 as indicated by a curve 90 on a graph 91. Referring to FIG. 27, illustration (b), a sample composite grating 12 comprises three individual gratings that are co-located on the substrate 10, each individual grating having slightly different pitches, $\Lambda 1$, $\Lambda 2$, $\Lambda 3$, respectively, and the difference (or spacing) $\Delta\Lambda$ between each pitch $\Lambda$ being about 3.0% of the period of an adjacent pitch $\Lambda$ as indicated by a series of curves 92 on a graph 94. Referring to FIG. 27, illustration (c), three individual gratings, each having slightly different pitches, $\Lambda 1$, $\Lambda 2$, $\Lambda 3$, respectively, are shown, the difference $\Delta\Lambda$ between each pitch $\Lambda$ being about 0.3% of the pitch $\Lambda$ of the adjacent pitch as shown by a series of curves 95 on a graph 97. The individual gratings in FIG. 27, illustrations (b) and (c) are shown to all start at 0 for illustration purposes; however, it should be understood that, the separate gratings need not all start in phase with each other. Referring to FIG. 27, illustration (d), the overlapping of the individual sinusoidal refractive index variation pitches $\Lambda 1$-$\Lambda n$ in the grating region 20 of the substrate 10, produces a combined resultant refractive index variation in the composite grating 12 shown as a curve 96 on a graph 98 representing the combination of the three pitches shown in FIG. 27, illustration (b). Accordingly, the resultant refractive index variation in the grating region 20 of the substrate 10 may not be sinusoidal and is a combination of the individual pitches $\Lambda$ (or index variation).

The maximum number of resolvable bits N, which is equal to the number of different grating pitches $\Lambda$ (and hence the number of codes), that can be accurately read (or resolved) using side-illumination and side-reading of the grating 12 in the substrate 10, is determined by numerous factors, including: the beam width w incident on the substrate (and the corresponding substrate length L and grating length Lg), the thickness or diameter D of the grating 12, the wavelength $\lambda$ of incident light, the beam divergence angle $\theta_R$, and the width of the Bragg envelope $\theta_B$ (discussed more in the aforementioned patent application), and may be determined by the equation:

$$N \cong \frac{\eta \beta L}{2D \sin(\theta_i)} \quad \text{Eq. 6}$$

Figure 28:
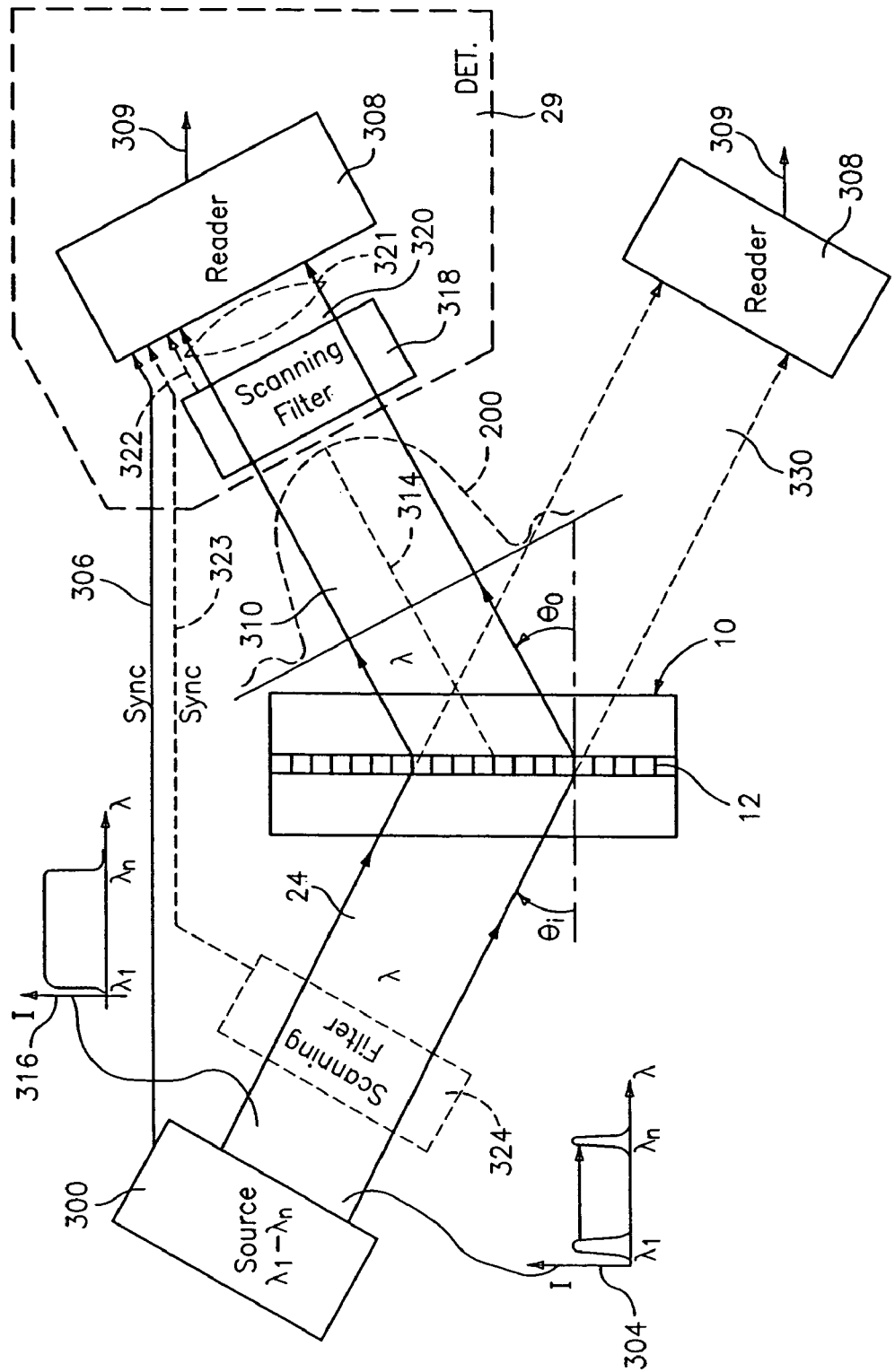
FIG. 28 is an alternative optical schematic for reading a code in an optical identification element, in accordance with the present invention.

Referring to FIG. 28, instead of having the input light 24 at a single wavelength $\lambda$ (monochromatic) and reading the bits by the angle $\theta o$ of the output light, the bits (or grating pitches $\Lambda$) may be read/detected by providing a plurality of wavelengths and reading the wavelength spectrum of the reflected output light signal. In this case, there would be one bit per wavelength, and thus, the code is contained in the wavelength information of the reflected output signal.

In this case, each bit (or $\Lambda$) is defined by whether its corresponding wavelength falls within the Bragg envelope, not by its angular position within the Bragg envelope 200. As a result, it is not limited by the number of angles that can fit in the Bragg envelope 200 for a given composite grating 12, as in the embodiment discussed hereinbefore. Thus, using multiple wavelengths, the only limitation in the number of bits N is the maximum number of grating pitches $\Lambda$ that can be superimposed and optically distinguished in wavelength space for the output beam.

Figure 29:
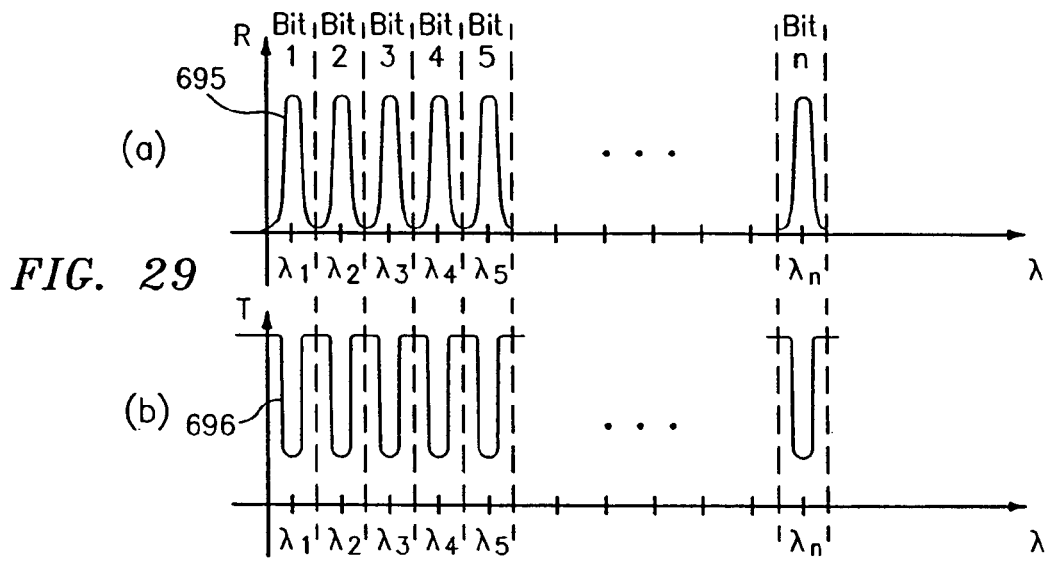
FIG. 29 illustrations (a)-(b) are graphs of reflection and transmission wavelength spectrum for an optical identification element, in accordance with the present invention.

Referring to FIGS. 28 and 29, illustration (a), the reflection wavelength spectrum ($\lambda 1$-$\lambda n$) of the reflected output beam 310 will exhibit a series of reflection peaks 695, each appearing at the same output Bragg angle $\theta o$. Each wavelength peak 695 ($\lambda 1$-$\lambda n$) corresponds to an associated spatial period ($\Lambda 1$-$\Lambda n$), which make up the grating 12.

One way to measure the bits in wavelength space is to have the input light angle $\theta i$ equal to the output light angle $\theta o$, which is kept at a constant value, and to provide an input wavelength $\lambda$ that satisfies the diffraction condition (Eq. 1) for each grating pitch $\Lambda$. This will maximize the optical power of the output signal for each pitch $\Lambda$ detected in the grating 12.

Referring to 29, illustration (b), the transmission wavelength spectrum of the transmitted output beam 330 (which is transmitted straight through the grating 12) will exhibit a series of notches (or dark spots) 696. Alternatively, instead of detecting the reflected output light 310, the transmitted light 330 may be detected at the detector/reader 308. It should be understood that the optical signal levels for the reflection peaks 695 and transmission notches 696 will depend on the "strength" of the grating 12, i.e., the magnitude of the index variation n in the grating 12.

In FIG. 28, the bits may be detected by continuously scanning the input wavelength. A known optical source 300 provides the input light signal 24 of a coherent scanned wavelength input light shown as a graph 304. The source 300 provides a sync signal on a line 306 to a known reader 308. The sync signal may be a timed pulse or a voltage ramped signal, which is indicative of the wavelength being provided as the input light 24 to the substrate 10 at any given time. The reader 308 may be a photodiode, CCD camera, or other optical detection device that detects when an optical signal is present and provides an output signal on a line 309 indicative of the code in the substrate 10 or of the wavelengths present in the output light, which is directly related to the code, as discussed herein. The grating 12 reflects the input light 24 and provides an output light signal 310 to the reader 308. The wavelength of the input signal is set such that the reflected output light 310 will be substantially in the center 314 of the Bragg envelope 200 for the individual grating pitch (or bit) being read.

Alternatively, the source 300 may provide a continuous broadband wavelength input signal such as that shown as a graph 316. In that case, the reflected output beam 310 signal is provided to a narrow band scanning filter 318 which scans across the desired range of wavelengths and provides a filtered output optical signal 320 to the reader 308. The filter 318 provides a sync signal on a line 322 to the reader, which is indicative of which wavelengths are being provided on the output signal 320 to the reader and may be similar to the sync signal discussed hereinbefore on the line 306 from the source 300. In this case, the source 300 does not need to provide a sync signal because the input optical signal 24 is continuous. Alternatively, instead of having the scanning filter being located in the path of the output beam 310, the scanning filter may be located in the path of the input beam 24 as indicated by the dashed box 324, which provides the sync signal on a line 323.

Alternatively, instead of the scanning filters 318,324, the reader 308 may be a known optical spectrometer (such as a known spectrum analyzer), capable of measuring the wavelength of the output light.

The desired values for the input wavelengths λ (or wavelength range) for the input signal 24 from the source 300 may be determined from the Bragg condition of Eq. 1, for a given grating spacing Λ and equal angles for the input light θi and the angle light θo. Solving Eq. 1 for λ and plugging in m=1, gives:

$$\lambda = \Lambda[\sin(\theta o) + \sin(\theta i)] \quad \text{Eq. 7}$$

It is also possible to combine the angular-based code detection with the wavelength-based code detection, both discussed hereinbefore. In this case, each readout wavelength is associated with a predetermined number of bits within the Bragg envelope. Bits (or grating pitches Λ) written for different wavelengths do not show up unless the correct wavelength is used.

Accordingly, the bits (or grating pitches Λ) can be read using one wavelength and many angles, many wavelengths and one angle, or many wavelengths and many angles.

Figure 30:
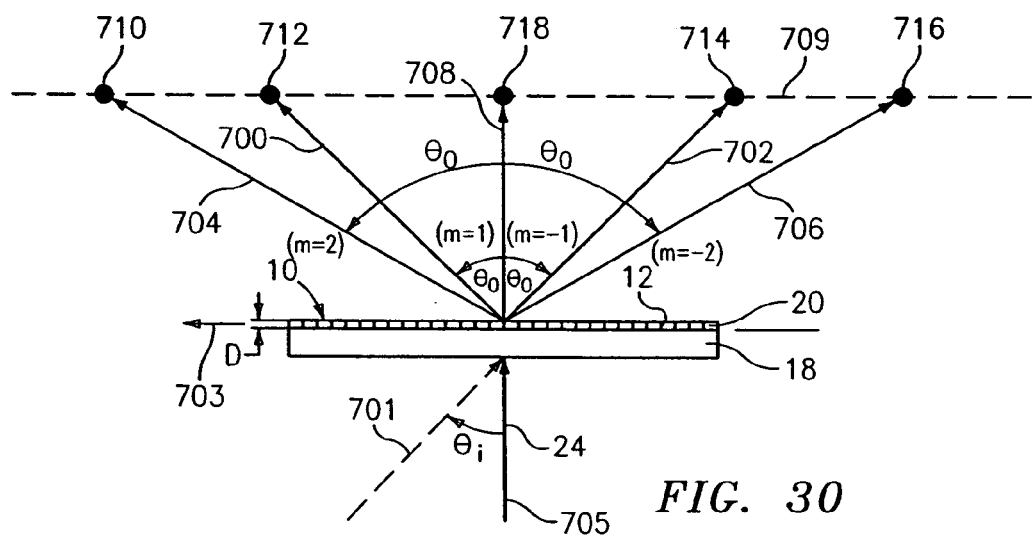
FIGS. 30-31 are side views of a thin grating for an optical identification element, in accordance with the present invention.

Referring to FIG. 30, the grating 12 may have a thickness or depth D which is comparable or smaller than the incident beam wavelength λ. This is known as a "thin" diffraction grating (or the full angle Bragg envelope is 180 degrees). In that case, the half-angle Bragg envelope θB is substantially 90 degrees; however, δn must be made large enough to provide sufficient reflection efficiency, per Eqs. 3 and 4. In particular, for a "thin" grating, $D \cdot \delta n \approx \lambda/2$, which corresponds to a π phase shift between adjacent minimum and maximum refractive index values of the grating 12.

It should be understood that there is still a trade-off discussed hereinbefore with beam divergence angle $\theta_R$ and the incident beam width (or length L of the substrate), but the accessible angular space is theoretically now 90 degrees. Also, for maximum efficiency, the phase shift between adjacent minimum and maximum refractive index values of the grating 12 should approach a π phase shift; however, other phase shifts may be used.

In this case, rather than having the input light 24 coming in at the conventional Bragg input angle θi, as discussed hereinbefore and indicated by a dashed line 701, the grating 12 is illuminated with the input light 24 oriented on a line 705 orthogonal to the longitudinal grating vector 705. The input beam 24 will split into two (or more) beams of equal amplitude, where the exit angle $\theta_o$ can be determined from Eq. 1 with the input angle $\theta_i=0$ (normal to the longitudinal axis of the grating 12).

In particular, from Eq. 1, for a given grating pitch Λ1, the $+/-1^{st}$ order beams (m=+1 and m=−1), corresponds to output beams 700,702, respectively. For the $+/-2^{nd}$ order beams (m=+2 and m=−2), corresponds to output beams 704,706, respectively. The $0^{th}$ order (undefracted) beam (m=0), corresponds to beam 708 and passes straight through the substrate. The output beams 700-708 project spectral spots or peaks 710-718, respectively, along a common plane, shown from the side by a line 709, which is parallel to the upper surface of the substrate 10.

For example, for a grating pitch Λ=1.0 um, and an input wavelength λ=400 nm, the exit angles $\theta_o$ are ~+/−23.6 degrees (for m=+/−1), and +/−53.1 degrees (from m=+/−2), from Eq. 1. It should be understood that for certain wavelengths, certain orders (e.g., m=+/−2) may be reflected back toward the input side or otherwise not detectable at the output side of the grating 12.

Alternatively, one can use only the $+/-1^{st}$ order (m=+/−1) output beams for the code, in which case there would be only 2 peaks to detect, 712, 714. Alternatively, one can also use any one or more pairs from any order output beam that is capable of being detected.

Alternatively, instead of using a pair of output peaks for a given order, an individual peak may be used.

Figure 31:
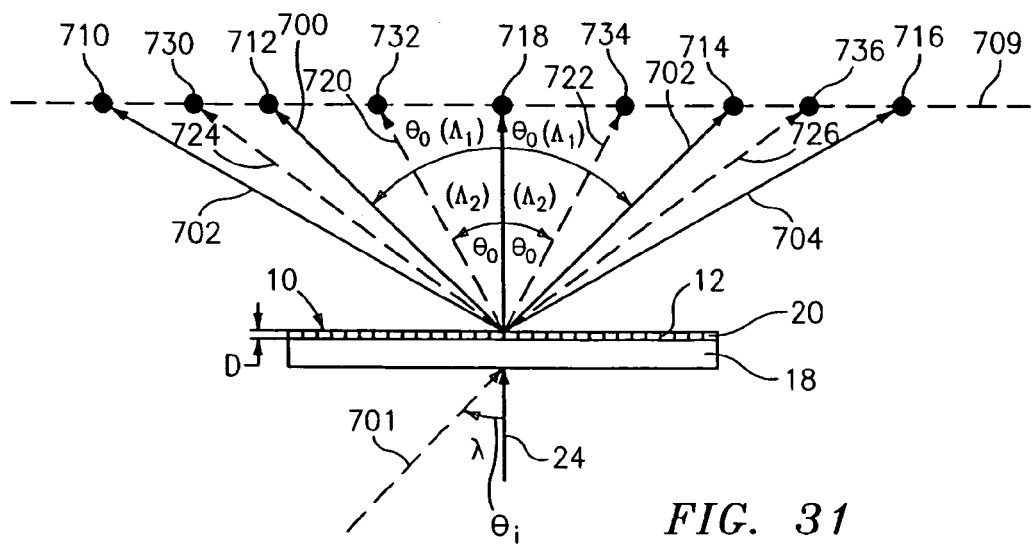

Referring to FIG. 31, if two pitches Λ1,Λ2 exist in the grating 12, two sets of peaks will exist. In particular, for a second grating pitch Λ2, the $+/-1^{st}$ order beams (m=+1 and m=−1), corresponds to output beams 720,722, respectively. For the $+/-2^{nd}$ order beams (m=+2 and m=−2), corresponds to output beams 724,726, respectively. The $0^{th}$ order (un-defracted) beam (m=0), corresponds to beam 718 and passes straight through the substrate. The output beams 720-726 corresponding to the second pitch Λ2 project spectral spots or peaks 730-736, respectively, which are at a different location than the point 710-716, but along the same common plane, shown from the side by the line 709.

Thus, for a given pitch Λ (or bit) in a grating, a set of spectral peaks will appear at a specific location in space. Thus, each different pitch corresponds to a different elevation or output angle which corresponds to a predetermined set of spectral peaks. Accordingly, the presence or absence of a particular peak or set of spectral peaks defines the code.

In general, if the angle of the grating 12 is not properly aligned with respect to the mechanical longitudinal axis of the substrate 10, the readout angles may no longer be symmetric, leading to possible difficulties in readout. With a thin grating, the angular sensitivity to the alignment of the longitudinal axis of the substrate 10 to the input angle θi of incident radiation is reduced or eliminated. In particular, the input light can be oriented along substantially any angle θi with respect to the grating 12 without causing output signal degradation, due the large Bragg angle envelope. Also, if the incident beam 24 is normal to the substrate 10, the grating 12 can be oriented at any rotational (or azimuthal) angle without causing output signal degradation. However, in each of these cases, changing the incident angle θi will affect the output angle θo of the reflected light in a predetermined predictable way, thereby allowing for accurate output code signal detection or compensation.

Figures 32, 33:
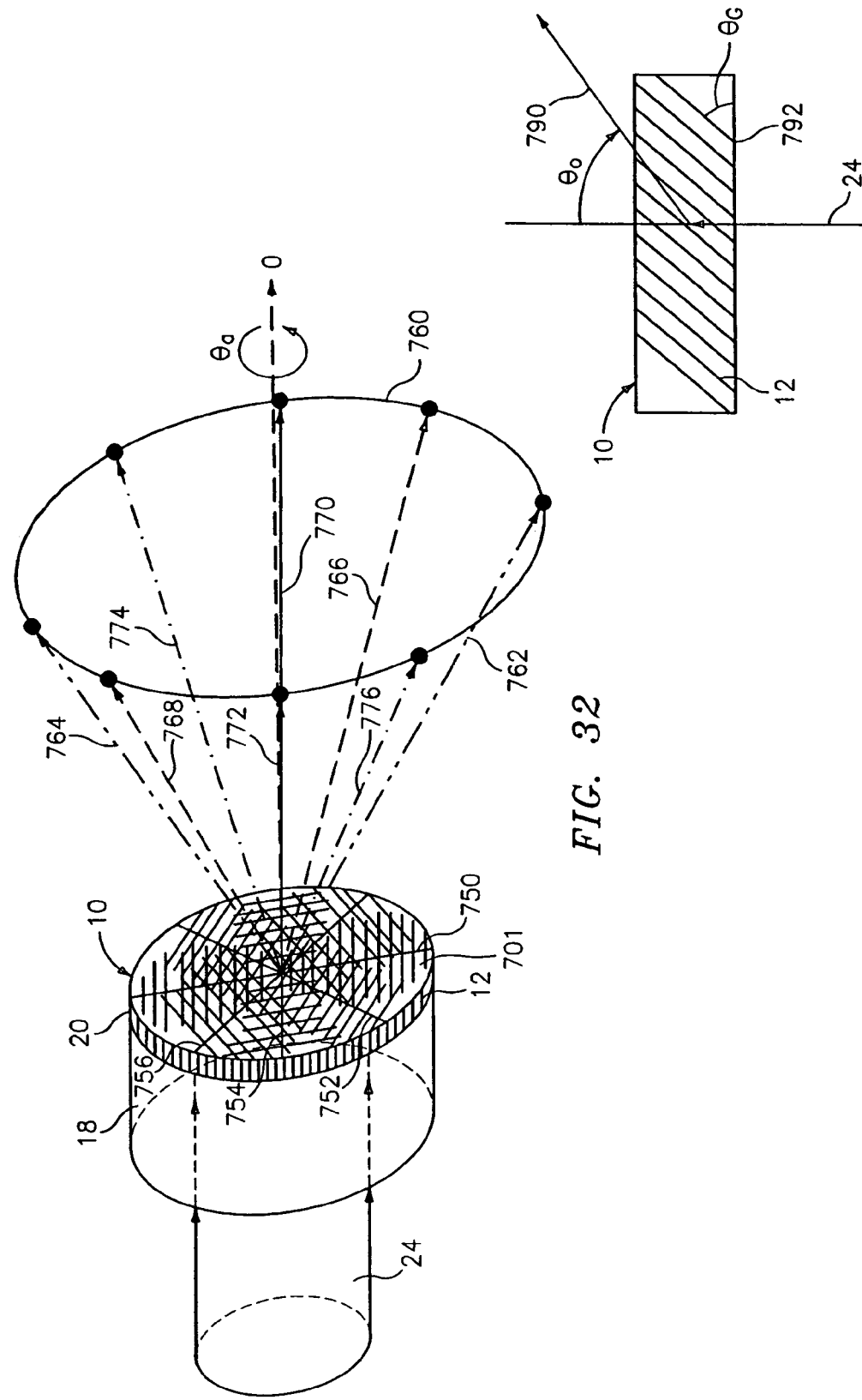
FIG. 32 is a perspective view showing azimuthal multiplexing of a thin grating for an optical identification element, in accordance with the present invention.
FIG. 33 is side view of a blazed grating for an optical identification element, in accordance with the present invention.

Referring to FIG. 32, for a thin grating, in addition to multiplexing in the elevation or output angle based on grating pitch Λ, the bits can also be multiplexed in an azimuthal (or rotational) angle θa of the substrate. In particular, a plurality of gratings 750,752,754,756 each having the same pitch Λ are disposed in a surface 701 of the substrate 10 and located in the plane of the substrate surface 701. The input light 24 is incident on all the gratings 750,752,754,756 simultaneously. Each of the gratings provides output beams oriented based on the grating orientation. For example, the grating 750 provides the output beams 764,762, the grating 752 provides the output beams 766,768, the grating 754 provides the output beams 770,772, and the grating 756 provides the output beams 774, 776. Each of the output beams provides spectral peaks or spots (similar to that discussed hereinbefore), which are located in a plane 760 that is parallel to the substrate surface plane 701. In this case, a single grating pitch Λ can produce many bits depending on the number of gratings that can be placed at different azimuthal (rotational) angles on the surface of the substrate 10 and the number of output beam spectral peaks that can be spatially and optically resolved/detected. Each bit may be viewed as the presence or absence of a pair of peaks located at a predetermined location in space in the plane 760. Note that this example uses only the m=+/−1$^{st}$ order for each reflected output beam. Alternatively, the detection may also use the m=+/−2$^{nd}$ order. In that case, there would be two additional output beams and peaks (not shown) for each grating (as discussed hereinbefore) that may lie in the same plane as the plane 760 and may be on a concentric circle outside the circle 760.

In addition, the azimuthal multiplexing can be combined with the elevation or output angle multiplexing discussed hereinbefore to provide two levels of multiplexing. Accordingly, for a thin grating, the number of bits can be multiplexed based on the number of grating pitches Λ and/or geometrically by the orientation of the grating pitches.

Furthermore, if the input light angle θi is normal to the substrate 10, the edges of the substrate 10 no longer scatter light from the incident angle into the "code angular space", as discussed herein and/or in the aforementioned patent application.

Also, in the thin grating geometry, a continuous broadband wavelength source may be used as the optical source if desired.

Referring to FIG. 33, instead of or in addition to the pitches Λ in the grating 12 being oriented normal to the longitudinal axis, the pitches may be created at a angle θg. In that case, when the input light 24 is incident normal to the surface 792, will produce a reflected output beam 790 having an angle θo determined by Eq. 1 as adjusted for the blaze angle θg. This can provide another level of multiplexing bits in the code.

Figure 34:
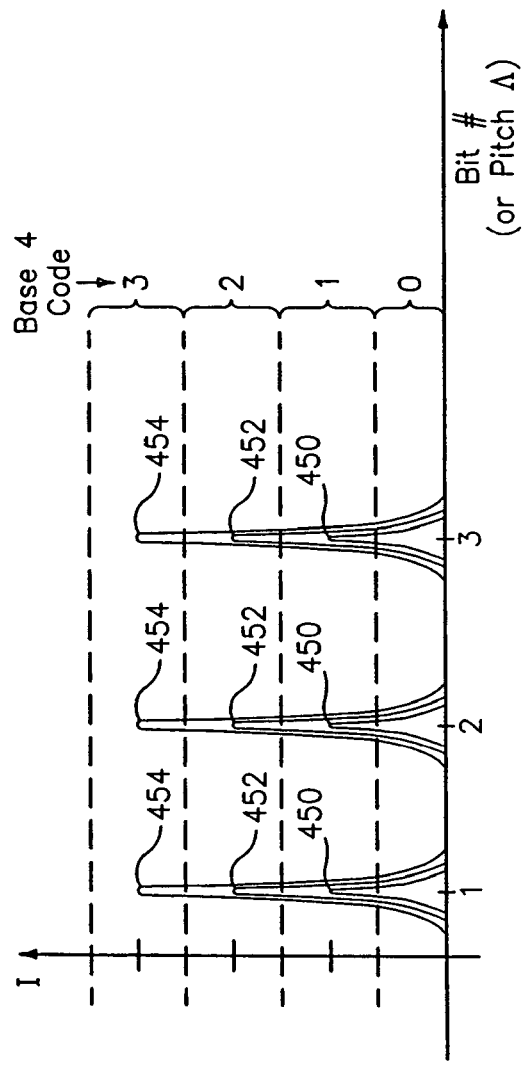
FIG. 34 is a graph of a plurality of states for each bit in a code for an optical identification element, in accordance with the present invention.

Referring to FIG. 34, instead of using an optical binary (0-1) code, an additional level of multiplexing may be provided by having the optical code use other numerical bases, if intensity levels of each bit are used to indicate code information. This could be achieved by having a corresponding magnitude (or strength) of the refractive index change (δn) for each grating pitch Λ. Four intensity ranges are shown for each bit number or pitch Λ, providing for a Base-4 code (where each bit corresponds to 0,1,2, or 3). The lowest intensity level, corresponding to a 0, would exist when this pitch Λ is not present in the grating 12. The next intensity level 450 would occur when a first low level δn1 exists in the grating that provides an output signal within the intensity range corresponding to a 1. The next intensity level 452 would occur when a second higher level δn2 exists in the grating 12 that provides an output signal within the intensity range corresponding to a 2. The next intensity level 452, would occur when a third higher level δn3 exists in the grating 12 that provides an output signal within the intensity range corresponding to a 3.

Figure 35:
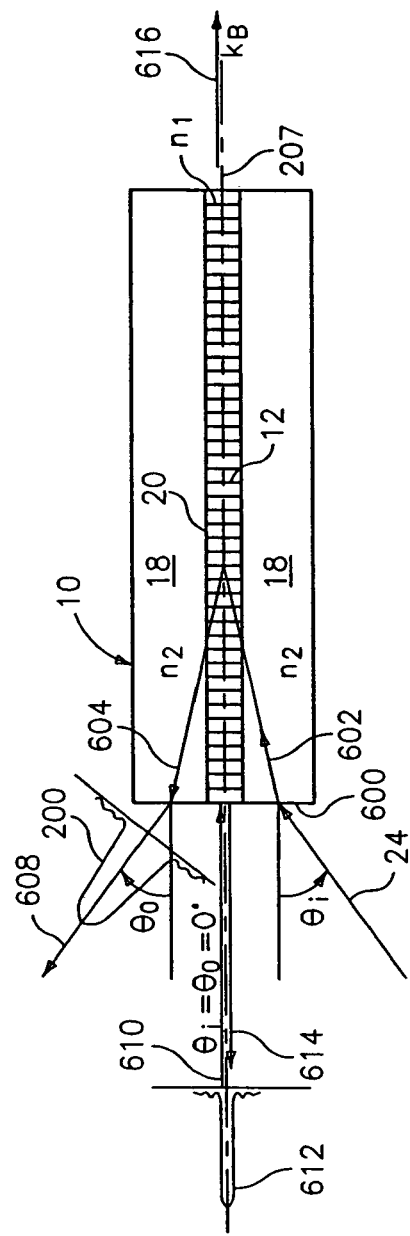
FIG. 35 is a side view of an optical identification element where light is incident on an end face, in accordance with the present invention.

Referring to FIG. 35, the input light 24 may be incident on the substrate 10 on an end face 600 of the substrate 10. In that case, the input light 24 will be incident on the grating 12 having a more significant component of the light (as compared to side illumination discussed hereinbefore) along the longitudinal grating axis 207 of the grating (along the grating vector kB), as shown by a line 602. The light 602 reflects off the grating 12 as indicated by a line 604 and exits the substrate as output light 608. Accordingly, it should be understood by one skilled in the art that the diffraction equations discussed hereinbefore regarding output diffraction angle θo also apply in this case except that the reference axis would now be the grating axis 207. Thus, in this case, the input and output light angles θi,θo, would be measured from the grating axis 207 and length Lg of the grating 12 would become the thickness or depth D of the grating 12. As a result, a grating 12 that is 400 microns long, would result in the Bragg envelope 200 being narrow. It should be understood that because the values of n1 and n2 are close to the same value, the slight angle changes of the light between the regions 18,20 are not shown herein.

In the case where incident light 610 is incident along the same direction as the grating vector (Kb) 207, i.e., θi=0 degrees, the incident light sees the whole length Lg of the grating 12 and the grating provides a reflected output light angle θo=0 degrees, and the Bragg envelope 612 becomes extremely narrow, as the narrowing effect discussed above reaches a limit. In that case, the relationship between a given pitch Λ in the grating 12 and the wavelength of reflection λ is governed by a known "Bragg grating" relation:

$$\lambda = 2n_{eff}\Lambda \qquad \text{Eq. 8}$$

where $n_{eff}$ is the effective index of refraction of the substrate, λ is the input (and output wavelength) and Λ is the pitch. This relation, as is known, may be derived from Eq. 1 where θi=θo=90 degrees.

In that case, the code information is readable only in the spectral wavelength of the reflected beam, similar to that discussed hereinbefore for wavelength based code reading. Accordingly, the input signal in this case may be a scanned wavelength source or a broadband wavelength source. In addition, as discussed hereinbefore for wavelength based code reading, the code information may be obtained in reflection from the reflected beam 614 or in transmission by the transmitted beam 616 that passes through the grating 12.

It should be understood that for shapes of the substrate 10 or element 8 other than a cylinder, the effect of various different shapes on the propagation of input light through the element 8, substrate 10, and/or grating 12, and the associated reflection angles, can be determined using known optical physics including Snell's Law, shown below:

$$n_{in} \sin \theta in = n_{out} \sin \theta out \qquad \text{Eq. 9}$$

where $n_{in}$ is the refractive index of the first (input) medium, and $n_{out}$ is the refractive index of the second (output) medium, and θin and θout are measured from a line 620 normal to an incident surface 622.

Referring to FIG. 36, if the value of n1 in the grating region 20 is greater than the value of n2 in the non-grating region 18, the grating region 20 of the substrate 10 will act as a known optical waveguide for certain wavelengths. In that case, the grating region 20 acts as a "core" along which light is guided and the outer region 18 acts as a "cladding" which helps confine or guide the light. Also, such a waveguide will have a known "numerical aperture" (θna) that will allow light that is within the aperture θna to be directed or guided along the grating axis 207 and reflected axially off the grating 12 and returned and guided along the waveguide. In that case, the grating 12 will reflect light having the appropriate wavelengths equal to the pitches Λ present in the grating 12 back along the region 20 (or core) of the waveguide, and pass the remaining wavelengths of light as the light 632. Thus, having the grating region 20 act as an optical waveguide for wavelengths reflected by the grating 12 allows incident light that is not aligned exactly with the grating axis 207 to be guided along and aligned with the grating 12 axis 207 for optimal grating reflection.

If an optical waveguide is used any standard waveguide may be used, e.g., a standard telecommunication single mode optical fiber (125 micron diameter or 80 micron diameter fiber with about a 8-10 micron diameter), or a larger diameter waveguide (greater than 0.5 mm diameter), such as is describe in U.S. patent application Ser. No. 09/455,868, filed Dec. 6, 1999, entitled "Large Diameter Waveguide, Grating". Further, any type of optical waveguide may be used for the optical substrate 10, such as, a multi-mode, birefringent, polarization maintaining, polarizing, multi-core, multi-cladding, or microsturctured optical waveguide, or a flat or planar waveguide (where the waveguide is rectangular shaped), or other waveguides.

Referring to FIG. 37, if the grating 12 extends across the entire dimension D of the substrate, the substrate 10 does not behave as a waveguide for the incident or reflected light and the incident light 24 will be diffracted (or reflected) as indicated by lines 642, and the codes detected as discussed hereinbefore for the end-incidence condition discussed hereinbefore with FIG. 45, and the remaining light 640 passes straight through.

Referring to FIG. 38, illustrations (a)-(c), in illustration (a), for the end illumination condition, if a blazed or angled grating is used, as discussed hereinbefore, the input light 24 is coupled out of the substrate 10 at a known angle as shown by a line 650. Referring to FIG. 38, illustration (b), alternatively, the input light 24 may be incident from the side and, if the grating 12 has the appropriate blaze angle, the reflected light will exit from the end face 652 as indicated by a line 654. Referring to FIG. 38, illustration (c), the grating 12 may have a plurality of different pitch angles 660,662, which reflect the input light 24 to different output angles as indicated by lines 664, 666. This provides another level of multiplexing (spatially) additional codes, if desired.

The grating 12 may be impressed in the substrate 10 by any technique for writing, impressed, embedded, imprinted, or otherwise forming a diffraction grating in the volume of or on a surface of a substrate 10. Examples of some known techniques are described in U.S. Pat. Nos. 4,725,110 and 4,807, 950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, respectively, and U.S. Pat. No. 5,367,588, entitled "Method of Fabricating Bragg Gratings Using a Silica Glass Phase Grating Mask and Mask Used by Same", to Hill, and U.S. Pat. No. 3,916,182, entitled "Periodic Dielectric Waveguide Filter", Dabby et al, and U.S. Pat. No. 3,891,302, entitled "Method of Filtering Modes in Optical Waveguides", to Dabby et al, which are all incorporated herein by reference to the extent necessary to understand the present invention.

Alternatively, instead of the grating 12 being impressed within the substrate material, the grating 12 may be partially or totally created by etching or otherwise altering the outer surface geometry of the substrate to create a corrugated or varying surface geometry of the substrate, such as is described in U.S. Pat. No. 3,891,302, entitled "Method of Filtering Modes in Optical Waveguides", to Dabby et al, which is incorporated herein by reference to the extent necessary to understand the present invention, provided the resultant optical refractive profile for the desired code is created.

Further, alternatively, the grating 12 may be made by depositing dielectric layers onto the substrate, similar to the way a known thin film filter is created, so as to create the desired resultant optical refractive profile for the desired code.

FIGS. 39-50: Alternative Microbead Geometries

The substrate 10 (and/or the element 8) may have end-view cross-sectional shapes other than circular, such as square, rectangular, elliptical, clam-shell, D-shaped, or other shapes, and may have side-view sectional shapes other than rectangular, such as circular, square, elliptical, clam-shell, D-shaped, or other shapes. Also, 3D geometries other than a cylinder may be used, such as a sphere, a cube, a pyramid or any other 3D shape. Alternatively, the substrate 10 may have a geometry that is a combination of one or more of the foregoing shapes.

The shape of the element 8 and the size of the incident beam may be made to minimize any end scatter off the end face(s) of the element 8, as is discussed herein and/or in the aforementioned patent application. Accordingly, to minimize such scatter, the incident beam 24 may be oval shaped where the narrow portion of the oval is smaller than the diameter D1, and the long portion of the oval is smaller than the length L of the element 8. Alternatively, the shape of the end faces may be rounded or other shapes or may be coated with an antireflective coating.

It should be understood that the size of any given dimension for the region 20 of the grating 12 may be less than any corresponding dimension of the substrate 10. For example, if the grating 12 has dimensions of length Lg, depth Dg, and width Wg, and the substrate 12 has different dimensions of length L, depth D, and width W, the dimensions of the grating 12 may be less than that of the substrate 12. Thus, the grating 12, may be embedded within or part of a much larger substrate 12. Also, the element 8 may be embedded or formed in or on a larger object for identification of the object.

The dimensions, geometries, materials, and material properties of the substrate 10 are selected such that the desired optical and material properties are met for a given application. The resolution and range for the optical codes are scalable by controlling these parameters as discussed herein and/or in the aforementioned patent application.

Referring to FIG. 39, the substrate 10 may have an outer coating 799, such as a polymer or other material that may be dissimilar to the material of the substrate 10, provided that the coating 799 on at least a portion of the substrate, allows sufficient light to pass through the substrate for adequate optical detection of the code. The coating 799 may be on any one or more sides of the substrate 10. Also, the coating 799 may be a material that causes the element 8 to float or sink in certain fluids (liquid and/or gas) solutions.

Also, the substrate 10 may be made of a material that is less dense than certain fluid (liquids and/or gas) solutions, thereby allowing the elements 8 to float or be buoyant or partially buoyant. Also, the substrate may be made of a porous material, such as controlled pore glass (CPG) or other porous material, which may also reduce the density of the element 8 and may make the element 8 buoyant or partially-buoyant in certain fluids.

Referring to FIG. 40, the grating 12 is axially spatially invariant. As a result, the substrate 10 with the grating 12 (shown as a long substrate 21) may be axially subdivided or cut into many separate smaller substrates 30-36 and each substrate 30-36 will contain the same code as the longer substrate 21 had before it was cut. The limit on the size of the smaller substrates 30-36 is based on design and performance factors discussed herein and/or in the aforementioned patent application.

Referring to FIG. 41, one purpose of the outer region 18 (or region without the grating 12) of the substrate 10 is to provide mechanical or structural support for the inner grating region 20. Accordingly, the entire substrate 10 may comprise the grating 12, if desired. Alternatively, the support portion may be completely or partially beneath, above, or along one or more sides of the grating region 20, such as in a planar geometry, or a D-shaped geometry, or other geometries, as described herein and/or in the aforementioned patent application. The non-grating portion 18 of the substrate 10 may be used for other purposes as well, such as optical lensing effects or other effects (discussed herein or in the aforementioned patent application). Also, the end faces of the substrate 10 need not be perpendicular to the sides or parallel to each other. However, for applications where the elements 8 are stacked end-to-end, the packing density may be optimized if the end faces are perpendicular to the sides.

Referring to FIG. 42, illustrations (a)-(c), two or more substrates 10,250, each having at least one grating therein, may be attached together to form the element 8, e.g., by an adhesive, fusing or other attachment techniques. In that case, the gratings 12,252 may have the same or different codes.

Referring to FIG. 43, illustrations (a) and (b), the substrate 10 may have multiple regions 80,90 and one or more of these regions may have gratings in them. For example, there may be gratings 12,252 side-by-side (illustration (a)), or there may be gratings 82-88, spaced end-to-end (illustration (b)) in the substrate 10.

Referring to FIG. 44, the length L of the element 8 may be shorter than its diameter D, thus, having a geometry such as a plug, puck, wafer, disc or plate.

Referring to FIG. 45 to facilitate proper alignment of the grating axis with the angle θi of the input beam 24, the substrate 10 may have a plurality of the gratings 12 having the same codes written therein at numerous different angular or rotational (or azimuthal) positions of the substrate 10. In particular, two gratings 550, 552, having axial grating axes 551, 553, respectively may have a common central (or pivot or rotational) point where the two axes 551,553 intersect. The angle θi of the incident light 24 is aligned properly with the grating 550 and is not aligned with the grating 552, such that output light 555 is reflected off the grating 550 and light 557 passes through the grating 550 as discussed herein. If the element 8 is rotated as shown by the arrows 559, the angle θi of incident light 24 will become aligned properly with the grating 552 and not aligned with the grating 550 such that output light 555 is reflected off the grating 552 and light 557 passes through the grating 552. When multiple gratings are located in this rotational orientation, the bead may be rotated as indicated by a line 559 and there may be many angular positions that will provide correct (or optimal) incident input angles θi to the grating. While this example shows a circular cross-section, this technique may be used with any shape cross-section.

Referring to FIG. 46, illustrations (a), (b), (c), (d), and (e) the substrate 10 may have one or more holes located within the substrate 10. In illustration (a), holes 560 may be located at various points along all or a portion of the length of the substrate 10. The holes need not pass all the way through the substrate 10. Any number, size and spacing for the holes 560 may be used if desired. In illustration (b), holes 572 may be located very close together to form a honeycomb-like area of all or a portion of the cross-section. In illustration (c), one (or more) inner hole 566 may be located in the center of the substrate 10 or anywhere inside of where the grating region(s) 20 are located. The inner hole 566 may be coated with a reflective coating 573 to reflect light to facilitate reading of one or more of the gratings 12 and/or to reflect light diffracted off one or more of the gratings 12. The incident light 24 may reflect off the grating 12 in the region 20 and then reflect off the surface 573 to provide output light 577. Alternatively, the incident light 24 may reflect off the surface 573, then reflect off the grating 12 and provide the output light 575. In that case the grating region 20 may run axially or circumferentially 571 around the substrate 10. In illustration (d), the holes 579 may be located circumferentially around the grating region 20 or transversely across the substrate 10. In illustration (e), the grating 12 may be located circumferentially around the outside of the substrate 10, and there may be holes 574 inside the substrate 10.

Referring to FIG. 47, illustrations (a), (b), and (c), the substrate 10 may have one or more protruding portions or teeth 570, 578,580 extending radially and/or circumferentially from the substrate 10. Alternatively, the teeth 570, 578, 580 may have any other desired shape.

Referring to FIG. 48, illustrations (a), (b), (c) a D-shaped substrate, a flat-sided substrate and an eye-shaped (or clamshell or teardrop shaped) substrate 10, respectively, are shown. Also, the grating region 20 may have end cross-sectional shapes other than circular and may have side cross-sectional shapes other than rectangular, such as any of the geometries described herein for the substrate 10. For example, the grating region 20 may have a oval cross-sectional shape as shown by dashed lines 581, which may be oriented in a desired direction, consistent with the teachings herein. Any other geometries for the substrate 10 or the grating region 20 may be used if desired, as described herein.

Figure 49:
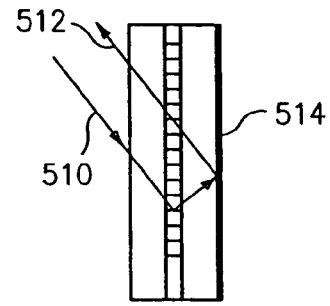
FIG. 49 is a side view an optical identification element having a reflective coating thereon, in accordance with the present invention.

Referring to FIG. 49, at least a portion of a side of the substrate 10 may be coated with a reflective coating to allow incident light 510 to be reflected back to the same side from which the incident light came, as indicated by reflected light 512.

Figure 50:
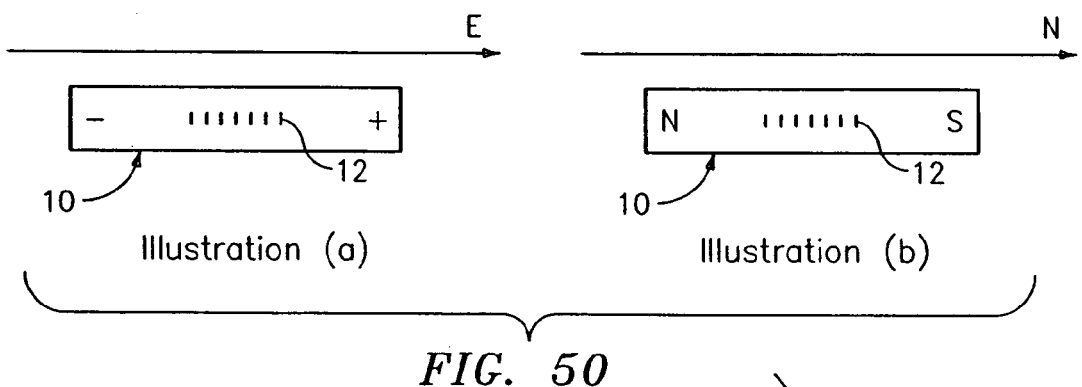
FIG. 50, illustrations (a)-(b), are side views of an optical identification element polarized along an electric or magnetic field, in accordance with the present invention.
Figure 51:
FIGS. 51 and 52 are diagrams of bead reads from flat retro-reflector trays, in accordance with the present invention.
Figure 52:
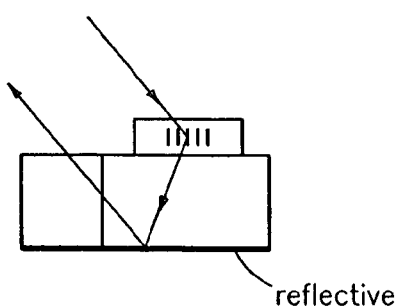
Figure 53:
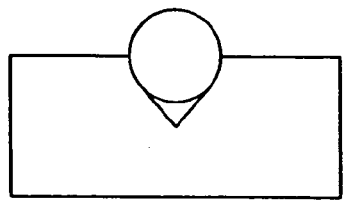
FIGS. 53 and 54 are diagrams of beads read thru V-grooves, in accordance with the present invention.
Figure 54:
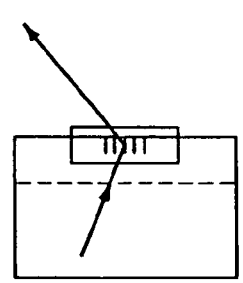

Referring to FIG. 50, illustrations (a) and (b), alternatively, the substrate 10 can be electrically and/or magnetically polarized, by a dopant or coating, which may be used to ease handling and/or alignment or orientation of the substrate 10 and/or the grating 12, or used for other purposes. Alternatively, the bead may be coated with conductive material, e.g., metal coating on the inside of a holy substrate, or metallic dopant inside the substrate. In these cases, such materials can cause the substrate 10 to align in an electric or magnetic field. Alternatively, the substrate can be doped with an element or compound that fluoresces or glows under appropriate illumination, e.g., a rare earth dopant, such as Erbium, or other rare earth dopant or fluorescent or luminescent molecule. In that case, such fluorescence or luminescence may aid in locating and/or aligning substrates.

THE SCOPE OF THE INVENTION

Unless otherwise specifically stated herein, the term "microbead" is used herein as a label and does not restrict any embodiment or application of the present invention to certain dimensions, materials and/or geometries.

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. A method for aligning microbeads to be read by a code reading or other detection device, comprising:
   providing microbeads to a positioning device, each microbead having an elongated body with a holographic code disposed thereon or therein, the code being oriented to extend along a longitudinal axis of the corresponding microbead and being defined at least in part by variation of a refractive index of the microbead, the refractive index varying in an axial direction along the longitudinal axis of the microbead; and
   aligning the microbeads with the positioning device so the codes, the variation in the refractive index of the codes, and the longitudinal axis of the microbeads are in a common fixed orientation relative to the code reading or other detection device.

2. A method according to claim 1, wherein the positioning device includes a plate having a multiplicity of grooves therein, the microbeads being aligned in the grooves such that the longitudinal axis of the microbeads extends along a length of the corresponding groove.

3. A method according to claim 2, wherein the method includes agitating the plate to encourage alignment of the microbeads into the grooves.

4. A method according to claim 1, wherein the microbeads are tubularly shaped with a length extending along the longitudinal axis and with a circular diameter traversing the longitudinal axis, the length being greater than the diameter.

5. A method according to claim 1, wherein the microbeads have the holographic code embedded in a central region thereof.

6. A method according to claim 1, wherein the code is used to correlate a chemical content on each bead with a measured fluorescence signal.

7. A method according to claim 1, wherein the elongated body has opposite ends arranged along the longitudinal axis and sides located transversely with respect to the longitudinal axis, the positioning device holding each microbead in a substantially known fixed orientation and alignment in relation to an end to end pitch direction and a side to side yaw direction while permitting the microbeads to rotate in a roll direction about the longitudinal axis.

8. A method according to claim 2, wherein the plate has a series of parallel grooves having one of a square shape, a rectangular shape, v-shape and semi-circular shape.

9. A method according to claim 2, wherein the plate is an optically transparent medium including boro-silicate glass, fused silica or plastic, and the grooves are open sided.

10. A method according to claim 2, wherein the microbeads have a tubular shape with a circular cross-section and are positioned end to end in the grooves, the grooves having an open side with a depth that is dimensioned to be at least a diameter of the microbeads.

11. A method according to claim 2, wherein the microbeads have a circular dimension and either the grooves have a depth between 10 and 125 microns, the depth is dimensioned within 90% of the diameter of the microbeads, or a combination thereof.

12. A method according to claim 2, wherein the microbeads have a circular dimension and a spacing of the grooves is between 1 and 2 times the diameter of the microbeads.

13. A method according to claim 2, wherein the grooves have an open side and the microbeads, when introduced, are free to move across a side of the plate until aligning with and coming to rest in the grooves.

14. A method according to claim 2, wherein the microbeads have a tubular shape and the grooves are arranged in one of rows, concentric circles and spirals.

15. A method according to claim 2, wherein the grooves have a bottom that is flat enough to prevent the beads from rotating, by more than a few tenths of a degree, relative to the code reader device.

16. A method according to claim 1, wherein the code reader device includes a readout camera.

17. A method according to claim 2, further comprising agitating the plate using a sonic transducer, a mechanical wipe, or shaking or rocking device.

18. A method according to claim 1, wherein the method includes using an open format approach by dispensing the microbeads onto the plate using a pipette tip or syringe tip and not covering the plate.

19. A method according to claim 1, further comprising dispensing the microbeads into a cuvette-like device comprising a plate, at least three walls and a cover.

20. A method according to claim 19, wherein the step of dispensing includes injecting the microbeads near an edge of an opening into the cuvette-like device and allowing surface tension, or an induced fluid flow, to pull the microbeads into the cuvette-like device.

21. A method according to claim 19, wherein the method includes using a closed format approach by sectioning a closed region into two regions, a first region where the microbeads are free to move about in a plane, either in a groove or not, and a second region where the microbeads are trapped in a groove and can only move along an axis of the groove.

22. A method according to claim 21, wherein the method includes the step of trapping the microbeads in a groove by reducing the height of the closed region so that the microbeads can no longer come out of the groove.

23. A method according to claim 21, wherein the first region is used to pre-align the beads into a groove, facilitating the introduction of beads into the second region.

24. A method according to claim 21, wherein the method includes tilting the cuvette-like device up so gravity can be used to pull the microbeads along a groove from the first region to the second region.

25. A method according to claim 21, wherein the plate is made of silicon having walls formed by Su8 coupled thereto, or having walls formed by etching the silicon.

26. A method according to claim 1, wherein the method includes the step of identifying a chemical content on the surface of the microbead with a measured fluorescence signal.

27. A method according to claim 1, wherein the method includes passing a code reading signal through the microbead aligned on the positioning device.

28. A method according to claim 1, wherein the method further includes the step of correlating a chemical content identified on each microbead with a fluorescence signal, including one provided by an incident laser beam device.

29. A method according to claim 1, wherein the method includes the step of identifying the code in the microbead.

30. A method according to claim 2, wherein the grooves of the plate are formed using a photo lithographic process.

31. A method according to claim 2, wherein the plate includes a glass plate having Su8 thereon.

32. A method according to claim 31, wherein the glass plate is a low fluorescence glass.

33. A method according to claim 1, wherein the glass plate is a boro silicate glass.

34. A method according to claim 2, wherein the grooves on the plate are mechanically machined.

35. A method according to claim 1, wherein the grooves on the plate are formed by deep reactive ion etching.

36. A method according to claim 1, wherein the grooves on the plate are formed by injection molding.

37. A method according to claim 2, wherein the plate has a mirror coating.

38. A method according to claim 2, wherein the plate is a disk having circumferential grooves, concentric grooves, or a combination thereof.

39. A method according to claim 2, wherein the plate is a disk having radial grooves.

40. A method according to claim 2, wherein the plate is a disk having a microbead loading area located in the center of the disk.

41. A method according to claim 2, wherein the plate is a disk having one or more radial water channels extending from the center to the outer periphery thereof.

42. A method according to claim 2, wherein the method includes arranging the plate on a rotating disk.

43. A method according to claim 1, wherein the positioning device is a flow tube.

44. A method according to claim 43, wherein the step of providing includes providing the microbeads to the flow tube in a fluid.

45. A method according to claim 1, wherein the positioning device comprises a plurality of holes that receive the microbeads.

46. A method according to claim 1, wherein the microbeads have teeth or protrusions thereon.

47. A method for aligning microbeads to be read by a code reading or other detection device, comprising:

providing microbeads to a positioning device, wherein the positioning device comprises a groove plate with a side having a multiplicity of grooves therein to receive the microbeads, each microbead having an elongated body with a code disposed thereon or therein, the code being oriented to extend along a longitudinal axis of the corresponding microbead and being defined at least in part by variation of a refractive index of the microbead, the refractive index varying in an axial direction along the longitudinal axis of the microbead;

causing the microbeads to flow freely across the side of the groove plate; and aligning the microbeads with the positioning device by moving the groove plate to cause at least a portion of the microbeads to align within the grooves so the codes, the variation in the refractive index of the codes, and the longitudinal axis of the microbeads are in a fixed orientation relative to the code reading or other detection device.

48. A method according to claim 47, wherein the holographic code comprise a numeric code formed from a series of bits arranged proximate one another along the longitudinal axis of the microbead, each of the bits being assigned one of at least two values.

49. A method according to claim 47, wherein the positioning device includes a plate having a multiplicity of grooves therein, the microbeads being aligned in the grooves such that the longitudinal axis of the microbeads extends along a length of the corresponding groove.

50. A method according to claim 47, wherein the microbeads are tubularly shaped with a length extending along the longitudinal axis and with a circular diameter traversing the longitudinal axis, the length being greater than the diameter.

51. A method according to claim 47, wherein the elongated body has opposite ends arranged along the longitudinal axis and sides located transversely with respect to the longitudinal axis, the positioning device holding each microbead in a substantially known fixed orientation and alignment in relation to an end to end pitch direction and a side to side yaw direction while permitting the microbeads to rotate in a roll direction about the longitudinal axis.

52. A method according to claim 49, wherein the plate is an optically transparent medium including boro-silicate glass, fused silica or plastic, and the grooves are open sided.

53. A method according to claim 49, wherein the microbeads have a tubular shape with a circular cross-section and are positioned end to end in the grooves, the grooves having an open side with a depth that is dimensioned to be at least a diameter of the microbeads.

54. A method according to claim 49, wherein the microbeads have a circular dimension and either the grooves have a depth between 10 and 125 microns, the depth is dimensioned within 90% of the diameter of the microbeads, or a combination thereof.

55. A method according to claim 49, wherein the microbeads have a circular dimension and a spacing of the grooves is between 1 and 2 times the diameter of the microbeads.

56. A method according to claim 49, wherein the grooves have a bottom that is flat enough to prevent the beads from rotating, by more than a few tenths of a degree, relative to the code reader device.

57. A method according to claim 47, wherein the method includes the step of identifying a chemical content on the surface of the microbead with a measured fluorescence signal.

58. A method according to claim 47, wherein the method includes passing a code reading signal through the microbead aligned on the positioning device.

59. A method according to claim 47, wherein the method further includes the step of correlating a chemical content identified on each microbead with a fluorescence signal, including one provided by an incident laser beam device.

60. A method according to claim 47, wherein the method includes the step of identifying the code in the microbead.

* * * * *

UNITED STATES PATENT AND TRADEMARK OFFICE
CERTIFICATE OF CORRECTION

PATENT NO. : 7,399,643 B2  Page 1 of 1
APPLICATION NO. : 10/661836
DATED : July 15, 2008
INVENTOR(S) : John A. Moon et al.

It is certified that error appears in the above-identified patent and that said Letters Patent is hereby corrected as shown below:

Claim 9, Col. 28, line 7, please change -- boro-silicate glass, -- to -- borosilicate glass, --

Claim 25, Col. 29, line 2, please change -- Su8 coupled thereto, -- to -- SU8 coupled thereto, --

Claim 31, Col. 29, line 20, please change -- Su8 thereon. -- to -- SU8 thereon. --

Claim 33, Col. 29, line 24, please change -- boro-silicate glass. -- to -- borosilicate glass. --

Claim 48, Col. 30, line 10, please change -- A method according to claim 47, -- to -- A method according to claim 1, --

Claim 48, Col. 30, line 11, please change -- comprise -- to -- comprises --

Claim 52, Col. 30, line 33, please change -- boro-silicate glass, -- to -- borosilicate glass, --

Signed and Sealed this

Seventh Day of July, 2009

JOHN DOLL
*Acting Director of the United States Patent and Trademark Office*